(12) United States Patent
Yamaguchi et al.

(10) Patent No.: US 8,086,374 B2
(45) Date of Patent: Dec. 27, 2011

(54) STEERING SYSTEM

(75) Inventors: Takuya Yamaguchi, Wako (JP);
Yoshimitsu Akuta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 672 days.

(21) Appl. No.: 12/253,522

(22) Filed: Oct. 17, 2008

(65) Prior Publication Data
US 2009/0105907 A1  Apr. 23, 2009

(30) Foreign Application Priority Data

Oct. 19, 2007  (JP) .................................. 2007-272048
Jun. 16, 2008  (JP) .................................. 2008-156231

(51) Int. Cl.
*B62D 5/04* (2006.01)
(52) U.S. Cl. .......................................... 701/42; 180/446
(58) Field of Classification Search ................. 701/41, 701/42; 180/443, 446
See application file for complete search history.

(56) References Cited

U.S. PATENT DOCUMENTS

| 6,102,151 A | 8/2000 | Shimizu et al. | |
| 6,155,377 A * | 12/2000 | Tokunaga et al. | 180/446 |
| 7,055,645 B2 * | 6/2006 | Kato et al. | 180/443 |
| 7,392,878 B2 * | 7/2008 | Ono et al. | 180/421 |
| 8,006,799 B2 * | 8/2011 | Yamanaka | 180/444 |
| 2004/0059485 A1 * | 3/2004 | Momiyama et al. | 701/41 |
| 2005/0216155 A1 * | 9/2005 | Kato et al. | 701/41 |
| 2007/0193818 A1 | 8/2007 | Hidaka | |

FOREIGN PATENT DOCUMENTS

| DE | 10 2007 004 369 | 8/2007 |
| EP | 1 380 490 | 1/2004 |
| EP | 1 621 448 | 2/2006 |
| JP | 2000-344120 | 12/2000 |

* cited by examiner

*Primary Examiner* — Kevin Hurley
(74) *Attorney, Agent, or Firm* — Rankin, Hill & Clark LLP

(57) ABSTRACT

There is provided a steering system allowing a comfortable steering operation even if a driver quickly turns a steering wheel when a transfer ratio is quickened in a low vehicle speed range. In the steering system that changes the transfer ratio of a steering angle of the steering wheel to a turning angle of a turning wheel by a variable transfer ratio mechanism and generates auxiliary power by an electric power steering unit, a variable transfer ratio mechanism controlling ECU has a switching section for switching a transfer ratio modulating mode of setting a rotational angle of a transfer ratio variable motor used in the variable transfer ratio mechanism so that the transfer ratio is set at a target transfer ratio corresponding to vehicle speed with a steering torque modulating mode of reducing an electric current for driving the motor so as to reduce steering power of the steering wheel.

15 Claims, 25 Drawing Sheets

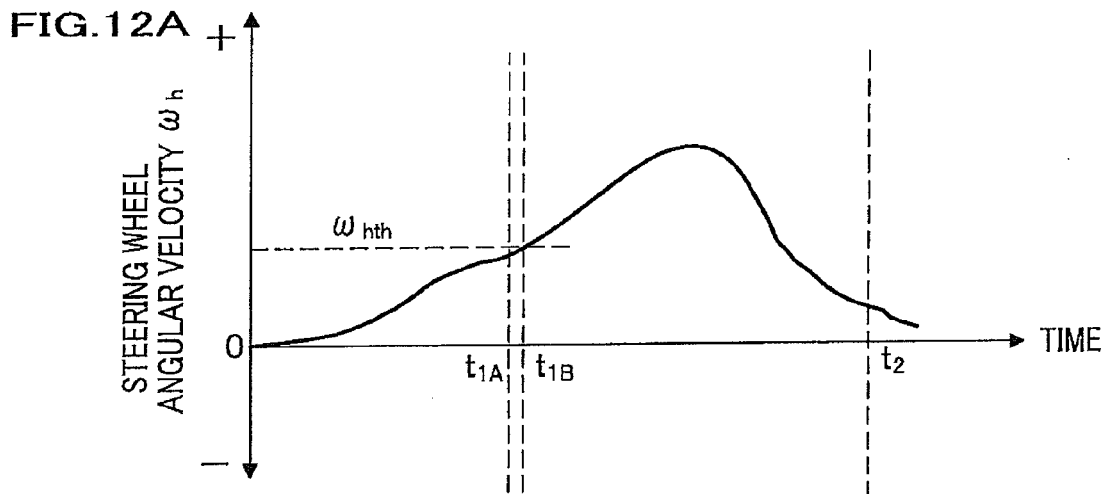
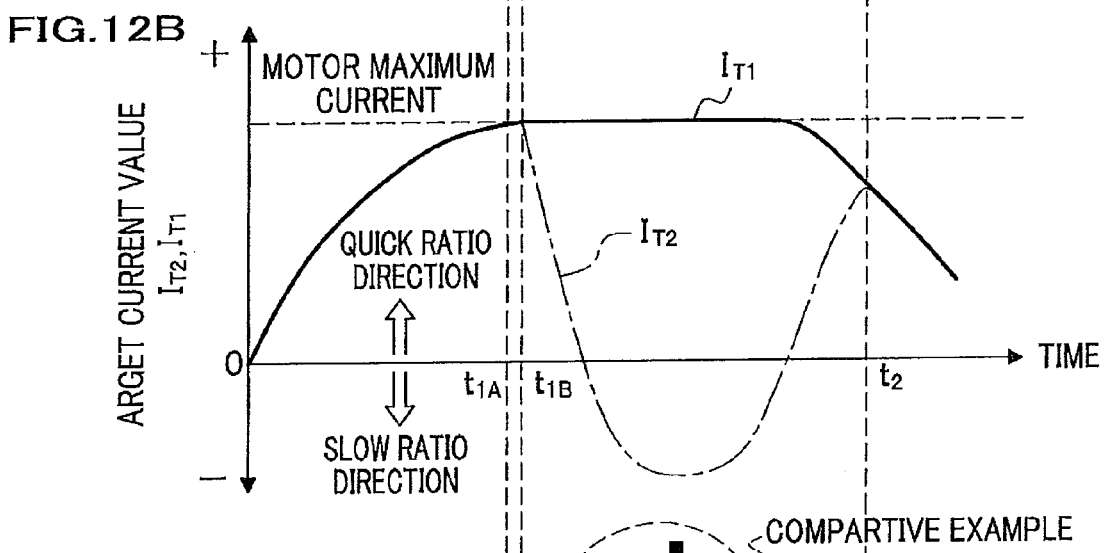
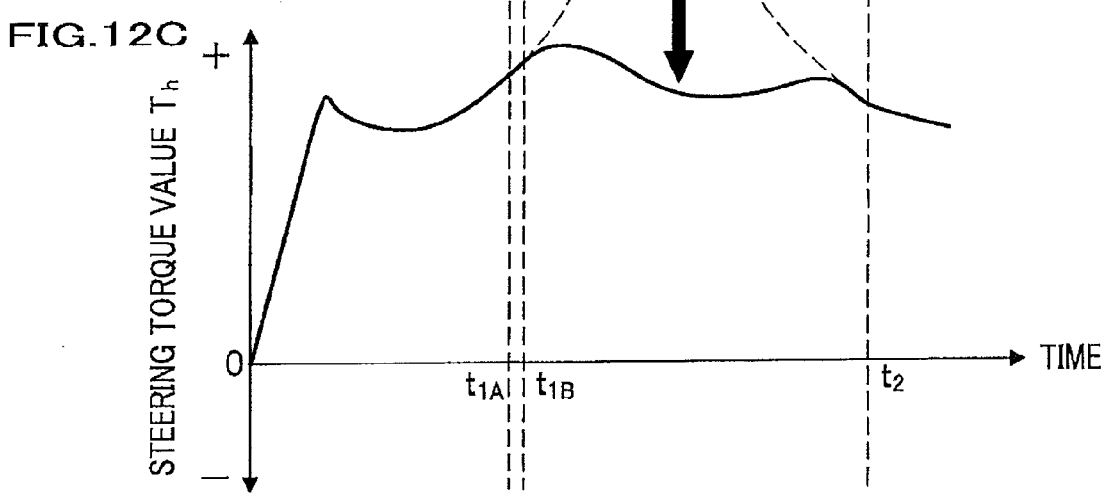

STEERING SYSTEM

CROSS REFERENCE TO RELATED APPLICATIONS

This application claims the foreign priority benefit under Title 35, United States Code, §119 (a)-(d) of Japanese Patent Application No. 2007-272048, filed on Oct. 19, 2007 and Japanese Patent Application No. 2008-156231, filed on Jun. 16, 2008 in the Japan Patent Office, the disclosure of which is herein incorporated by reference in its entirety.

BACKGROUND OF THE INVENTION

1. Field of the Invention

The present invention relates to a steering system that changes a transfer ratio of a steering angle of a steering wheel to a turning angle of a turning wheel by means of a variable transfer ratio mechanism and generates auxiliary power during steering by means of an electric power steering unit.

2. Description of Related Art

Heretofore, a steering system having a variable transfer ratio mechanism and an electric power steering unit has been proposed. The variable transfer ratio mechanism enables a driver to largely turn a turning wheel with less steering operation by setting a transfer ratio (=angle of steering wheel/angle of turning wheel) to be small (by quickening the ratio) in a low vehicle speed range during parking and the like, so that the mechanism can reduce a burden of operation of the driver and improve convenience in driving.

The variable transfer ratio mechanism also enables yaw rate response characteristics and vehicle traveling stability to be improved by setting the transfer ratio to be large (by slowing the ratio) in a high vehicle speed range because the turning wheel is turned less even if the driver largely steers the steering wheel. The electric power steering unit also enables the driver to turn the turning wheel with less steering operation because the unit generates steering auxiliary power.

If the driver tries to turn the steering wheel quickly when the ratio is quickened in the low vehicle speed range, the steering wheel of the steering system provided with such variable transfer ratio mechanism and electric power steering unit may become tough to turn because deficiency of thrust force occurs due to an influence of counter electromotive voltage of an EPS (Electric Power Steering) motor, i.e., a power source of the electric power steering unit, even through the electric power steering unit tries to generate the auxiliary power so as to be able to turn the turning wheel largely and quickly.

Then, there has been proposed a method of avoiding the steering wheel from becoming tough to turn by changing a target transfer ratio, i.e., a target value of the transfer ratio, in real time so that the transfer ratio is changed in a direction of slowing down the ratio in such a case as disclosed in Japanese Patent Application Laid-open No. 2000-344120 for example.

However, the prior art method was considered to cause such phenomena that steering reactive force fluctuates as if it undulates with respect to such steering operations of quick-slow-quick for example or that the steering reactive force increases in the beginning of the steering operation and the steering operation is prone to be stuck (caught) when the driver starts to turn the steering wheel abruptly with large steering speed.

The driver feels a sense of discomfort in operating the steering wheel when such phenomena occur.

Still more, when the driver turns the steering wheel with large steering speed and when an actual transfer ratio cannot quickly follow up the target transfer ratio due to output torque of the transfer ratio variable motor used in the variable transfer ratio mechanism, the driver may possibly feel a sense of discomfort in operating the steering wheel as if the turn of the turning wheel continues in a previous steering direction even after finishing the operation of the steering wheel.

Accordingly, the present invention seeks to provide a steering system that enables the driver to operate a steering wheel comfortably even if the driver turns the steering wheel quickly when the transfer ratio is quickened in the low vehicle speed range.

SUMMARY OF THE INVENTION

In order to solve the aforementioned problem, according to a first aspect of the invention, there is provided a steering system that changes a transfer ratio of a steering angle of a steering wheel to a turning angle of a turning wheel by means of a variable transfer ratio mechanism and generates auxiliary power during steering by an electric power steering system, wherein the steering system includes a switching section for switching a transfer ratio modulating mode of modulating a rotational angle of a transfer ratio variable (differential gear) motor used in the variable transfer ratio mechanism so that the transfer ratio is set at a target transfer ratio corresponding to vehicle speed and a steering torque modulating mode of modulating electric current flowing through the transfer ratio variable motor so as to reduce steering power of the steering wheel.

According to the first aspect described above, the transfer ratio may be set at the target transfer ratio corresponding to the vehicle speed in the transfer ratio modulating mode, so that the transfer ratio may be quickened by controlling so that the transfer ratio coincides with the target transfer ratio by setting the target transfer ratio small (quicken the ratio) in the low vehicle speed range. In the high vehicle speed range, the transfer ratio may be slowed down by controlling so that the transfer ratio coincides with the target transfer ratio by setting the target transfer ratio large (slow the ratio).

Still more, the steering force of the steering wheel may be reduced by modulating the current flown for driving the transfer ratio variable motor by the transfer ratio modulating mode.

It is also possible to avoid the steering wheel from getting heavy when the driver turns the steering wheel quickly when the ratio is quickened in the low vehicle speed range by reducing the steering reactive force of the steering wheel by switching from the transfer ratio modulating mode to the steering torque modulating mode by the switching section to modulate the current for driving the transfer variable motor.

Although the steering reactive force is influenced by the current flown for driving the transfer ratio variable motor in the switched steering torque modulating mode, the steering reactive force does not get heavy because its current is modulated so as to reduce the steering torque. That is, the steering reactive force does not fluctuate as if it undulates with respect to steering operations of quick-slow-quick for example. Such phenomenon that the steering reactive force increases only in the beginning of the steering operation and the steering operation is likely to be stuck (caught) when the driver starts to turn the steering wheel abruptly with large steering speed does not occur in the mode of regulating the current flown for driving the transfer ratio variable motor.

Thus, the driver will not feel any sense of discomfort in operating the steering wheel.

Preferably, the steering system further includes a first judging section for judging whether or not the steering speed of the steering wheel is greater than a threshold value set in advance (=first preset threshold value) and the switching section switches the transfer ratio modulating mode to the steering torque modulating mode when the steering speed is greater than the first preset threshold value.

According to the arrangement described above, the first judging section can judge that the steering speed of the steering wheel is greater than the first preset threshold value and can make the switching section switch the mode to the steering torque modulating mode when the driver turns the steering wheel quickly when the ratio is quickened in the low vehicle speed range.

Preferably, the steering system also includes a second judging section for judging whether or not the steering torque of the steering wheel is greater than a threshold value set in advance (=second preset threshold value) and the switching section switches the transfer ratio modulating mode to the steering torque modulating mode when the steering torque is greater than the second preset threshold value.

According to the arrangement described above, the second judging section judges that the steering torque of the steering wheel is greater than the second preset threshold value and can make the switching section switch the mode to the steering torque modulating mode when the driver turns the steering wheel quickly when the ratio is quickened in the low vehicle speed range because the steering torque increases due to that.

Still more, preferably the steering system further includes a third judging section for judging whether or not a load of an assist motor that is used for the electric power steering unit and is a source of the auxiliary power is greater than a threshold value set in advance (=third preset threshold value) and the switching section switches the mode to the steering torque modulating mode when the load is greater than the third preset threshold value.

According to the arrangement described above, when the driver quickly turns the steering wheel when the ratio is quickened in the low vehicle speed range, the steering torque increases accordingly and the load of the assist motor of the electric power steering unit rises to increase the auxiliary power. When the load of the assist motor rises, the third judging section judges that the load of the assist motor is greater than the third preset threshold value and makes the switching section change the mode to the steering torque modulating mode.

It is noted that the load of the assist motor may be readily judged by the current flown for driving the assist motor or by duty (DUTY) for driving the assist motor by PWM (Pulse Width Modulation).

According to a second aspect of the invention, the steering system that changes the transfer ratio of the steering angle of the steering wheel to the turning angle of the turning wheel by means of the variable transfer ratio mechanism and generates auxiliary power during steering by means of the electric power steering unit includes the switching section for switching the transfer ratio modulating mode of setting the rotational angle of the transfer ratio variable motor used in the variable transfer ratio mechanism so that the transfer ratio is set at the target transfer ratio corresponding to vehicle speed with the steering torque modulating mode of reducing an electric current for driving the transfer ratio variable motor so as to reduce steering power of the steering wheel, wherein the switching section controls the current value flown to the transfer ratio variable motor so as to change continuously in switching the modes from the transfer ratio modulating mode to the steering torque modulating mode.

According to the second aspect described above, the current value flown to the transfer ratio variable motor is controlled so as to change continuously from that in the transfer ratio modulating mode in switching the modes from the transfer ratio modulating mode to the steering torque modulating mode, so that the steering reactive force does not change abruptly and the driver feels no sense of discomfort.

According to a third aspect of the invention, the steering system further includes a steering operation state information acquiring means for acquiring steering operation state information indicative of an operation state of the steering wheel and the switching section sets a correction factor based on the steering operation state information and a continuous function whose variable is the steering operation state information when the transfer ratio modulating mode is changed to the steering torque modulating mode and sets a second target current value obtained by multiplying a first target current value in the steering torque modulating mode with the correction factor set as described above as a current value to be outputted to the transfer ratio variable motor.

According to the aspect described above, the switching section sets the correction factor based on the acquired steering operation state information and the continuous function whose variable is the steering operation state information and sets the second target current value obtained by multiplying the first target current value in the steering torque modulating mode with the correction factor set as described above as the current value to be outputted to the transfer ratio variable motor, so that the current value flown to the transfer ratio variable motor does not abruptly changes in switching the modes and hence the steering reactive force does not abruptly changes, giving no sense of discomfort to the driver.

Preferably, the steering operation state information in the third aspect described above is either one of steering speed of the steering wheel, a steering torque value or a value of an indicator current to an assist motor used in the electric power steering unit and that is a power source of the auxiliary power.

Because it is possible to control the current value before and after switching the modes from the transfer ratio modulating mode to the steering torque modulating mode and the current value to the transfer ratio variable motor thereafter continuously without jump by using the continuous function whose variable is the steering operation state in setting the correction factor, the steering reactive force does not abruptly change in switching the modes and the driver feels no sense of discomfort. It is possible for example by setting the continuous function so as to be continuously reduced because the larger the steering speed, the larger the steering reactive force is or by setting the correction factor so that the larger the value of the indicator current to the assist motor, the smaller the correction factor becomes.

According to a fourth aspect of the invention, the steering system that changes the transfer ratio of the steering angle of the steering wheel to the turning angle of the turning wheel by means of the variable transfer ratio mechanism and generates auxiliary power during steering by means of the electric power steering unit includes the switching section for switching the transfer ratio modulating mode of setting the rotational angle of the transfer ratio variable motor used in the variable transfer ratio mechanism so that the transfer ratio is set at the target transfer ratio corresponding to vehicle speed with the steering torque modulating mode of reducing an electric current for driving the transfer ratio variable motor so as to reduce steering power of the steering wheel, wherein the switching section controls the current of the transfer ratio variable motor so as not to increase the turning angle of the a previous steering direction when the driver stops steering the steering wheel or turns the steering direction.

According to the fourth aspect described above, even if the driver turns the steering wheel with large steering speed and the actual transfer ratio cannot follow up the target transfer ratio due to the output torque of the transfer ratio variable motor used in the variable transfer ratio mechanism, the turn of the turning wheel in the previous direction is not continued when the driver finishes the steering operation of the steering wheel or switches the steering direction, so that the driver feels no sense of discomfort.

According to a fifth aspect of the invention, the steering system that changes the transfer ratio of the steering angle of the steering wheel to the turning angle of the turning wheel by means of the variable transfer ratio mechanism and generates auxiliary power during steering by means of the electric power steering unit includes a transfer ratio modulating and setting section for setting a rotational angle of the transfer ratio variable motor used in the variable transfer ratio mechanism so that the transfer ratio is set at a target transfer ratio corresponding to vehicle speed and a steering torque modulating and setting section of reducing an electric current for driving the transfer ratio variable motor so as to reduce steering power of the steering wheel, wherein a control amount outputted out of the steering torque modulating and setting section changes continuously.

According to the fifth aspect described above, the steering torque modulating and setting section control so that the current value to the transfer ratio variable motor continuously change, so that no abrupt steering reactive force occurs and the driver feels no sense of discomfort.

As described above, the invention provides the steering system that allows the comfortable wheel steering even if the driver turns the steering wheel quickly when the ratio is quickened in the low vehicle speed range.

BRIEF DESCRIPTION OF THE DRAWINGS

FIG. 12A is a graph showing a temporal transition of steering wheel angular velocity;

FIG. 12B is a graph showing a temporal transition of target current values IT1 and IT2; FIG. 12C is a graph showing a temporal transition of a steering torque value Th:

PREFERRED EMBODIMENTS OF THE INVENTION

Figure 1:
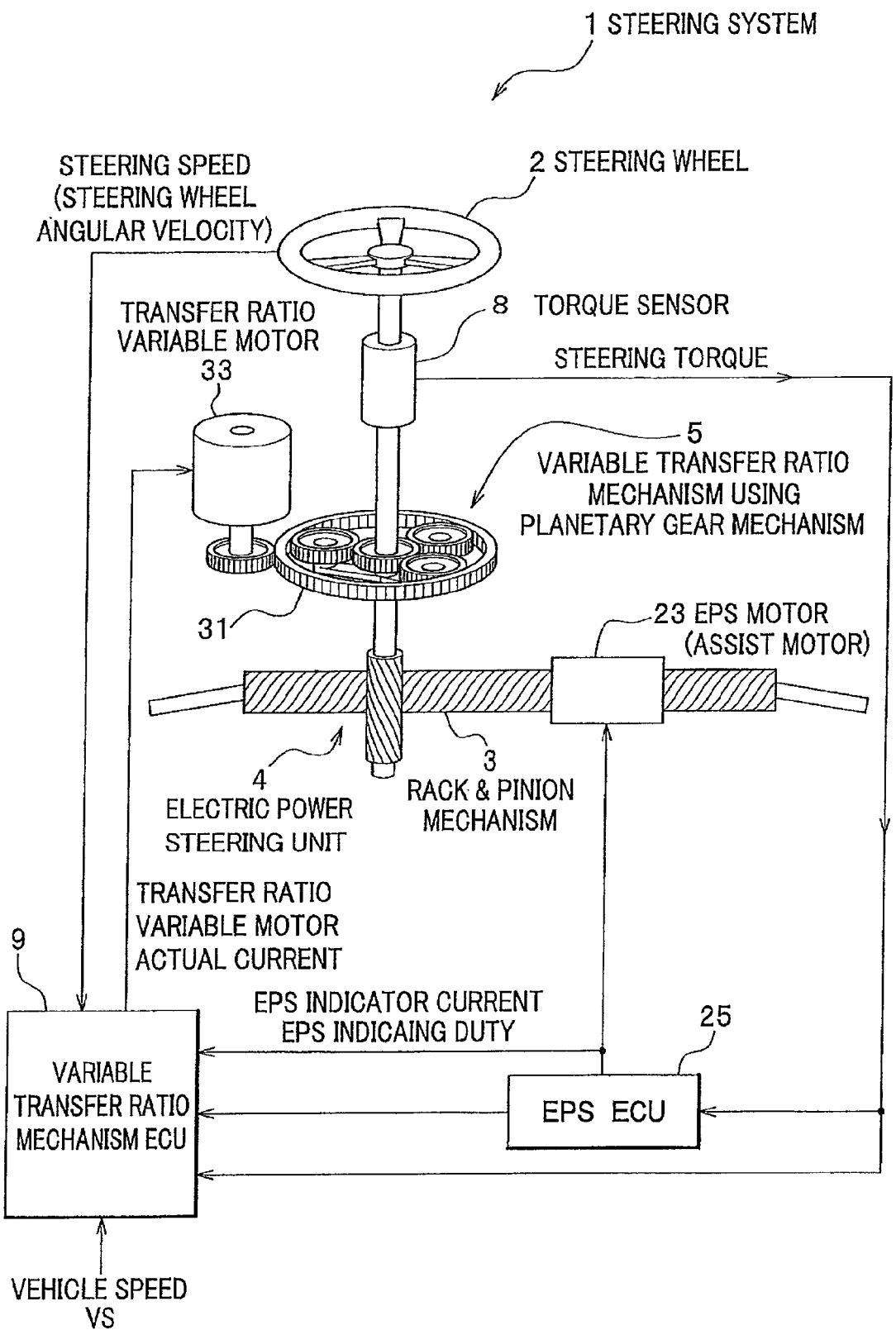
FIG. 1 is a structural view of a steering system according a first embodiment of the invention.

Preferred embodiments of the invention will be explained below in detail with reference to the appended drawings. Note that the same or corresponding components will be denoted by the same reference numerals throughout the drawings and an overlapped explanation thereof will be omitted.

First Embodiment (Steering System)

FIG. 1 shows an overall schematic structure of a steering system 1 according a first embodiment of the invention.

As shown in FIG. 1, the steering system 1 includes a steering wheel 2, a rack & pinion mechanism 3, an electric power steering unit 4, a variable transfer ratio mechanism 5 using a planetary gear mechanism (differential gear) 31 and a torque sensor 8.

The variable transfer ratio mechanism 5 has the planetary gear mechanism 31 as the differential gear linked respectively with a rotary shaft of the steering wheel 2 and a rack & pinion mechanism 3, a transfer ratio variable motor 33 for turning a ring gear of the planetary gear 31 to change a transfer ratio of a steering angle of the steering wheel 2 with respect to a turning angle of a turning wheel not shown and a variable transfer ratio mechanism controlling ECU 9 for controlling the transfer ratio variable motor 33 by flowing actual current for driving the transfer ratio variable motor 33.

The electric power steering unit 4 has the rack & pinion mechanism 3 for changing the turning angle of the turning wheel, an EPS motor (assist motor) 23 for generating the auxiliary power and an EPS ECU 25 for setting an indicator Duty for driving, by way of PWM, an EPS indicator current for driving the EPS motor 23.

The torque sensor 8 is provided between the steering wheel 2 and the planetary gear mechanism 31 so as to be able to directly monitor steering torque applied to the steering wheel 2. The steering torque measured by the torque sensor 8 is inputted to the variable transfer ratio mechanism controlling ECU 9 and the EPS ECU 25 to be used for switching a transfer ratio variable indicator current in the variable transfer ratio mechanism controlling ECU 9 and for determining magnitude of the auxiliary power, i.e., for determining an EPS indicator current specifically.

It is noted that from these facts described above, the variable transfer ratio mechanism controlling ECU 9 may switch the transfer ratio variable indicator current based on the EPS indicator current and the EPS indicator Duty instead of directly using the steering torque because the EPS indicator current and the EPS indicator Duty reflect the steering torque. The variable transfer ratio mechanism controlling ECU 9 may switch them based on the actual current (current sensor measured value) flowing through the EPS motor 23 as a matter of course.

The variable transfer ratio mechanism controlling ECU 9 may also obtain steering speed (steering wheel angular velocity) directly from the steering wheel 2 to use in switching the transfer ratio variable indicator current. Still more, the variable transfer ratio mechanism controlling ECU 9 obtains vehicle speed, sets a target transfer ratio to be small (quicken the ratio) when the vehicle speed is in a low vehicle speed range, sets the target transfer ratio to be large (slow the ratio) when the vehicle speed is in a high vehicle speed range and controls the transfer ratio variable indicator current so that the transfer ratio coincides with the target transfer ratio.

Because the steering wheel 2 is linked to the variable transfer ratio mechanism 5 and the variable transfer ratio mechanism 5 is linked to the electric power steering unit 4, it is possible to superimpose a rotational angle of the transfer ratio variable motor to the steering angle and to increase or decrease an angle of a pinion. The following Equation 1 holds among the angle of the pinion, the angle of the steering wheel and the angle of the transfer ratio variable motor due to a mechanically restrained relationship:

angle of pinion=$k1$×angle of steering wheel+$k2$×angle of transfer ratio variable motor    Eq. 1

Where, coefficients of $k1$ and $k2$ are constants. It can be seen from the Equation 1 that the smaller the angle of variable ratio variable motor, the slower the ratio is and the larger the angle, the quicker the ratio is. Such change and setting of the transfer ratio is carried out in a transfer ratio modulating mode.

Still more, the following Equation 2 holds among torques of the pinion, the steering wheel and the transfer ratio variable motor in a stationary state:

steering torque=$k3$×pinion torque+$k4$×torque of transfer ratio variable motor    Eq. 2

Here, coefficients of $k3$ and $k4$ are constants. It can be seen from the Equation 2 that the lower the torque of the transfer ratio variable motor, the less the steering torque is. The torque of the transfer ratio variable motor may be reduced by reducing the transfer ratio variable indicator current. The driver can operate the steering wheel 2 comfortably without feeling a sense of discomfort because the steering torque may be reduced by reducing the transfer ratio variable indicator current as described above. Such reduction of the transfer ratio variable indicator current is carried out in a steering torque modulating mode.

Figure 2:
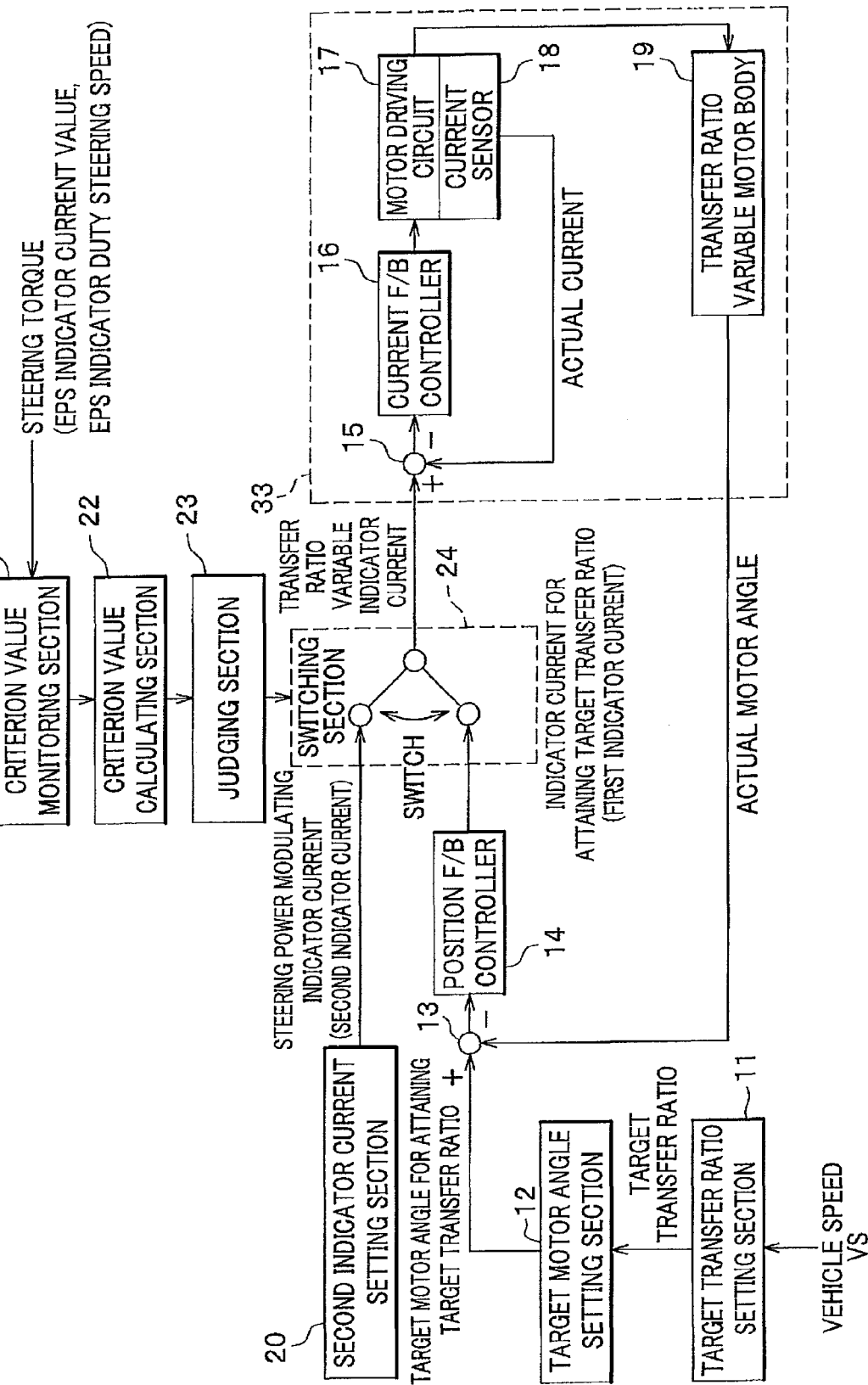
FIG. 2 is a block diagram of a variable transfer ratio mechanism controlling ECU(Electronic Control Unit) and a transfer ratio variable motor according to the first embodiment.

FIG. 2 is a block diagram of the variable transfer ratio mechanism controlling ECU 9 and the transfer ratio variable motor 33. The variable transfer ratio mechanism controlling ECU 9 switches the transfer ratio modulating mode with the steering torque modulating mode. The transfer ratio modulating mode will be explained first and then the steering torque modulating mode will be explained below. A method for switching those modes will be explained in the end.

The transfer ratio modulating mode will now be explained. At first, a target transfer ratio setting section 11 sets a target transfer ratio corresponding to vehicle speed of a vehicle and outputs it to a target motor angle setting section 12. The target transfer ratio setting section 11 sets the target transfer ratio to be small (quickens the ratio) when the vehicle speed is in a low vehicle speed range and sets the target transfer ratio to be large (slows the ratio) when the vehicle speed is in a high vehicle speed range.

Next, the target motor angle setting section 12 sets a target motor angle of the transfer ratio variable motor 33 to attain the inputted target transfer ratio.

A subtracting section 13 subtracts an actual motor angle outputted out of a transfer ratio variable motor body 19 from the target motor angle and inputs a result of the subtraction to a position feedback (F/B) control section 14. The position F/B control section 14 modulates a first indicator current so that the actual motor angle (transfer ratio) coincides with the target motor angle (target transfer ratio) and outputs it to a switching section 24.

The switching section 24 outputs the first indicator current to a subtracting section 15 as a transfer ratio variable indicator current in the transfer ratio modulating mode.

It is noted that the subtracting section 15, an electric current F/B control section 16, a motor driving circuit 17, an electric current sensor 18 and the transfer ratio variable motor body 19 are included in the transfer ratio variable motor 33. The other components, i.e., the target transfer ratio setting section 11, the target motor angle setting section 12, the subtracting section 13, the position F/B control section 14, the switching section 24, a second indicator current setting section 20, a criterion value monitoring section 21, a criterion value calculating section 22, a judging section 23 (correspond to first, second and third judging sections) described later) are included in the variable transfer ratio mechanism controlling ECU 9.

The subtracting section 15 subtracts the actual current for driving the transfer ratio variable motor 19 measured by the current sensor 18 from the transfer ratio variable indicator current and inputs a result of the subtraction to the current F/B control section 16. The current F/B control section 16 modulates the transfer ratio variable indicator current so that the subtraction result is zeroed, i.e., so that the actual current coincides with the transfer ratio variable indicator current, and outputs it to the motor driving circuit 17.

The motor driving circuit 17 supplies the current to the transfer ratio variable motor body 19, so that the transfer ratio variable motor body 19 rotates so that the actual motor angle is obtained. The actual motor angle is outputted out of the transfer ratio variable motor 19 to the subtracting section 13. The current sensor 18 measures the actual current outputted out of the motor driving circuit 17 and outputs a measured value to the subtracting section 15. Thus, the transfer ratio modulating mode enables the transfer ratio (actual motor angle) to be matched with the target transfer ratio (target motor angle) through the feedbacks of the actual motor angle and of the actual current carried out as described above.

Next, the steering torque modulating mode will be explained. The transfer ratio variable indicator current is modulated in the steering torque modulating mode so that the steering power of the steering wheel 2 (see FIG. 1) is reduced.

At first, the second indicator current setting section 20 (see FIG. 2) sets a second indicator current that is smaller than the first indicator current. A method of setting the second indicator current based on the steering speed (steering wheel angular velocity), a method of setting the second indicator current based on the steering torque, a method of setting the second indicator current to a zero value and others may be used for example as a method for setting the second indicator current.

The method of setting the second indicator current based on the steering speed (wheel angular velocity) allows the second indicator current to be set based on the following Equation 3 and viscous resistive force to be given by the variable transfer ratio mechanism 5 (see FIG. 1) using the planetary gear mechanism as steering reactive force in steering the steering wheel. Note that k5 in the Equation 3 is a coefficient.

$$\text{second indicator current} = k5 \times \text{steering wheel angular velocity} \qquad \text{Eq. 3}$$

According to the method of setting the second indicator current based on the steering torque, the second indicator current may be set based on the following Equation 4 and the viscous resistive power may be given by the variable transfer ratio mechanism 5 using the planetary gear mechanism as the steering reactive force in steering of the steering wheel. It is noted that k6 in the Equation 4 is a coefficient.

$$\text{second indicator current} = k6 \times \text{steering torque} \qquad \text{Eq. 4}$$

According to the method of setting the second indicator current to a zero value, the second indicator current may be set based on the following Equation 5. The variable transfer ratio mechanism 5 using the planetary gear mechanism does not operate when the second indicator current becomes the zero value, so that the system becomes equivalent to a system composed of only the electric power steering unit and the variable transfer ratio is changed to a mechanical transfer ratio of only the electric power steering unit. Accordingly, the deficiency of the thrust force of the EPS motor 23 (see FIG. 1) hardly occurs and the steering reactive force is reduced to the same level with that of the vehicle having only the electric power steering unit.

It is noted that the second indicator current may be set without being limited to the specific examples described above if the steering reactive force may be adequately reduced.

$$\text{second indicator current} = 0 \text{ (zero)} \qquad \text{Eq. 5}$$

As described above, the second indicator current setting section 20 sets the second indicator current and outputs it to the switching section 24. The switching section 24 outputs the second indicator current to the subtracting section 15 as the planetary gear mechanism indicator current in the steering torque modulating mode.

The subtracting section 15 subtracts the actual current measured by the current sensor 18 for driving the transfer ratio variable motor body 19 from the planetary gear mechanism indicator current and inputs the subtraction result to the current F/B control section 16. The current F/B control section 16 modulates so that the subtraction result is zeroed, i.e., automatically modulates so that the planetary gear mechanism indicator current coincides with the actual current.

The current sensor 18 measures the actual current supplied to the motor driving circuit 17 and outputs the measured value to the subtracting section 15.

Thus, the second indicator current (planetary gear mechanism indicator current) may match with the actual current because the feedback of the actual current is carried out also in the steering torque modulating mode, so that the actual current may be switched from the first indicator current to the second indicator current. It allows the steering torque to be modulated after reducing the steering torque.

Next, the method for switching the transfer ratio modulating mode with the steering torque modulating mode will be explained.

Firstly, the criterion value monitoring section 21 obtains the steering torque measured by the torque sensor 8 as a criterion value. Instead of the steering torque, the monitoring section 21 may obtain the steering speed, the EPS indicator current value or the EPS indicator Duty representing a load of the EPS motor 23. The criterion value calculating section 22 processes the criterion value and calculates a new criterion value so that the judging section 23 can readily judge.

When the driver steers the steering wheel 2 quickly when the ratio is quickened in the low vehicle speed range, the steering torque increases along that and the judging section 23 judges that the steering torque is greater than a preset threshold value (corresponds to a second preset threshold value) that is the criterion value of the steering torque.

Note that when the criterion value monitoring section 21 obtains the steering speed as the criterion value and when the driver steers the steering wheel 2 quickly, the judging section 23 judges that the steering speed is greater than the preset threshold value (corresponds to a first preset threshold value).

Still more, when the criterion value monitoring section 21 obtains the EPS indicator current value or the EPS indicator Duty representing the load of the EPS motor 23 as the criterion value and when the driver steers the steering wheel 2 quickly, the steering torque increases along that and the load of the EPS motor 23 that is used for the electric power steering unit 4 and generates the auxiliary power increases, so that the judging section 23 judges that the EPS indicator current value or the EPS indicator Duty is greater than the preset threshold value (corresponds to a third preset threshold value).

When the judging section 23 (corresponds to the first, second and third judging sections) judges that the criterion value is greater than the preset threshold value (corresponds to the first, second and third preset threshold values), the switching section 24 switches from the transfer ratio modulating mode to the steering torque modulating mode by switching the planetary gear mechanism indicator current from the first indicator current to the second indicator current.

Figure 3:
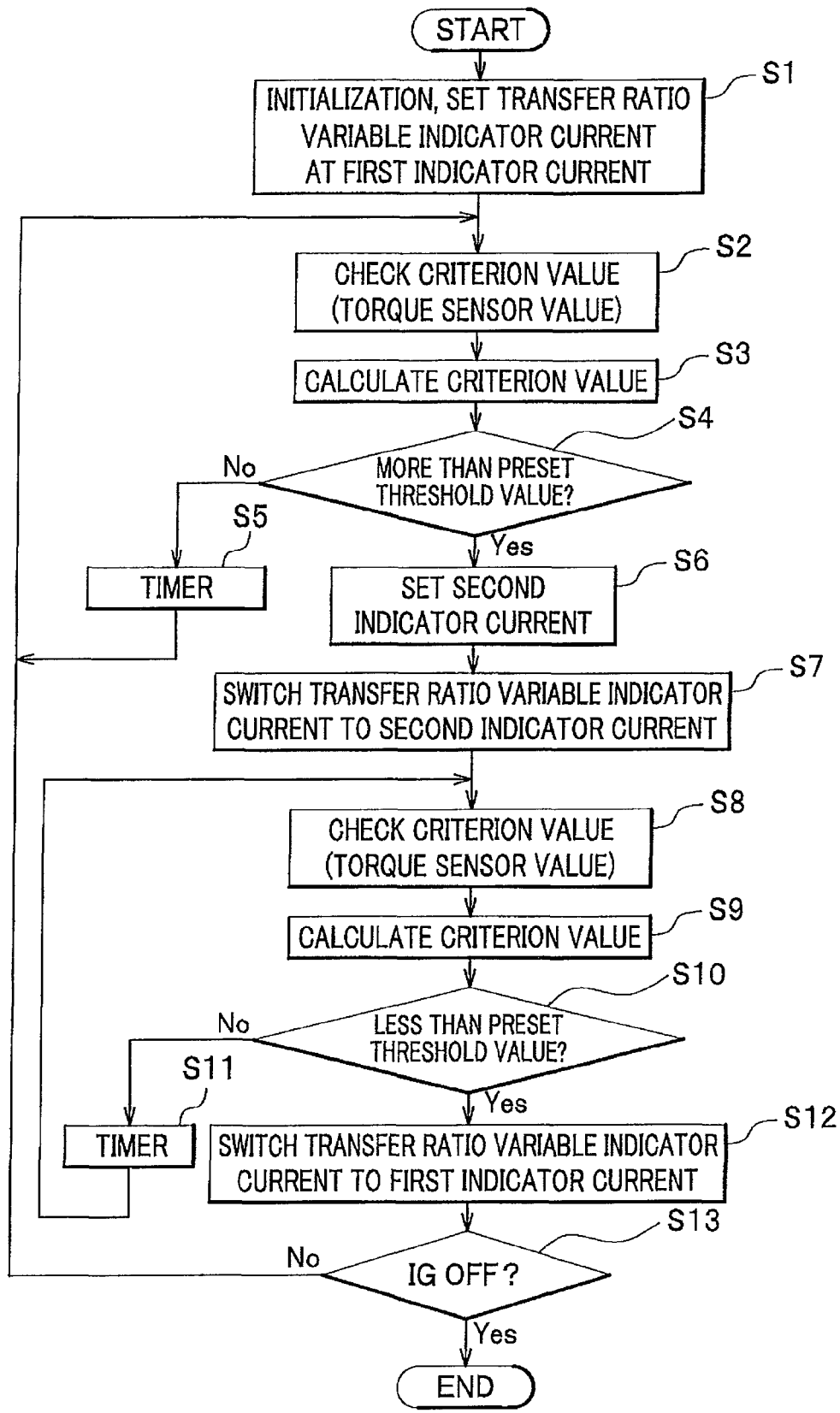
FIG. 3 is a flowchart in switching (mode switching) an transfer ratio variable indicator current according to the first embodiment.

FIG. 3 is a flowchart in switching the planetary gear mechanism indicator current (switching the modes). At first, as an initialization process, the switching section 24 sets the transfer ratio modulating mode by selecting the first indicator current (value) as the planetary gear mechanism indicator current (value) in Step S1.

In Step S2, the criterion value monitoring section 21 checks and obtains the steering torque (torque sensor value) as a criterion value.

Figure 4:
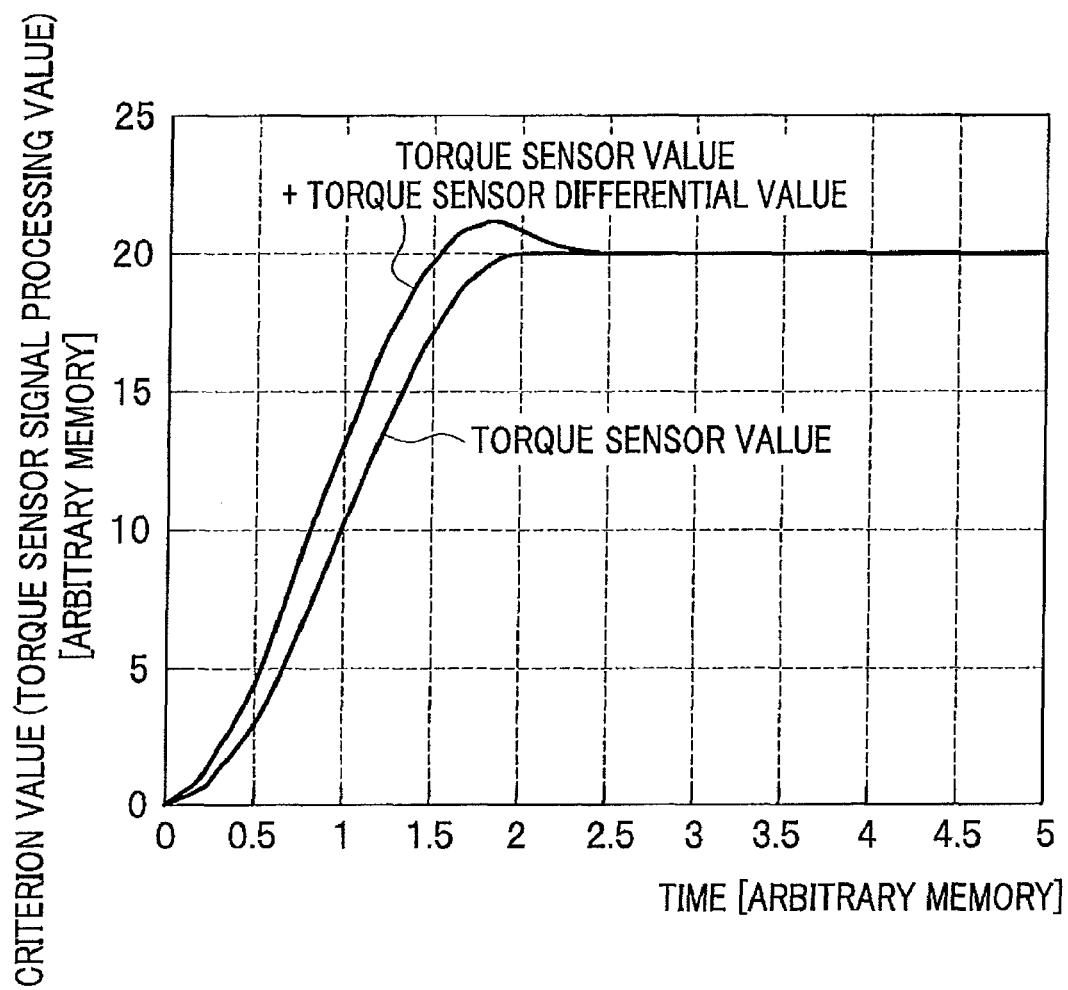
FIG. 4 is a graph showing ascending curves of a torque sensor value that is a criterion value when a steering torque is add to a steering wheel and of a sum of the torque sensor value and a torque sensor differential value according to the first embodiment.

In Step S3, the criterion value calculating section 22 processes the criterion value and calculates a new criterion value so that the judging section 23 may readily make a judgment. For example, the criterion value calculating section 22 uses not only the torque sensor value but also what a torque sensor differential value obtained by temporally differentiating the torque sensor value is added to the torque sensor value is used as the criterion value as shown in FIG. 4. Timing for switching the planetary gear mechanism indicator current may be finely modulated corresponding to the operation of the steering wheel conducted by the driver by adding the torque sensor differential value to the torque sensor value.

Because a rate of change of the torque sensor value is large and the torque sensor differential value increases when the driver turns the steering wheel 2 quickly as compared to a case when the driver turns the steering wheel 2 slowly for example, it is possible to quicken the switching timing because the value reaches to the preset threshold value quickly. Therefore, it is possible to avoid the steering reactive force from becoming heavy ahead of time.

Next, the judging section 23 judges whether or not the criterion value is greater than the preset threshold value in Step S4. If the criterion value is less than the preset threshold value (No in Step S4), the process advances to Step S5 and returns to Step S2 after measuring a predetermined time by the timer, so that the transfer ratio modulating mode is sustained. When the criterion value is more than the preset threshold value (Yes in Step S4), the process advances to Step S6.

Figure 5A:
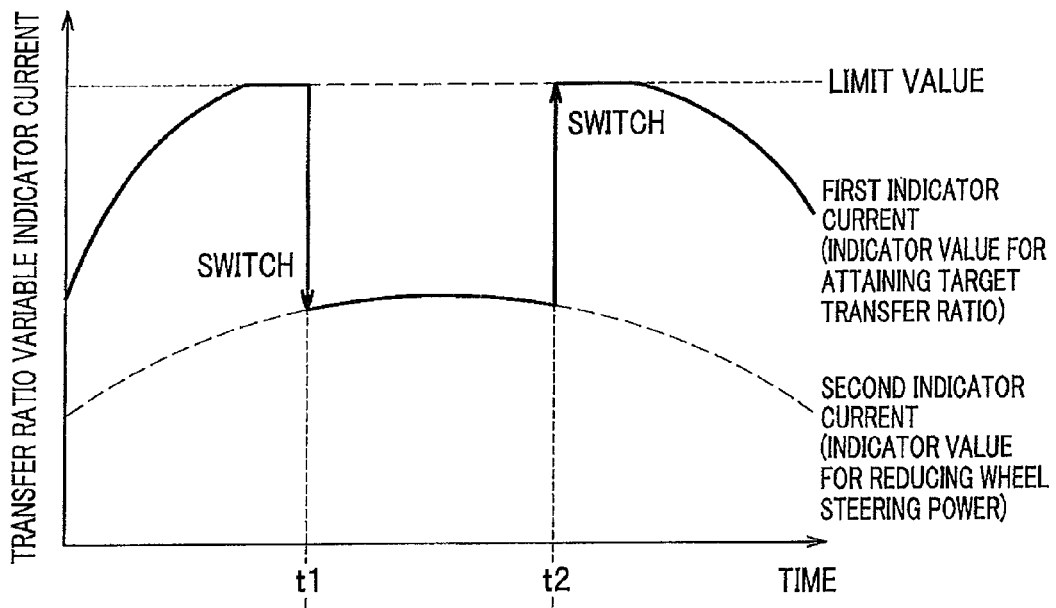
FIG. 5A is a graph showing states in switching the transfer ratio variable indicator currents according to the first embodiment.
Figure 5B:
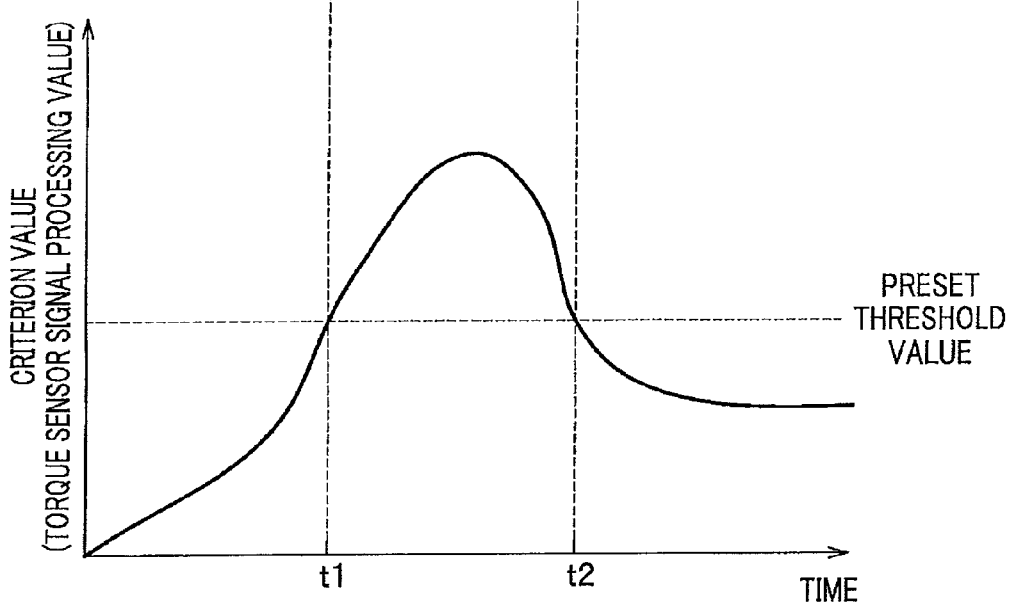
FIG. 5B is a graph showing transition of a criterion value with respect to a preset threshold value (torque sensor signal processing value)

In Step S6, the second indicator current setting section 20 sets (calculates) the second indicator current. In Step S7, the switching section 24 switches the planetary gear mechanism indicator current from the first indicator current to the second indicator current. Specifically, when the criterion value increases more than the preset threshold value at time t1 as shown in FIG. 5B, the planetary gear mechanism indicator current is switched and reduced from the first indicator current to the second indicator current as shown in FIG. 5A. The driver can steer the steering wheel 2 without feeling a sense of discomfort because the steering reactive force does not increase due to the reduction of the planetary gear mechanism indicator current. It is noted that because the electric power steering unit 4 is operative even after an elapse of the time t1, the turning angle of the turning wheel is continuously turned corresponding to steering operation of the driver.

When the driver turns the steering wheel 2 slowly as shown in FIG. 5B, the steering torque drops and becomes less than the preset threshold value at time t2.

Meanwhile, the criterion value monitoring section 21 checks and obtains the steering torque (torque sensor value) as the criterion value again in Step S8. In Step S9, the criterion value calculating section 22 processes the criterion value and calculates a new criterion value so that the judging section 23 can readily make judgment in the same manner with Step S3.

Next, the judging section 23 judges whether or not the criterion value is less than the preset threshold value in Step S10. When the criterion value exceeds the threshold value (No in Step S10), the process advances to Step S11 and returns to Step S8 after measuring a predetermined time by the timer in Step S11. Thus, the steering torque modulating mode is maintained.

When the criterion value is less than the preset threshold value (Yes in Step S10), the process advances to Step S12. Specifically, because the criterion value monitoring section 21 checks the criterion value in Step S8 after an elapse of time t2 as shown in FIG. 5B, the judging section 23 judges that the criterion value is less than the preset threshold value in Step S10 and advances to Step S12.

In Step S12, the switching section 24 switches the planetary gear mechanism indicator current from the second indicator current to the first indicator currents. Specifically, the planetary gear mechanism indicator current is switched from the second indicator current to the first indicator current and increases after an elapse of t2 as shown in FIG. 5A. It becomes possible to control the actual motor angle of the transfer ratio variable motor 33 and to return to the transfer ratio modulating mode similarly to the initialization when the planetary gear mechanism indicator current returns to the first indicator current.

Note that a limit value that specifies an upper limit of the planetary gear mechanism indicator current is provided as shown in FIG. 5A.

Finally, the variable transfer ratio mechanism controlling ECU 9 (see FIG. 1) judges whether or not an ignition switch (IG) is turned OFF in Step S13. If the ignition switch is OFF (Yes in Step S13), this flow of processes ends. When the ignition switch is not OFF (No in Step S13), the process returns to Step S2 to execute the abovementioned procedures.

According to this flow, when the driver steers the steering wheel quickly when the quick ratio is set, the indicator current value applied to the transfer ratio variable motor 33 may be switched from the indicator value for attaining the quick ratio to the indicator value for modulating the steering power so as to become small. Still more, when the driver slows down the steering operation, the indicator current value may be returned to what attains the quick ratio.

Therefore, no such phenomena that the steering wheel gets heavy to steer and that it becomes hard to steer the steering wheel occurs, so that the driver can steer the steering wheel without feeling any sense of discomfort.

Still more, when the driver returns to a normal steering operation, not the quick steering, after switching the indicator current once, the mode returns to the state of following up the indicator current for attaining the quick ratio. Accordingly, the turning angle close to the move of the turning wheel intended by the driver may be realized.

Second Embodiment

Next, a steering system of a second embodiment of the invention will be explained with reference to FIGS. 6 through 9. Note that the second embodiment will be explained mainly on differences thereof from the first embodiment. Still more, although the variable transfer ratio controlling ECU will be denoted as a variable transfer ratio mechanism controlling ECU 9A (see FIG. 7) in the second embodiment as described later, as a variable transfer ratio mechanism controlling ECU 9B (see FIG. 11) in a third embodiment and as a variable transfer ratio mechanism controlling ECU 9C (see FIG. 15) in a fourth embodiment, the ECU will be denoted typically as a variable transfer ratio mechanism controlling ECU 9 here.

Figure 6:
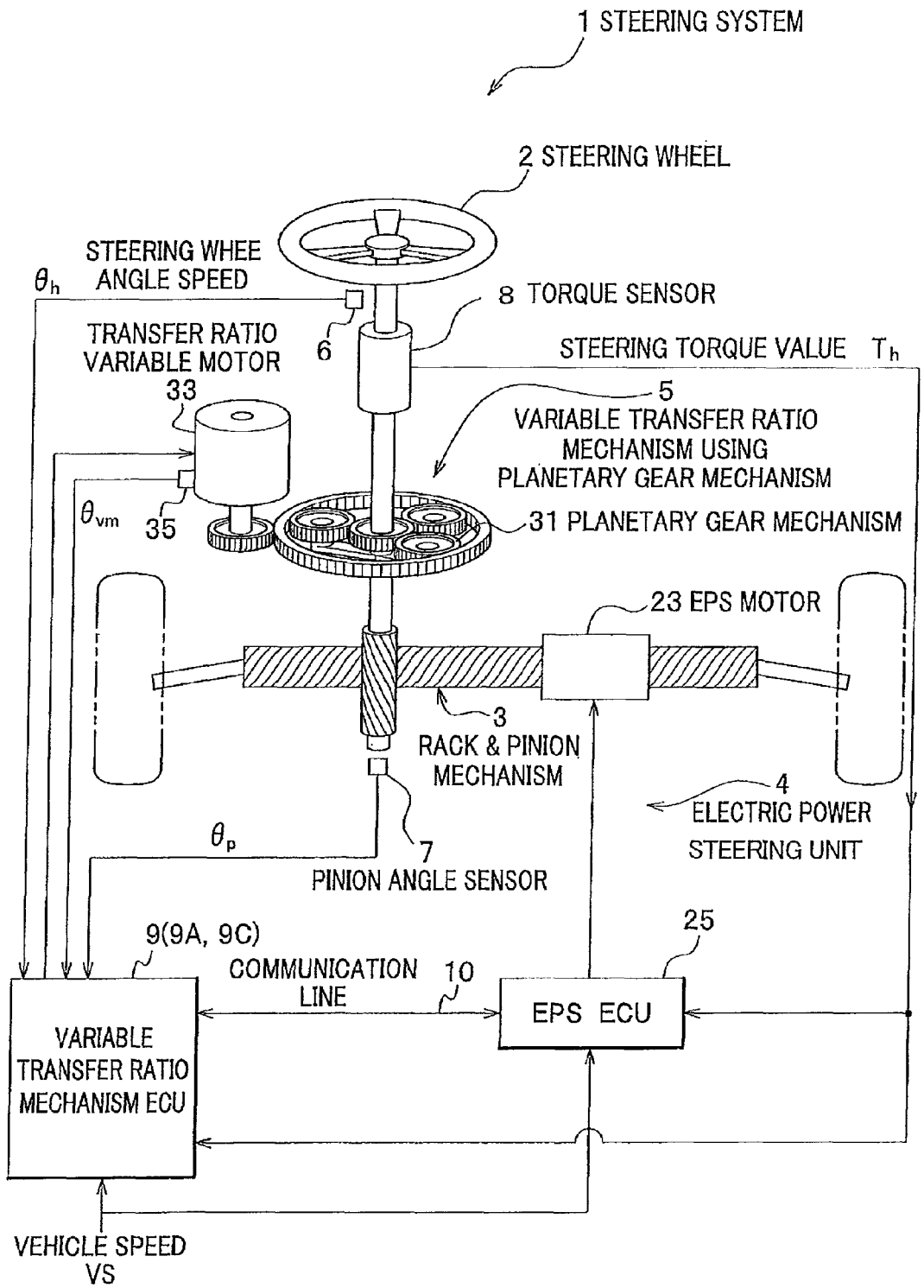
FIG. 6 is an overall structural view of a steering system according a second embodiment of the invention.

As shown in FIG. 6, the torque sensor 8 is provided between the steering wheel 2 and the planetary gear mechanism 31 to detect steering torque applied to the steering wheel 2 and inputs a steering torque value Th to the EPS ECU 25. The torque sensor 8 also inputs the steering torque value Th to the variable transfer ratio mechanism controlling ECU 9A. Specifically, the torque sensor 8 inputs the steering torque value Th to the variable transfer ratio mechanism controlling ECU 9A through a communication line 10 connecting between the variable transfer ratio mechanism controlling ECU 9A and the EPS ECU 25.

A rotary shaft of the steering wheel 2 is connected to a sun gear of the planetary gear mechanism 31 of the variable transfer ratio mechanism 5, a pinion shaft is connected to a carrier and an external gear engaging with a gear fixed to a rotor shaft of the transfer ratio variable motor 33 is provided around an outer periphery of a ring gear.

The transfer ratio variable motor 33 is provided with a motor angle sensor 35 for detecting a rotational angle of its rotor shaft (referred to as an "actual motor angle" hereinafter) $\theta vm$ and its signal is inputted to the variable transfer ratio mechanism controlling ECU 9A.

In the present embodiment, the variable transfer ratio mechanism controlling ECU 9A uses the pinion angle $\theta p$ that is a rotational angle of the pinion shaft uniquely corresponding to the turning angle, instead of the turning angle, in setting the ratio (transfer ratio) G of the steering wheel angle (steering angle) $\theta h$ of the steering wheel 2 to the turning angle of the turning wheel. To that end, a pinion angle sensor 7 for detecting the pinion angle $\theta p$ is provided in a gear box not shown storing the rack & pinion mechanism 3 and its signal is inputted to the variable transfer ratio mechanism controlling ECU 9A.

Still more, vehicle speed VS obtained by a vehicle speed sensor not shown is inputted to the variable transfer ratio mechanism controlling ECU 9A through the communication line 10 for example.

Figure 13:
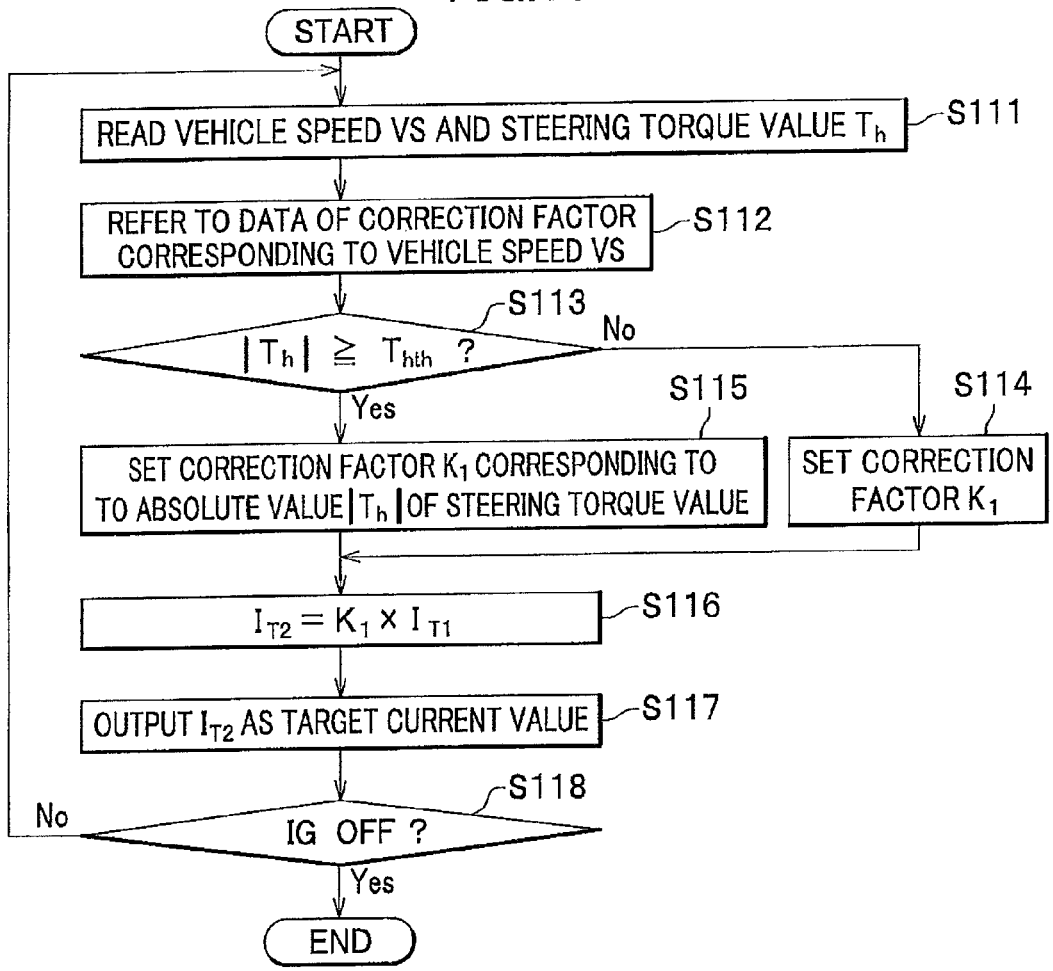
FIG. 13 is a flowchart showing how a transfer ratio modulating mode is switched with a torque modulating mode in the correction factor setting section and a flow for setting a second target current value in the torque modulating mode according to a modified embodiment of the second embodiment.

Then, as shown in FIG. 13, the variable transfer ratio mechanism controlling ECU 9A sets the target transfer ratio GT to be small (quicken the ratio) when the vehicle speed VS is in the low vehicle speed range and to be large (slow the ratio) when the vehicle speed VS is in the high vehicle speed range and controls a target current value for controlling the current flown through the transfer ratio variable motor 33 so that the transfer ratio coincides with the target transfer ratio GT.

The steering wheel 2 is linked to the variable transfer ratio mechanism 5 and the rotation of the pinion shaft outputted out of the variable transfer ratio mechanism 5 is linked with assistance of rotation of the pinion shaft given by the electric power steering unit 4, so that it is possible to increase or decrease the pinion angle $\theta p$ by superimposing the actual motor angle $\theta vm$ of the transfer ratio variable motor 33 to the steering wheel angle $\theta h$. The following relationship holds among the pinion angle $\theta p$, the steering wheel angle $\theta h$ and the actual motor angle $\theta vm$ due to the mechanical restriction:

$$\theta P = \alpha \cdot \theta h + \beta \cdot \theta vm \qquad \text{Eq. 6}$$

Where, $\alpha$ and $\beta$ are constants.

Then, the transfer ratio G is defined by the following equation:

$$G = \theta h / \theta p \qquad \text{Eq. 7}$$

Accordingly, the target pinion angle $\theta TP$ is expressed from the target transfer ratio GT and the steering wheel angle $\theta h$ at that time, as follows:

$$\theta TP = (1/GT)\theta h \qquad \text{Eq. 8}$$

Then, the target motor angle $\theta Tvm$ of the transfer ratio variable motor 33 may be found by the following equation by substituting $\theta TP$ of the Equation 8 instead of $\theta p$ of the Equation 6:

$$\theta Tvm = (1/\beta) \cdot \{(1/GT) - \alpha\}\theta h \qquad \text{Eq. 9}$$

(Variable Transfer Ratio Mechanism Controlling ECU)

Figure 8:
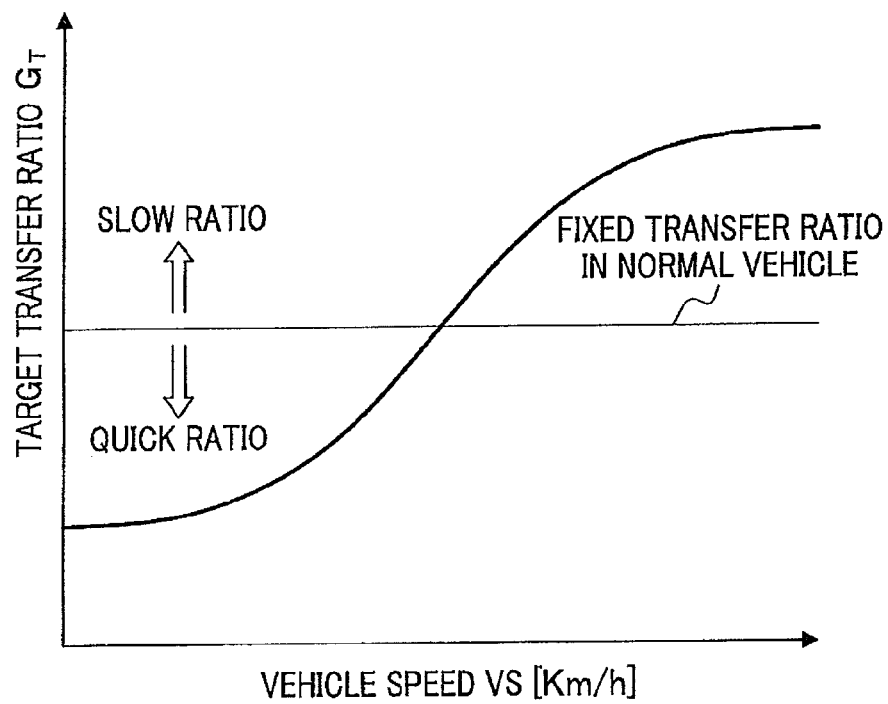
FIG. 8 is a graph indicating a value of a target transfer ratio set corresponding to vehicle speed.
Figure 9:
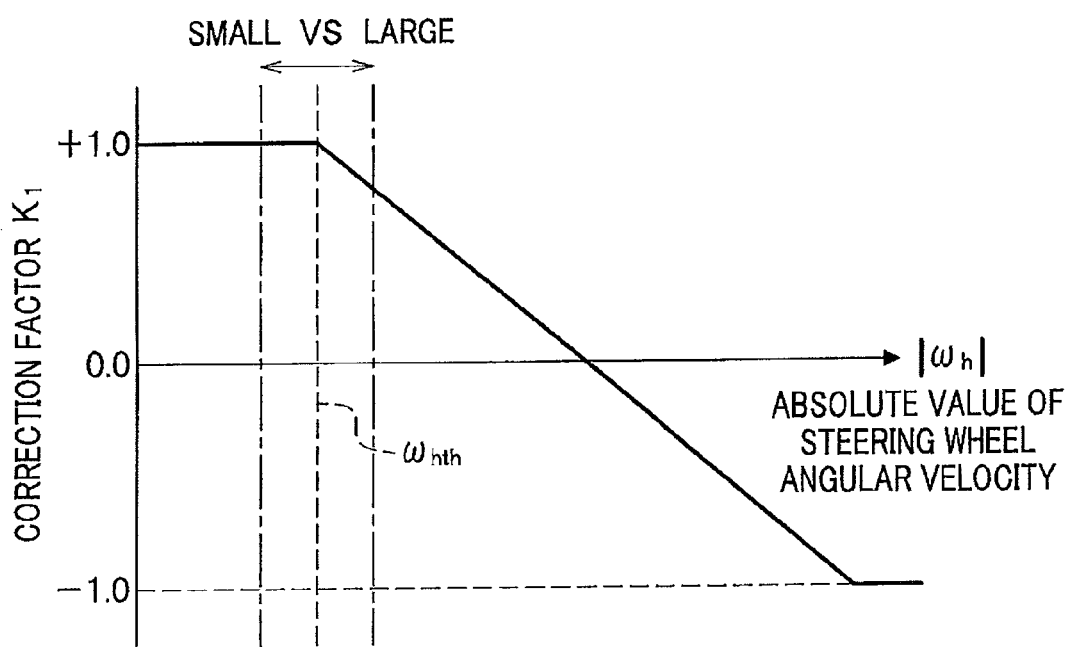
FIG. 9 is a graph indicating a value of a correction factor set corresponding to an absolute value of a steering wheel angular velocity.

Next, the functional structure of the variable transfer ratio mechanism controlling ECU will be explained in detail with reference to FIGS. 7 through 9. FIG. 9 is a graph indicates a value of a correction factor set corresponding to an absolute value of a steering wheel angular velocity.

Figure 7:
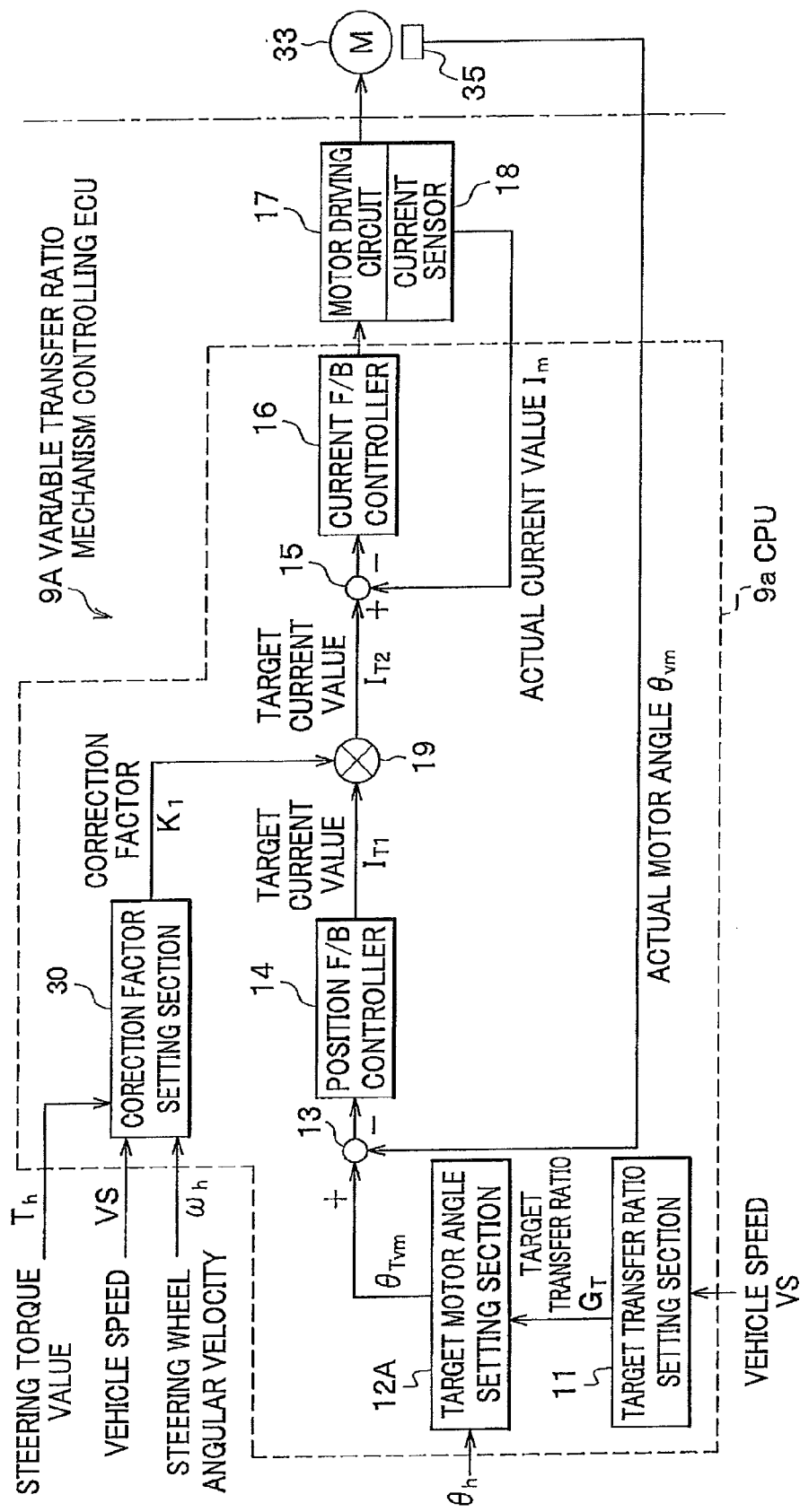
FIG. 7 is a functional structural block diagram of a variable transfer ratio mechanism controlling ECU according to the second embodiment of the invention.

As shown in FIG. 7, the variable transfer ratio mechanism controlling ECU 9A includes the CPU 9a, memories such as a ROM and a RAM not shown, an input/output circuit not shown and the motor driving circuit 17 for feeding power to the transfer ratio variable motor 33 from a battery power source while being controlled by the CPU 9a. The motor driving circuit 17 is provided with the current sensor 18 for detecting an actual current value fed to the transfer ratio variable motor 33.

The ROM described above stores a variable transfer ratio controlling program and data and the CPU 9a executes the program to realize the respective functions shown in the functional structural block diagram of FIG. 7.

By the way, although the functional structural block diagram of FIG. 7 does not shown the steering wheel angle $\theta h$ inputted to the CPU 9a, the CPU 9a has a steering wheel angular velocity calculating section not shown for calculating the steering wheel angular velocity (steering speed) $\omega h$ every second by temporally differentiating the steering wheel angle $\theta h$ and inputting it to a correction factor setting section 30 described later.

The variable transfer ratio mechanism controlling ECU 9A controls the transfer ratio variable motor 33 by switching the two modes of the transfer ratio modulating mode and the steering torque modulating mode. The transfer ratio modulating mode will be explained first and the steering torque modulating mode will be explained after that.

(Transfer Ratio Modulating Mode)

Similarly to the first embodiment, the target transfer ratio setting section 11 sets the target transfer ratio GT corresponding to the vehicle speed VS of the vehicle at first and outputs the ratio to the target motor angle setting section 12A. As shown in FIG. 8, the target motor angle setting section 12A sets the target transfer ratio GT to be small (quicken the ratio) when the vehicle speed VS is in the low vehicle speed range and to be large (slow the ratio) when the vehicle speed VS is in the high vehicle speed range.

Next, the target motor angle setting section 12A calculates and sets the target motor angle $\theta Tvm$ of the transfer ratio variable motor 33 from the current steering wheel angle θh based on the Equation 9 to achieve the inputted target transfer ratio GT.

The subtracting section 13 subtracts the actual motor angle θvm outputted out of the motor angle sensor 35 from the target motor angle θTvm and inputs a subtraction result to the position feedback control section 14 (referred to as the position F/B control section 14 hereinafter). The position F/B control section 14 modulates a target current value (first target current value) IT1 so that the subtraction result is zeroed, that is, so that the actual motor angle θvm coincides with the target motor angle θTvm or the transfer ratio G coincides with the target transfer ratio GT, and outputs it to the multiplying section 19.

Here, the target current value IT1 is provided with a limit value specifying an upper limit of an absolute value.

Using the correction factor K1=1.0 inputted from the correction factor setting section 30 in the transfer ratio modulating mode, the multiplying section 19 outputs a value of the target current value IT1 to the subtracting section 15 as a value of current flown to the transfer ratio variable motor 33 as it is as a target current value (second target current value) IT2.

The function of the correction factor setting section 30 will be detailed in an explanation of the steering torque modulating mode described later.

The subtracting section 15 subtracts the actual current value Im flown to the transfer ratio variable motor 33 and detected by the current sensor 18 from the target current value (second target current value) IT2 and inputs a subtraction result to the current feedback control section 16 (referred to as the current F/B control section 16 hereinafter). The current F/B control section 16 modulates transfer ratio variable indicator current to be outputted to the motor driving circuit 17 so that the subtraction result is zeroed or so that the actual current value Im coincides with the target current value IT2 and outputs the current to the motor driving circuit 17.

When the motor driving circuit 17 supplies driving current to the transfer ratio variable motor 33, the transfer ratio variable motor 33 rotates and changes the actual motor angle θvm. The actual motor angle θvm detected then by the motor angle sensor 35 is outputted to the subtracting section 13.

Thus the feedbacks of the actual motor angle θvm and of the actual current value Im are carried out in the transfer ratio modulating mode, so that it becomes possible to coincide the target motor angle θvm with the target motor angle θTvm. In other words, it is possible to match the transfer ratio G with the target transfer ratio GT.

(Steering Torque Modulating Mode)

Figure 10:
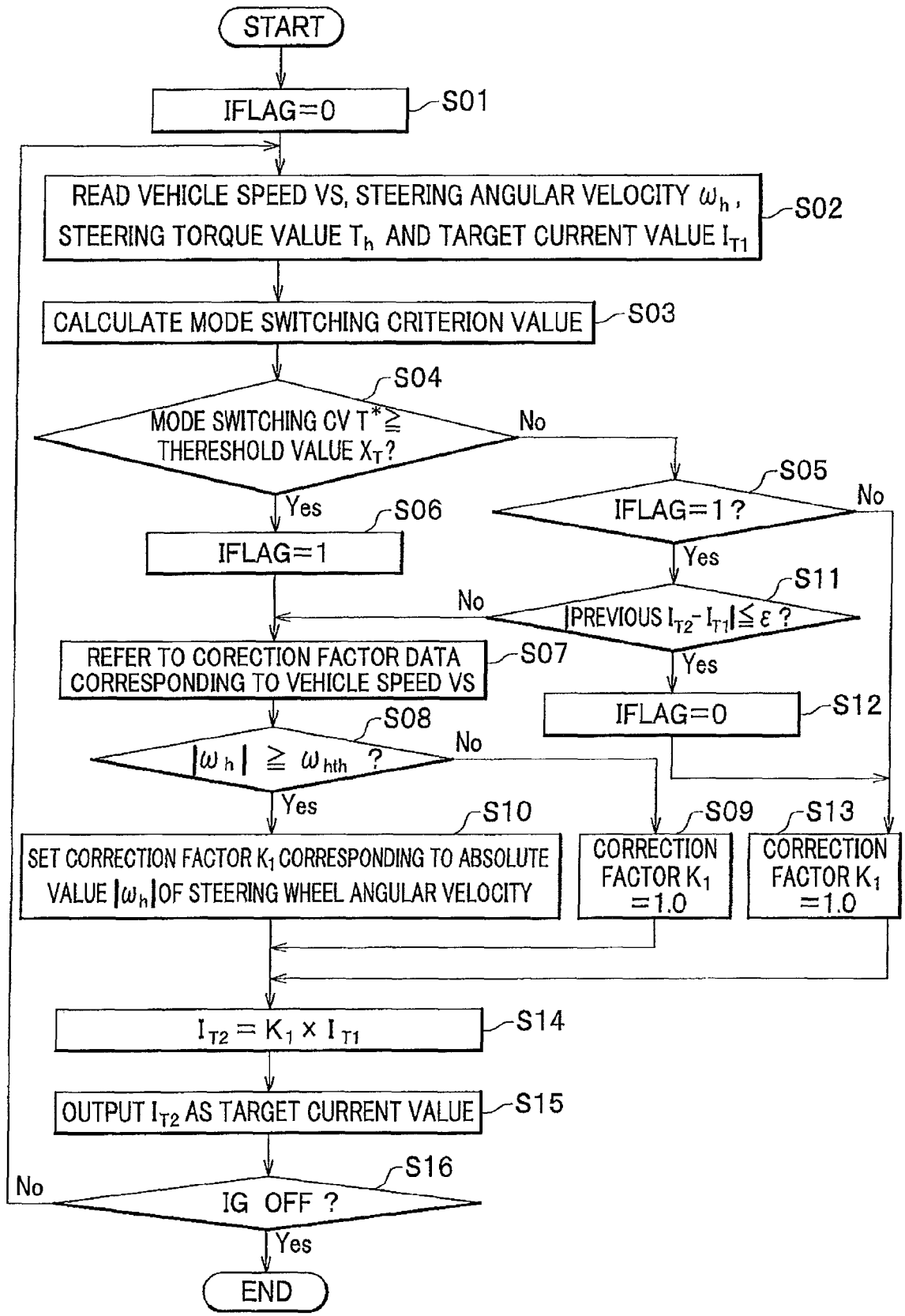
FIG. 10 is a flowchart showing how a transfer ratio modulating mode is switched with a torque modulating mode and a flow for setting a second target current value in the torque modulating mode.

Next, the steering torque modulating mode will be explained with reference to a flowchart in FIG. 10 and to FIGS. 6, 7 and 9 as necessary. FIG. 10 is a flowchart showing flows of controls for switching the transfer ratio modulating mode and the steering torque modulating mode in the correction factor setting section and for setting the second target current value in the steering torque modulating mode.

The steering torque modulating mode is different from the transfer ratio modulating mode described above only in that the correction factor setting section 30 sets the correction factor K1, outputs it to the multiplying section 19 and modulates the transfer ratio variable indicator current so that the steering force of the steering wheel 2 (see FIG. 6) is reduced. The other functions are the same with those of the transfer ratio modulating mode and a part of explanation overlapping with the transfer ratio modulating mode will be omitted here.

At first, the function of the correction factor setting section 30 will be detailed at first. As shown in FIG. 7, the correction factor setting section 30 receives the steering torque value Th from the torque sensor 8, the vehicle speed VS from the vehicle speed sensor not shown and the steering wheel angular velocity ωh. The correction factor setting section 30 calculates a mode switching criterion value described later based on the steering torque value Th. When the calculated mode switching criterion value is equal to or greater than a predetermined threshold value, the correction factor setting section 30 switches the modes from the transfer ratio modulating mode to the steering torque modulating mode and sets the correction factor K1 to the absolute value |ωh| of the steering wheel angular velocity by making reference to data of a continuous function (see FIG. 9) corresponding to the vehicle speed VS stored in the ROM in the steering torque modulating mode.

The continuous function that decides the correction factor K1 whose variable is the absolute value |ωh| of the steering wheel angular velocity (steering operation state information) shown in FIG. 9 has such characteristics that it represents the correction factor K1=+1.0 when the absolute value |ωh| of the steering wheel angular velocity is a value from zero to the predetermined threshold value ωhth, that the correction factor K1 decreases when the value exceeds the predetermined threshold value ωhth and that the correction factor saturates at −1.0 when the value reaches to −1.0.

Permitting a minus value as the correction factor K1 permits the resultant target current value IT2 obtained by the multiplying section 19 by multiplying the correction factor K1 with the target current value IT1 to be reversible from a direction of the target current value IT1. That is, it permits the target motor angle θTvm of the transfer ratio variable motor 33 in the quick ratio direction to be changed to the target motor angle θTvm of the transfer ratio variable motor 33 in the slow ration direction and thus reduces steering reactive force.

Here, the threshold value ωhth changes corresponding to the vehicle speed VS and the value of the threshold value ωhth is set such that the smaller the vehicle speed VS, the smaller the value of the threshold value ωhth is and the larger the vehicle speed VS, the larger the value of the threshold value ωhth is.

This is because the EPS motor 23 of the electric power steering unit 4 has a tendency to be unable to follow up the target transfer ratio GT even if the absolute value |ωh| of the steering wheel angular velocity is small when the degree of the quick ratio is strong because the target transfer ratio GT set by the target transfer ratio setting section 11 is set such that the smaller the vehicle speed VS, the smaller the target transfer ratio GT is, i.e., to the quick ratio side.

It is noted that the inclination of the correction factor K1 in the range in which the absolute value |ωh| of the steering wheel angular velocity exceeds the predetermined threshold value ωhth may be also changed corresponding to the vehicle speed VS.

Next, flows of setting of the correction factor K1 in the correction factor setting section 30 and of control for outputting the target current value IT2 in the multiplying section 19 will be explained with reference to FIG. 10 and to FIG. 7 as necessary.

The correction factor setting section 30 processes steps of the flowchart explained below from Step S01 to Step S13 and the multiplying section 19 processes Steps S14 and S15. By the way, Step S16 is carried out in an overall control of the CPU 9a.

When the ignition switch (IG) is turned on, the variable transfer ratio mechanism controlling ECU 9A starts and the variable transfer ratio mechanism controlling program starts in the CPU 9a (see FIG. 7), the correction factor setting section 30 resets a flag indicating whether a mode state is that of the transfer ratio modulating mode (IFLAG=0) or of the steering torque modulating mode (IFLAG=1) and sets the flag of the transfer ratio modulating mode as an initial setting (Step S01, IFLAG=0). Then, the correction factor setting section 30 repeatedly processes Steps S02 through S16 with a certain cycle thereafter.

The correction factor setting section 30 reads the vehicle speed VS, the steering wheel angular velocity ωh, the steering torque value Th, and the target current value IT1 outputted out of the position F/B control section 14 in Step S02.

In Step S03, the correction factor setting section 30 calculates the mode switching criterion value T* based on the steering torque value Th. The correction factor setting section 30 does not use the absolute value of the steering torque value Th as it is as the mode switching criterion value T* and uses the absolute value of a value to which a steering torque differential value obtained by temporally differentiating the steering torque value Th is added to the absolute value of the steering torque value Th as the mode switching criterion value T* for example. It becomes possible to finely modulate switching timing of the transfer ratio variable indicator current from the transfer ratio modulating mode to the steering torque modulating mode corresponding to the steering operation of the driver by adopting the absolute value of the value obtained by adding the steering torque differential value to the steering torque value Th as the mode switching criterion value T*.

That is, it becomes possible to detect the quick steering operation and to switch to the steering torque modulating mode at point of time earlier than reaching to the threshold value XT of the mode switching criterion value T* of the absolute value of the steering torque value Th that sharply rises due to the quick steering operation of the steering wheel 2.

This is carried out for the sake of quickly switching from the transfer ratio modulating mode to the steering torque modulating mode so as to be able to flexibly deal with conditions when the auxiliary force of the EPS motor 23 cannot swiftly follow because force necessary for the turning wheel to turn may differ depending on such road surface conditions whether it is dried or wet or paved or not even if the vehicle speed VS is low and the steering wheel angular velocity ωh is the same.

It becomes possible to quickly avoid the steering reactive force from abruptly becoming heavy by arranging as described above.

The correction factor setting section 30 checks whether or not the mode switching criterion value T* calculated in Step S03 is greater than the threshold value XT in Step S04. When the mode switching criterion value T* is greater than the threshold value XT (Yes in Step S04), the process advances to Step S06 and when the mode switching criterion value T* is less than the threshold value XT (No in Step S04), the process advances to Step S05.

In the beginning, the driver does not steer the steering wheel 2 or the absolute value of the steering wheel angular velocity ωh is small even if the driver steers the steering wheel, so that the absolute value (mode switching criterion value) T* of the value obtained by adding the steering torque value Th with the steeling torque differential value is less than the threshold value XT and the process advances to Step S05.

The correction factor setting section 30 checks whether or not IFLAG=1 in Step S05. The process advances to Step S11 when IFLAG=1 (Yes in Step S05) and to Step S13 when IFLAG≠1 (No in Step S05). Here, the process advances to Step S13 because IFLAG=0 in Step S01 and advances further to Step S14 by setting the correction factor K1=1.0.

In Step S14, the multiplying section 19 multiplies as IT2=K1×IT1 and outputs IT2 to the subtracting section 15 (see FIG. 7) as a target current value (Step S15). Then, the process advances to Step S16 to check whether or not the ignition switch is turned off (IG OFF?). The series of the control ends when the ignition switch is turned off (Yes in Step S16) or the process returns to Step S02 when the ignition switch is not turned off (No in Step S16) and repeats Steps S02 through S16.

When the check in Step S04 is Yes and the process advances to Step S06, the correction factor setting section 30 puts up the flag indicating the steering torque modulating mode as IFLAG=1 and refers to the data of the correction factor corresponding to the vehicle speed VS read in Step S02 in Step S07. Specifically, several kinds of continuous functions whose variable is the absolute value |ωh| of the steering wheel angular velocity that decides the correction factor K1 as shown in FIG. 9 are prepared for different predetermined vehicle speeds VS and the correction factor setting section 30 obtains a desirable continuous function by interpolating corresponding to the value of the vehicle speed VS read in Step S02.

The correction factor setting section 30 checks whether or not the absolute value |ωh| of the steering wheel angular velocity is greater than the threshold value ωhth in Step S08. The process advances to Step S10 when the absolute value is greater than the threshold value ωhth (Yes in Step S08) or advances to Step S09 when the absolute value is less than the threshold value ωhth (No in Step S08).

In this case, assuming that the absolute value has not reached to the threshold value ωhth, the process advances to Step S09 to set the correction factor K1=1.0 and then advances to Step S14. After that, the process advances to Steps S14 through S16 and returns to Step S02 to repeat Steps S02 through S16.

When the check in Step S08 is Yes and the process advances to Step S10, the correction factor setting section 30 sets the correction factor K1 corresponding to the absolute value |ωh| of the steering wheel angular velocity read in Step S02 based on the desirable continuous function that decides the correction factor K1 and that has been obtained by making reference to Step S08, or more specifically, that has been obtained by interpolating corresponding to the value of the vehicle speed VS. Then the process advances to Steps S14 through S16. Steps S02 through S16 are repeated by returning to Step S02.

When Step S04 is No and the process advances to Step S05 in the repetition of the series of Steps S02 through S16 after once becoming the state of IFLAG=1, Step S5 becomes Yes and the process advances to Step S11.

In Step S11, the correction factor setting section 30 checks whether or not an absolute value of a difference between the previous target current value IT2 in this series of repetition and the target current value IT1 read in Step S02 this time (|previous IT2-IT1|) is smaller than the threshold value ε.

When the absolute value exceeds the threshold value ε (i.e., Yes), it means that the it has been judged that steering torque modulating mode is continuing and the process advances to Step S07 to repeat Steps S07 through S16.

When the absolute value is less than the threshold value ε (i.e., No), it means that it has been judged that the steering torque modulating mode has finished and the process advances to Step S12 to set IFLAG=0 (transfer ratio modulating mode). Then, the process advances to Step S13 and further to Steps S14 through S16 and returns to Step S02 to repeat Steps S02 through S16.

By the way, the threshold value ε is such a value that gives no feeling of jump of the steering torque reactive force to the driver.

The series of control flow of the correction factor setting section 30 for setting the correction factor K1 and of the multiplying section 19 for outputting the target current value IT2 has been described above.

Here, Step S02 of the flowchart of the present embodiment corresponds to steering operation state information obtaining means and Steps S03 through S05 and S11 correspond to switching means.

Figure 11:
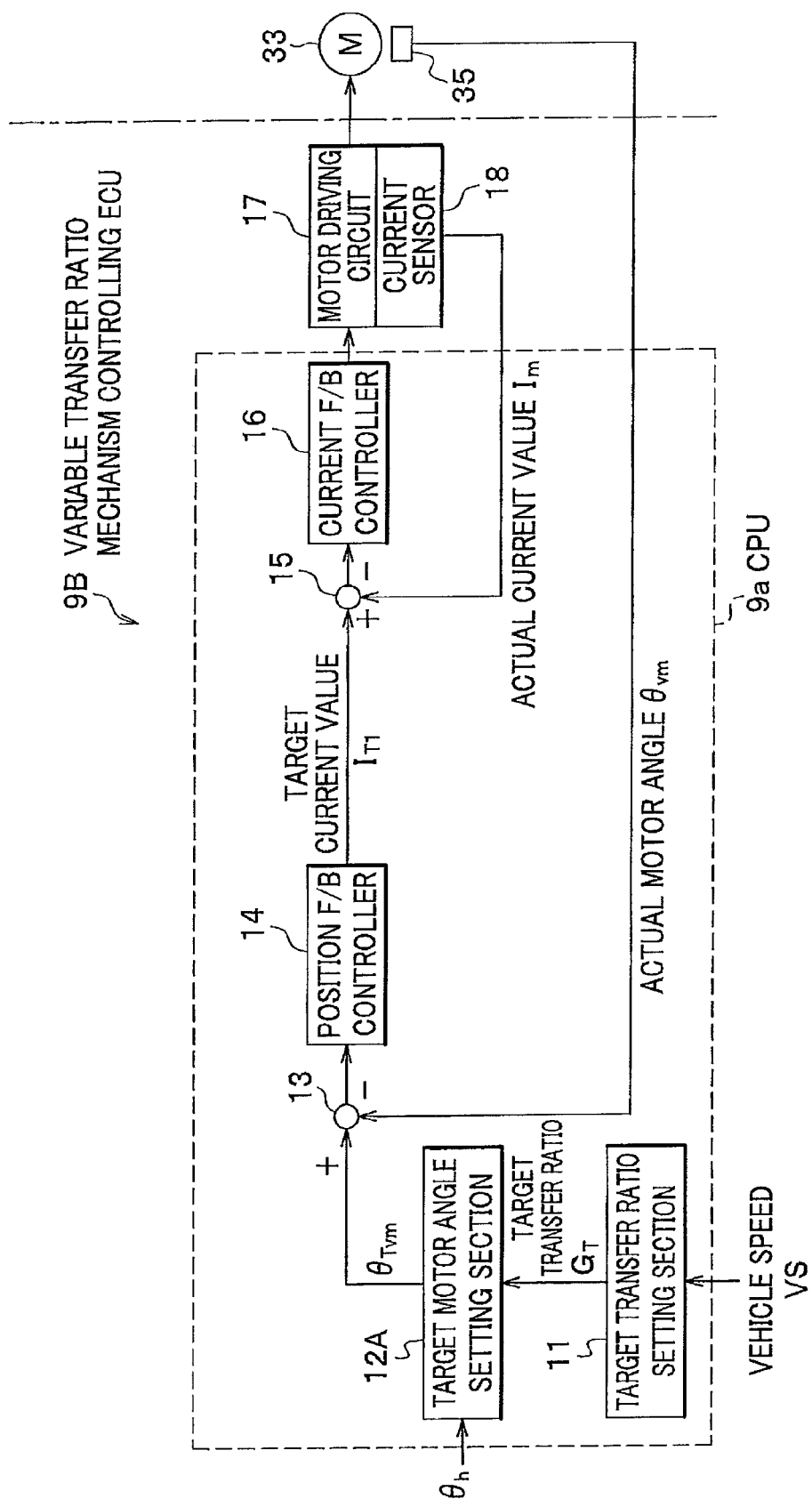
FIG. 11 is a functional structural block diagram of the variable transfer ratio mechanism controlling ECU according to a comparative example.

Next, an effect of the control made by the variable transfer ratio mechanism controlling ECU 9A of the present embodiment will be explained by comparing with the variable transfer ratio mechanism controlling ECU 9B, i.e., a comparative example, having no correction factor setting section 30 and multiplying section 19 as shown in FIG. 11.

FIG. 12A is a graph showing a temporal transition of the steering wheel angular velocity ωh, FIG. 12B is a graph showing a temporal transition of the target current value IT1 and the target current value IT2 and FIG. 12C is a graph showing a temporal transition of the steering torque value Th.

When the steering wheel angular velocity ωh in FIG. 12A increases in a positive direction, the mode switching criterion value T* exceeds the threshold value XT at time t1A and the absolute value |ωh| of the steering wheel angular velocity exceeds the threshold value ωhth at time t1B, the target current value IT2 starts to decrease with respect to the target current value IT1 when the absolute value of the steering wheel angular velocity ωh exceeds the threshold value X hth even though the target current values IT2 and IT1 have been the same value until then in the present embodiment. This example shows that the absolute value of the steering wheel angular velocity ωh exceeds the threshold value ωhth at the time t1B soon after passing the time t1A and the correction factor K1 of the value corresponding to the absolute value |ωh| of the steering wheel angular velocity has become less than 1.0. After that, the driver continues the additional steering operation and the steering wheel angular velocity ωh increases. Corresponding to that, the target current value IT2 sharply decreases and becomes minus that reverses the target motor angle θTvm in an opposite direction from what has been until then (slow ratio direction) in the end.

When the steering wheel angular velocity ωh decreases with a positive value after that, the correction factor K1 gradually approaches to 1.0. That is, the target current value IT1 and the target current value IT2 become closer to each other. The modes are switched from the steering torque modulating mode to the transfer ratio modulating mode at time t2 where an absolute value of the difference of the current values becomes less than the threshold value ε and the value of the target current value IT2 returns to the same value with that of the target current value IT1 thereafter.

As a result, while the target current value IT1 of FIG. 12B is inputted to the subtracting section 15 and the current F/B control section 16 generates the transfer ratio variable indicator current, resulting in a temporal transition of the steering torque value Th (steering reactive force) as indicated by a broken line in FIG. 12C, the present embodiment brings about a temporal transition of the steering torque value Th (steering reactive force) that changes moderately as shown by a solid line in FIG. 12C. Accordingly, it gives no such feeling of discomfort to the driver as an abrupt increase of the steering reactive force that occurs when the auxiliary power of the EPS motor 23 (see FIG. 6) cannot follow up the increase of the absolute value |ωh| of the steering wheel angular velocity and of the phenomenon that the steering reactive force fluctuates as if it undulates with respect to such operations of quick-slow-quick steering operations of the steering wheel 2. Still more, because the states are switched from the steering torque modulating mode to the transfer ratio modulating mode after reducing the absolute value of the difference between the target current value IT1 and the target current value IT2, the driver feels no feeling of jump of the steering reactive force.

In short, according to the present embodiment, when the driver quickly steers the steering wheel 2 when the quick ratio is set, the indicator current value given to the transfer ratio variable motor 33 may be changed from that for attaining the quick ratio to that for modulating the steering reactive force to be small. It is also possible to return the indicator current value to that for attaining the quick ratio when the driver returns to the moderate steering operation.

Still more, because the mode returns to that for controlling the indicator current value for attaining the quick ratio when the steering operation of the steering wheel 2 returns to the normal operation from the quick steering operation after switching once to the mode for controlling the indicator current value of the torque modulating mode, it is possible to realize a turning angle close to a move of the turning wheel intended by the driver.

The technology described in the patent document 1 described above, i.e., JP 2000-344120A is a method of obtaining a target transfer ratio GT by multiplying a correction factor obtained corresponding to an absolute value |ωh| of steering wheel angular velocity or an absolute value |Th| of a steering torque value with a target transfer ratio GT set by the target transfer ratio setting section 11 corresponding vehicle speed VS. Then, it calculates a target motor angle θTvm from the corrected target transfer ratio GT and generates a control signal to a deviation between the actual motor angle vm and the target motor angle θTvm to control the transfer ratio variable motor 33.

Limiting to the action of the variable transfer ratio mechanism 5, the steering reactive force essentially changes directly in connection with the control signal (the target current values IT1 and IT2 in the present embodiment) generated with respect to the deviation between the actual motor angle θvm and the target motor angle θTvm and relates indirectly with the target transfer ratio GT, so that the present embodiment is more effective in directly controlling the steering reactive force. Accordingly, response characteristic of the present embodiment is better than that of the technology described in the Patent Document 1 in directly suppressing the abrupt increase of the steering reactive force during the quick ratio.

Modified Embodiment of the Second Embodiment

Next, a modified embodiment of the second embodiment will be explained with reference to FIGS. 13 and 14.

Although the mode switching control has been carried out by using the mode switching criterion value T* in the second embodiment described above, the invention is not limited to that.

For example, the present modified embodiment uses the steering torque value Th that is the steering operation state information as a parameter for switching the transfer ratio modulating mode and the torque modulating mode and as a variable of the continuous function deciding the correction factor K1. Flows of controls of the correction factor setting section 30 for setting the correction factor K1 and of the multiplying section 19 for outputting the target current value IT2 in the present modified embodiment will be explained below.

Note that although the function whose variable is the steering wheel angular velocity ωh has been used as the continuous function for calculating the correction factor K1 in the present embodiment described above, the invention is not limited to that. A continuous function whose variable is the steering torque value Th as shown in FIG. 14, the indicator current generated by the EPS ECU 25 of the EPS motor 23 or a DUTY signal generated by the indicator current may be used in the modified embodiment of the present embodiment as described below.

FIG. 13 is a flowchart showing flows of controls of the correction factor setting section for switching the modes between the transfer ratio modulating mode and the torque modulating mode and of setting the second target current value in the torque modulating mode. FIG. 14 is a graph showing a value of the correction factor set corresponding to an absolute value of the steering torque value.

The correction factor setting section 30 processes Steps S111 through S115 and the multiplying section 19 processes Steps S116 and S117 in the flowchart described below. By the way, the CPU 9a carries out Step S118 in a whole control.

When the ignition switch (IG) is turned on, the variable transfer ratio mechanism controlling ECU 9A starts and the CPU 9a (see FIG. 7) starts the variable transfer ratio mechanism controlling program, Steps S111 through S118 are repeatedly processed at certain cycles.

The correction factor setting section 30 reads the vehicle speed VS and the steering torque value Th in Step S111.

The correction factor setting section 30 refers to the data of correction factor corresponding to the vehicle speed VS read in Step S111. Specifically, several kinds of continuous functions whose variable is an absolute value |Th| of a steering torque value that decides a correction factor K1 as shown in FIG. 14 are prepared for different predetermined vehicle speeds VS and the correction factor setting section 30 obtains a desirable continuous function by carrying out interpolation corresponding to a value of the vehicle speed VS read in Step S111.

Figure 14:
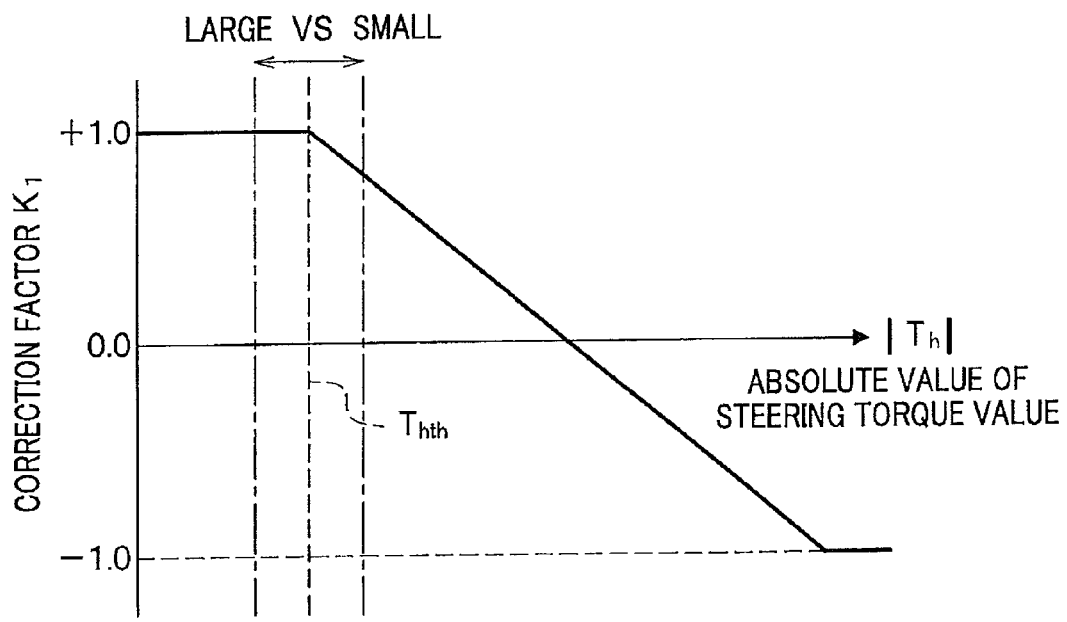
FIG. 14 is a graph indicating a value of a correction factor set corresponding to an absolute value of a steering torque value.

The continuous function that decides the correction factor K1 whose variable is the absolute value |Th| of the steering torque value (steering operation state information) shown in FIG. 14 has such characteristics that it represents the correction factor K1=+1.0 when the absolute value |Th| of the steering torque value is a value between zero and a predetermined threshold value Thth, that the correction factor K1 decreases when the value exceeds the predetermined threshold value Thth and that the correction factor saturates at −1.0 when the value reaches to −1.0.

Permitting a minus value as the correction factor K1 permits the resultant target current value IT2 obtained from the multiplying section 19 by multiplying the correction factor K1 with the target current value IT1 to be reversible from a direction of the target current value IT1. That is, it permits the target motor angle θTvm of the transfer ratio variable motor 33 in the quick ratio direction to be changed to the target motor angle θTvm of the transfer ratio variable motor 33 in the slow ration direction and thus reduces steering reactive force.

Here, the threshold value Thth changes corresponding to the vehicle speed VS and the value of the threshold value Thth is set such that the smaller the vehicle speed VS, the larger the value of the threshold value Thth is and the larger the vehicle speed VS, the smaller the value of the threshold value Thth is.

This is because the target transfer ratio GT set by the target transfer ratio setting section 11 is set such that the smaller the vehicle speed VS, the smaller the target transfer ratio GT is, i.e., to the quick ratio side, the stronger the degree of the quick ratio, the larger the absolute value |Th| (steering reactive force) of the steering torque value is and the driver may bodily sense such tendency.

It is noted that an inclination of the correction factor K1 in the range in which the absolute value |Th| of the steering torque value exceeds the predetermined threshold value Thth may be also changed corresponding to the vehicle speed VS.

In Step S113, the correction factor setting section 30 checks whether or not the absolute value |Th| of the steering torque value is greater than the threshold value Thth and advances to Step S115 when the value is greater than the threshold value Thth (Yes) or to Step S114 when the value is less than the threshold value Thth (No).

In Step S114, the correction factor setting section 30 sets the correction factor K1=1.0 and advances to Step S116. In Step S116, the correction factor setting section 30 sets as IT2=K1×IT1 and outputs IT2 as a target current value to the subtracting section 15 (see FIG. 15) in Step S117. Then, the process advances to Step S118 to check if the ignition switch is turned off (IG OFF?). If the ignition switch is turned off (Yes), the series of control is finished and if the ignition switch is not turned off, the process returns to Step S111 to repeat Steps S111 through S118.

When Step S113 is Yes and the process advances to Step S115, the correction factor setting section 30 sets the correction factor K1 corresponding to the absolute value |Th| of the steering wheel angular velocity read in Step S111 based on the desirable continuous function that decides the correction factor K1 and that has been obtained by carrying out the interpolation by making reference to the value of the vehicle speed VS in Step S112. Then the process advances to Steps S116 through S118 and returns to S111 to repeat Steps S0111 through S118.

Here, Step S111 of the flowchart of the present modified embodiment corresponds to steering operation state information obtaining means and Step S113 corresponds to switching section in Claims.

According to the present modified embodiment, when the driver quickly steers the steering wheel 2 when the quick ratio is set, the correction factor setting section 30 sets the correction factor K1 in the torque modulating mode based on the steering torque value Th and the multiplying section 19 sets the target current value IT2 by multiplying the correction factor K1 to the target current value IT1. It results in the temporal transition of the steering torque value Th (steering reactive force) that changes moderately as indicated by the solid line in FIG. 12C. Accordingly, it gives no such feeling of discomfort to the driver as an abrupt increase of the steering reactive force that occurs when the auxiliary power of the EPS motor 23 (see FIG. 6) cannot follow up the increase of the absolute value |ωh| of the steering torque value and the phenomenon that the steering reactive force fluctuates as if it undulates with respect to such operations of quick-slow-quick steering operations of the steering wheel 2.

Still more, because steering torque value Th is used for the both of switching between the transfer ratio modulating mode and the torque modulating mode and of setting the value less than 1.0 of the correction factor K1, switching between the transfer ratio modulating mode and the torque modulating mode may be carried out smoothly. Further, the correction factor K1 continuously changes even when the modes are changed from the transfer ratio modulating mode to the torque modulating mode, it is possible to suppress an abrupt increase of the steering reactive force caused when the steering wheel 2 is operated quickly in the quick ratio state without causing any abrupt change of the steering reactive force.

The steering operation state information of the present modified embodiment is not limited to the steering torque value Th and the indicator current generated by the EPS ECU 25 of the EPS motor 23 or the DUTY signal generated by the indicator current that behave and change substantially in the same manner with the steering torque value Th may be also used.

The steering wheel angular velocity $\omega h$ may be also used as the parameter used in switching the transfer ratio modulating mode and the torque modulating mode as the steering operation state information described above in the present modified embodiment. A continuous function whose variable is an absolute value $|\omega h|$ of the steering wheel angular velocity and is used in deciding the correction factor K1 in this case is what has been explained in connection with FIG. 9 in the second embodiment described above. The method for setting the threshold value $\omega hth$ that sets the correction factor K1 of the continuous function to a value of 1.0 in the transfer ratio modulating mode and to a value of less than 1.0 in the torque modulating mode is also the same with that of the second embodiment.

Third Embodiment

Next, the steering system of a third embodiment of the invention will be explained with reference to FIGS. 15 through 18 and to FIG. 6 as necessary.

Figure 15:
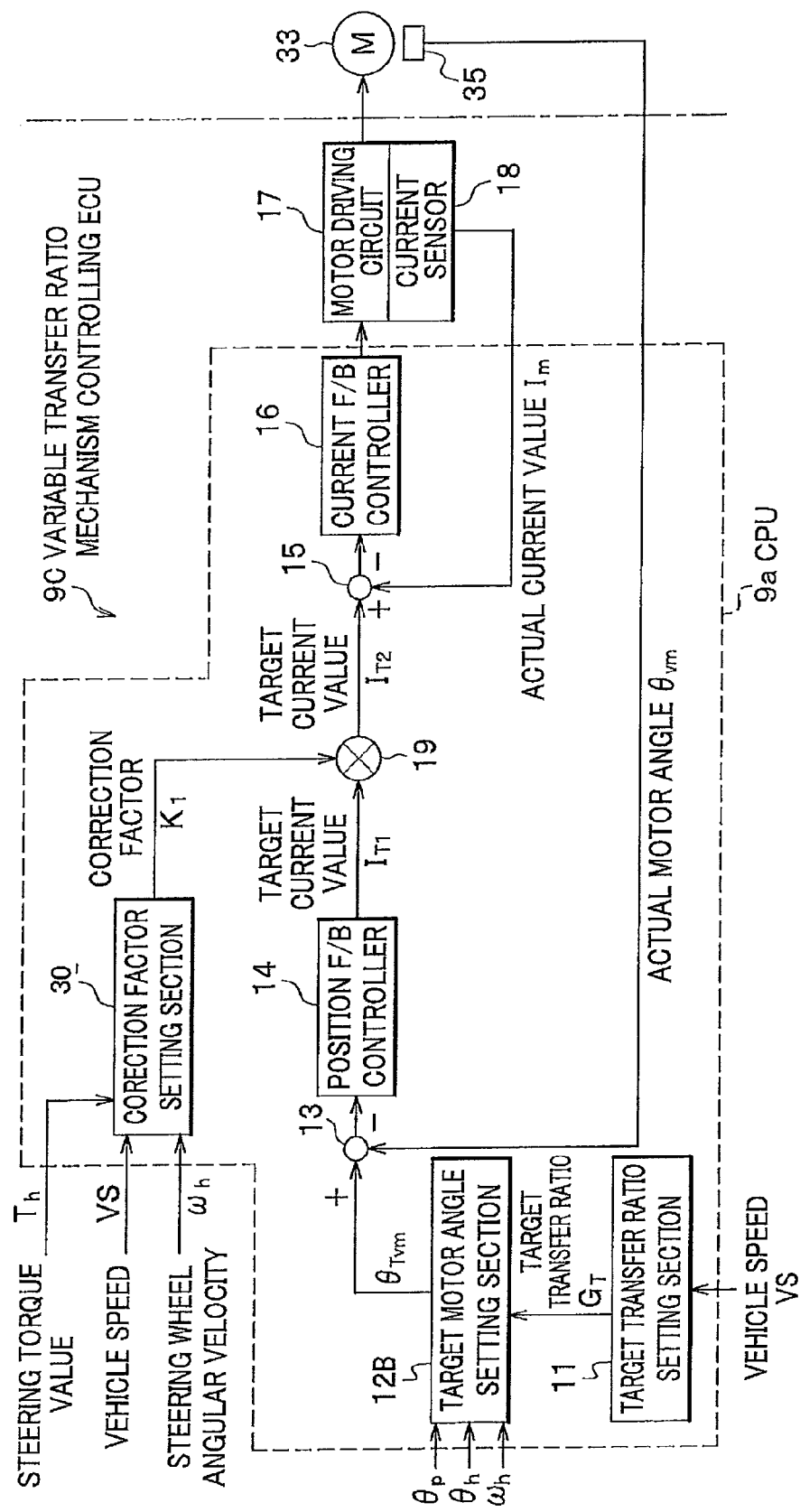
FIG. 15 is a functional structural block diagram of a variable transfer ratio mechanism controlling ECU in a steering system according to a third embodiment of the invention.
Figure 16:
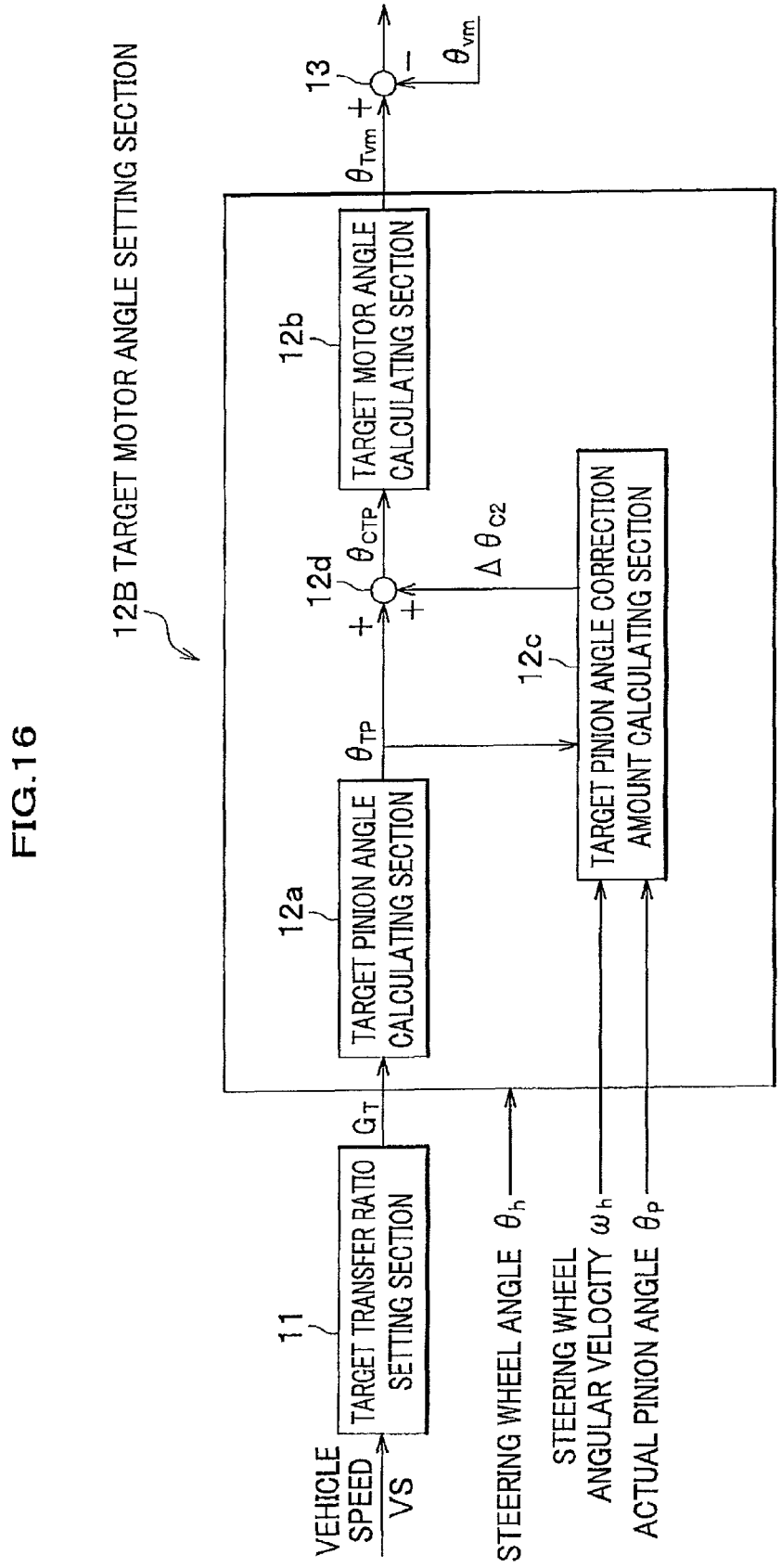
FIG. 16 is a detailed functional structural block diagram of a target motor angle setting section.
Figure 17:
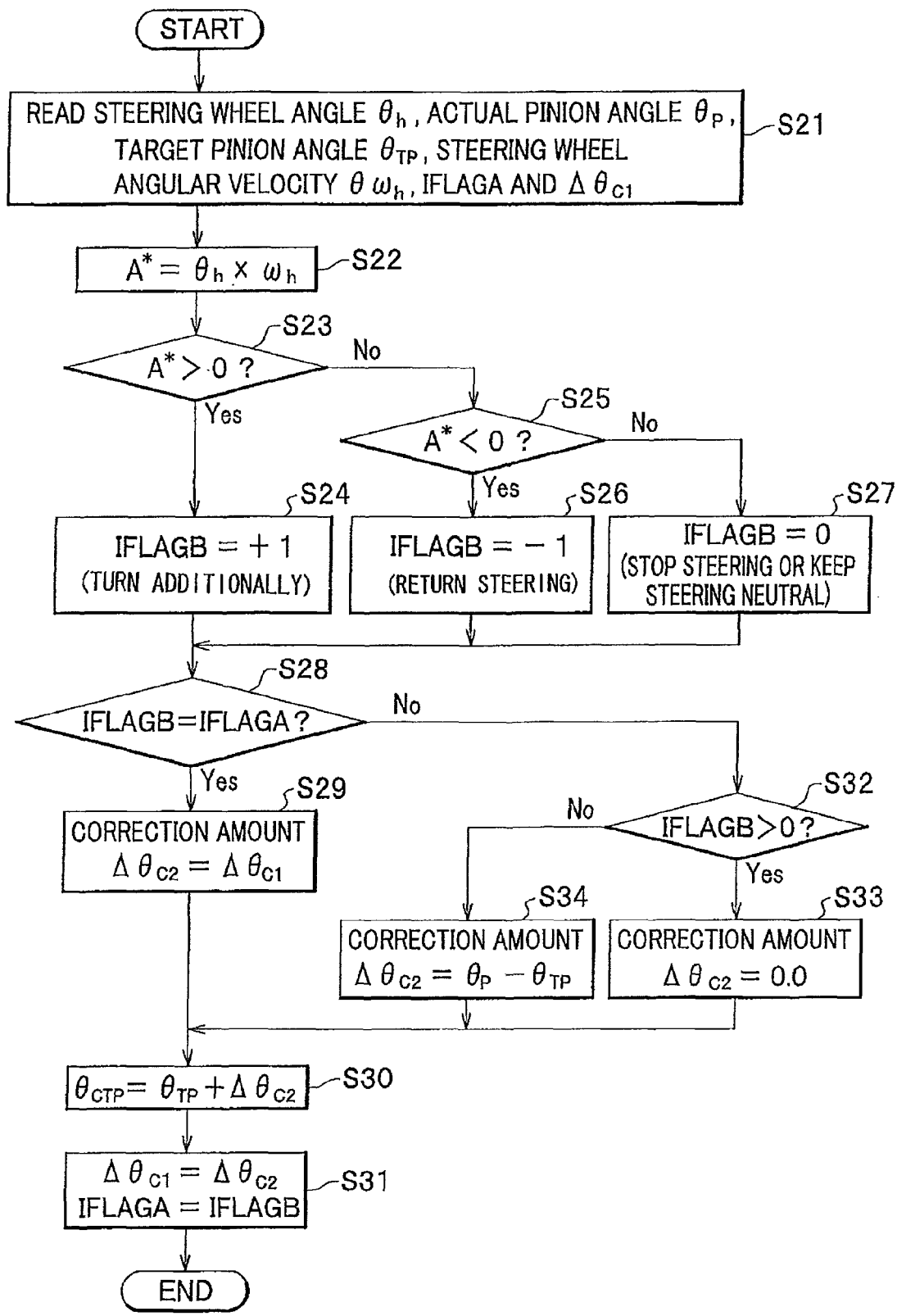
FIG. 17 is a flowchart showing a flow of control for correcting a target pinion angle in the target motor angle setting section.

FIG. 15 is a functional structural block diagram of the variable transfer ratio mechanism controlling ECU in a steering system of the third embodiment, FIG. 16 is a detailed functional structural block diagram of the target motor angle setting section and FIG. 17 is a flowchart showing a flow of control for correcting a target pinion angle in the target motor angle setting section.

Figure 18A:
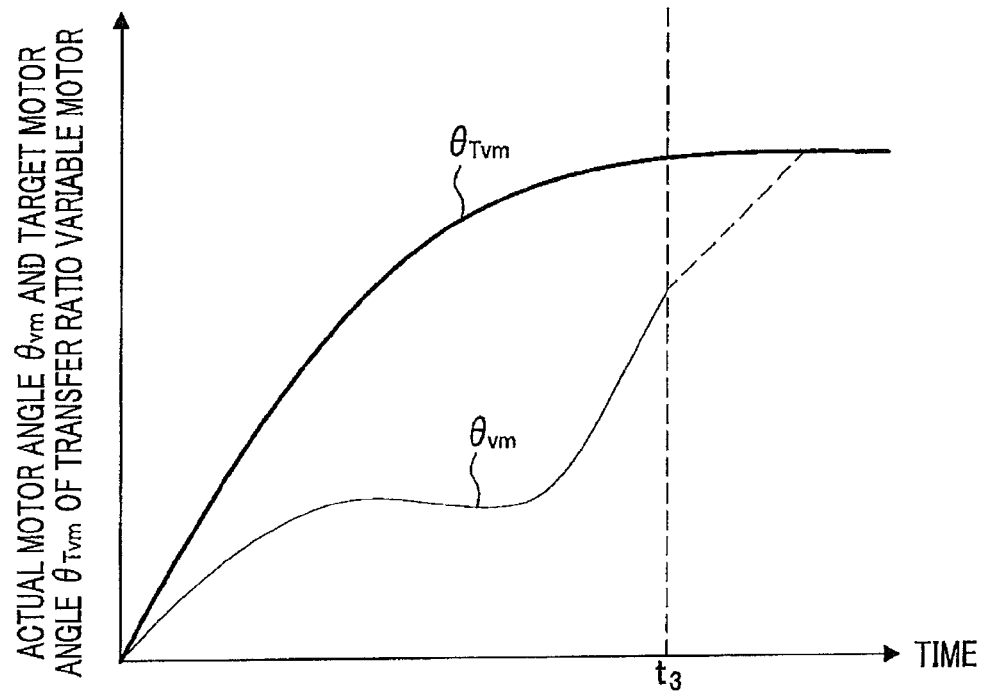
FIG. 18A is a graph showing a temporal transition of an actual motor angle θvm and a target motor angle θTvm of the transfer ratio variable motor of a comparative example.
Figure 18B:
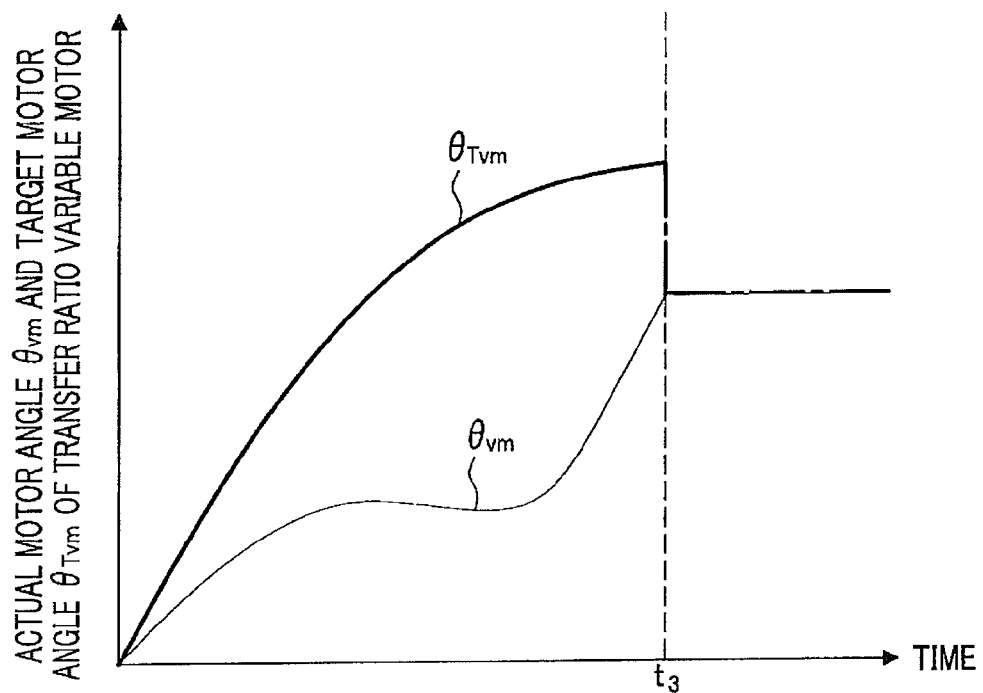
FIG. 18B is a graph showing a temporal transition of the actual motor angle θvm and the target motor angle θTvm of the transfer ratio variable motor of the third embodiment.

FIG. 18A is a graph showing a temporal transition of an actual motor angle $\theta vm$ and a target motor angle $\theta Tvm$ of the transfer ratio variable motor according to a comparative example and FIG. 18B is a graph showing a temporal transition of the actual motor angle $\theta vm$ and the target motor angle $\theta Tvm$ of the transfer ratio variable motor of the third embodiment.

The steering system 1 of the third embodiment is different from the second embodiment or from the modified embodiment thereof in that the target motor angle setting section 12A in the variable transfer ratio mechanism controlling ECU 9A of the second embodiment is changed to a target motor angle setting section 12B. The other parts are the same with those of the second embodiment or of the modified embodiment thereof.

The parts having the same structure with those of the first or second embodiments will be denoted by the same reference numerals and an overlapped explanation thereof will be omitted here.

As shown in FIG. 16, the target motor angle setting section 12B has a target pinion angle calculating section 12a, a target motor angle calculating section 12b, a target pinion angle correction amount calculating section 12c and an adding section 12d. The target pinion angle calculating section 12a calculates a target pinion angle $\theta TP$ based on the Equation 8 described above by using the target transfer ratio GT set corresponding to the vehicle speed VS in the target transfer ratio setting section 11. The calculated target pinion angle $\theta TP$ is inputted to the target pinion angle correction amount calculating section 12c and to the adding section 12d.

The target pinion angle correction amount calculating section 12c judges whether the steering operation of the steering wheel 2 carried out by the driver is either the "additional steering" state, the "steering returning state" or the "steering stopped" state and operates as follows:

(1) When the steering operation is the same with the previous steering operation state, the target pinion angle correction amount calculating section 12c sets the previous target pinion angle correction amount $\Delta\theta C1$ as a target pinion angle correction amount $\Delta\theta C2$ of this time and inputs it to the adding section 12d;

(2) When there is a change from the previous steering operation state and the steering operation state of this time is the "additional steering" state, the target pinion angle correction amount calculating section 12c sets the target pinion angle correction amount as $\Delta\theta C2=0.0$ and inputs it to the adding section 12d; and (3) When there is a change from the previous steering operation state and the steering operation state of this time is the "steering returning" state or the "steering stopped or the wheel neutralized" state, the target pinion angle correction amount calculating section 12c calculates a difference between an actual pinion angle $\theta p$ at that time and a target pinion angle $\theta TP$ ($\theta p-\theta TP$) as the target pinion angle correction amount $\Delta\theta C2$ of this time and inputs it to the adding section 12d.

The detail thereof will be explained in connection with a flowchart in FIG. 17.

The adding section 12d adds the target pinion angle $\theta TP$ inputted from the target pinion angle calculating section 12a with the target pinion angle correction amount $\Delta\theta C2$ inputted from the target pinion angle correction amount calculating section 12c and inputs it to the target motor angle calculating section 12b as a corrected target pinion angle $\theta CTP$.

Receiving the corrected target pinion angle $\theta CTP$, the target motor angle calculating section 12b calculates a target motor angle $\theta Tvm$ by the following Equation by substituting $\theta P$ with $\theta CTP$ in Equation 6:

$$\theta Tvm=(\theta CTP-\alpha\cdot\theta h)/\beta \qquad \text{Eq. 10}$$

The target motor angle $\theta Tvm$ calculated by the target motor angle calculating section 12b is inputted to the subtracting section 13.

The processes thereafter are the same with those of the second embodiment.

Next, a flow of control for correcting the target pinion angle in the target motor angle setting section will be explained with reference to FIG. 17.

This process is mainly carried out by the target pinion angle correction amount calculating section 12c and the adding section 12d.

When the ignition switch is turned on, the target motor angle setting section 12B puts up a previous flag indicative of the steering operation state described above as IFLAGA=0 ("steering stopped" state) as an initial setting and sets a previous target pinion angle correction amount $\Delta\theta C1$ as 0.0. Then, the target motor angle setting section 12B carries out the process in the flowchart at predetermined cycle and finishes the process when the ignition switch is turned off.

The target pinion angle correction amount calculating section 12c reads a steering wheel angle $\theta h$, an actual pinion angle $\theta p$, a target pinion angle $\theta TP$, a steering wheel angular velocity $\omega h$, the previous flag IFLAGA and the previous correction amount $\Delta\theta C1$ in Step S21.

The target pinion angle correction amount calculating section 12c calculates a steering operation state judging parameter A* (A*=$\theta h\times\omega h$) in Step S22.

The target pinion angle correction amount calculating section 12c checks whether or not the steering operation state judging parameter A* is a positive value in Step S23. When it is a positive value (Yes), the target pinion angle correction amount calculating section 12c advances to Step S24 to set IFLAG=+1 (additional steering) and then advances to Step S28.

When the value is not a positive value (No) in Step S23, the target pinion angle correction amount calculating section 12c advances to Step S25 to check whether or not the steering operation state judging parameter A* is a negative value.

When the steering operation state judging parameter A* is a negative value (Yes) in Step S25, the target pinion angle correction amount calculating section 12c advances to Step S26 to set IFLAG=−1 (return steering state) and then advances to Step S28.

When the steering operation state judging parameter A* is not a negative value (No) in Step S25, the target pinion angle correction amount calculating section 12c advances to Step S27 to set IFLAG=0 (the steering stopped or the wheel neutralized state) and then advances to Step S28.

In Step S28, the target pinion angle correction amount calculating section 12c checks whether or not the value of the previous flag indicating the steering operation state is the same with the values of the flags this time indicating the steering operation states set in Steps 24, 26 or 26 (IFLAGB=IFLAGA?).

If they are the same (Yes), the target pinion angle correction amount calculating section 12c advances to Step S29 to equalize a correction amount $\Delta\theta C2$ with the previous correction amount $\Delta\theta C11$ ($\Delta\theta C2=\Delta\theta C1$).

When the value of the previous flag indicating the steering operation state is not the same with the values of the flags this time indicating the steering operation states set in Steps 24, 26 or 26, i.e., No in Step S28, the target pinion angle correction amount calculating section 12c advances to Step S32 to check whether or not the flag indicating the steering operation state of this time is a positive value (IFLAGB>0?).

When the IFLAGB is a positive value, i.e., Yes in Step S32, the target pinion angle correction amount calculating section 12c advances to Step S33 to set the correction amount $\Delta\theta C2=0.0$ and then advances to Step S30.

When the IFLAGB is not a positive value, i.e., No in Step S32, the target pinion angle correction amount calculating section 12c advances to Step S34 to set the correction amount $\Delta\theta C2=\theta p-\theta TP$ and then advances to Step S30.

In Step S30, the adding section 12d adds the correction amount of this time $\Delta\theta C2$ set in Steps S29, S33 or S34 to the target pinion angle $\theta TP$ calculated by the target pinion angle calculating section 12a to obtain a corrected target pinion angle $\theta CTP$ ($\theta CTP=\theta TP+\Delta\theta C2$).

In Step S31, the target pinion angle correction amount calculating section 12c sets the previous correction amount $\Delta\theta C1$ to be used in the next repetition as the correction amount of this time $\Delta\theta C2$ ($\Delta\theta C1=\Delta\theta C2$) or sets the flag of the steering operation state of this time as the flag of the previous steering operation state to be used in the next repetition (IFLAGA=IFLAGB).

Thus, the target pinion angle correction amount calculating section 12c finishes the series of processes.

Here, in the beginning, the operation state of the steering wheel 2 is the "steering stopped" state, IFLAGA=0 and the correction amount $\Delta\theta C1=0.0$ here. When the driver starts to turn the steering wheel 2 right for example, the previous flag (IFLAGA=0) does not coincide with the flag of this time (IFLAGB=+1) in Step S28. Then, the process advances to Step S32 and further to Step S33. In Step S30, $\theta CTP=\theta TP$ and in Step S31, $\Delta\theta C1=0.0$ and IFLAGA=+1.

When the "additional steering" state continues after that, the process advances from Step S28 to Steps S29 and S30. In Step S30, $\theta CTP=\theta TP$ and in Step S31, $\Delta\theta C1=0.0$ and IFLAGA=+1.

When the driver turns the steering operation state into that of "steering returning" state", the process advances from Step S28 to Steps S32 and S34. When the transfer ratio variable motor 33 is unable to follow and the actual pinion angle $\theta p$ is late from the target pinion angle $\theta TP$, $\Delta\theta C2\neq 0$ and the corrected target pinion angle is set as $\theta CTP=\theta TP+\Delta\theta C2$ (correction amount $\Delta\theta C2=\theta p-\theta TP$) in Step S34 to stop that much of the late follow-up operation thereafter of the transfer ratio variable motor 33.

Even when the steering operation state of the steering wheel 2 is turned from the "additional steering" state to the state of the "steering stopped" state, that much of the late follow-up operation thereafter of the transfer ratio variable motor 33 is stopped in the same manner.

Accordingly, the corrected target pinion angle $\theta CTP$ reflecting the actual pinion angle $\theta p$ is outputted to the target motor angle calculating section 12b and hence the target motor angle $\theta Tvm$ that is based on that reflects the actual motor angle $\theta vm$.

The motor angle $\theta vm$ may not be able to quickly follow up the target motor angle $\theta Tvm$ due to insufficient output torque of the transfer ratio variable motor 33 (see FIG. 6) when the driver quickly steers the steering wheel 2 (see FIG. 6) in the state of the quick ratio. Therefore, when the driver stops steering the steering wheel 2 at time t3 as shown in a comparative example in FIG. 18A, the actual motor angle $\theta vm$ is continuously controlled so as to follow up the target motor angle $\theta Tvm$ in the case of the prior art. Thus, the turning wheel continues to turn and the driver feels a sense of discomfort through the behavior of the vehicle and the steering reactive force.

However, according to the present embodiment, when the driver stops steering the steering wheel 2 at time t3 as shown in FIG. 18B, the target motor angle $\theta Tvm$ is matched with the actual motor angle $\theta vm$, so that the turning wheel stops to move and the driver feels no such sense of discomfort.

Modified Embodiment of Third Embodiment

Next, a modified embodiment of the third embodiment will be explained with reference to FIGS. 19 through 21. The present modified embodiment is what the flow of control in FIG. 17 of the target motor angle setting section 12B of the third embodiment for correcting the target pinion angle is changed.

Figure 19:
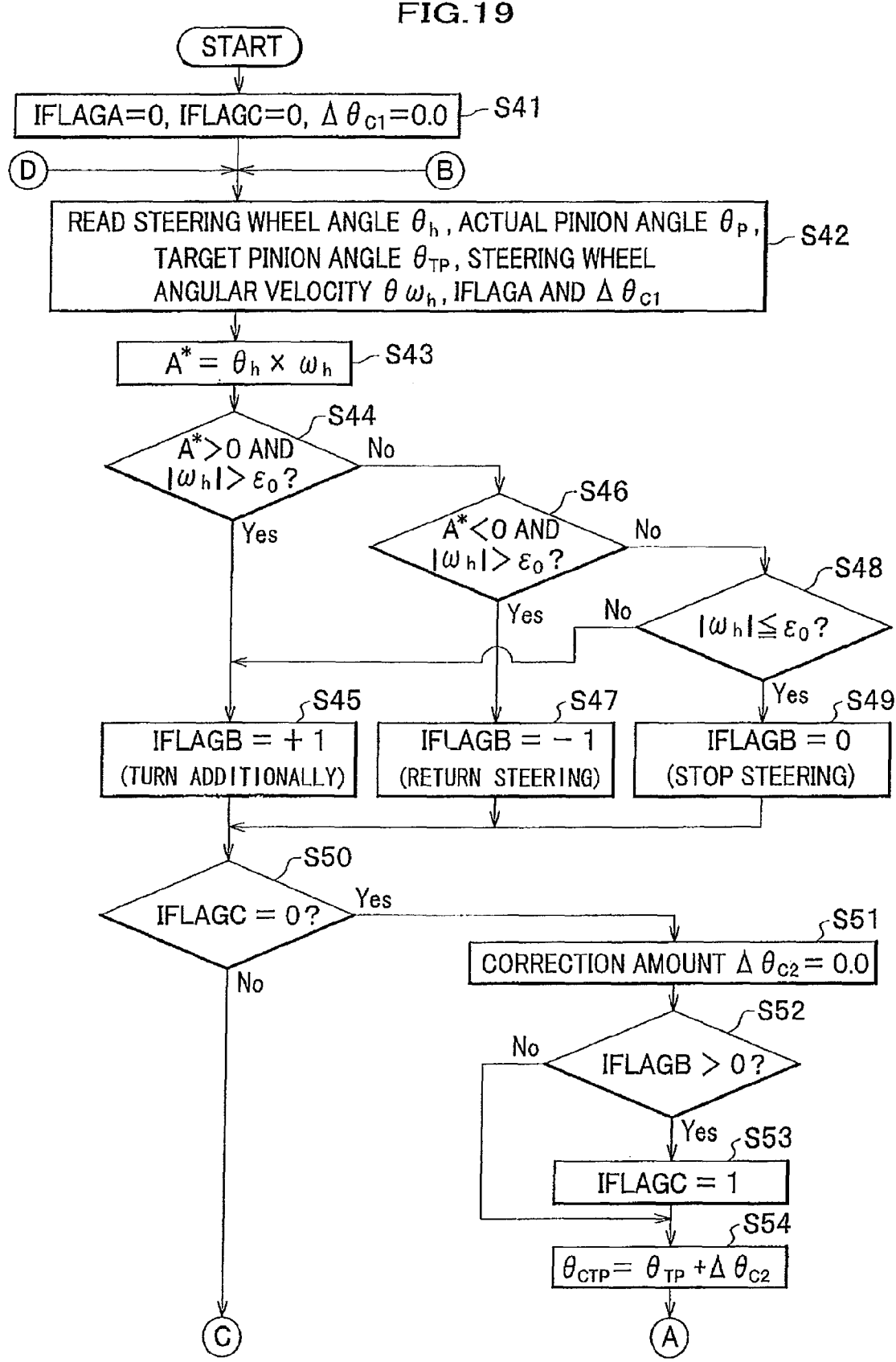
FIG. 19 is a flowchart showing a flow of control for correcting a target pinion angle in the target motor angle setting section of the third embodiment.
Figure 20:
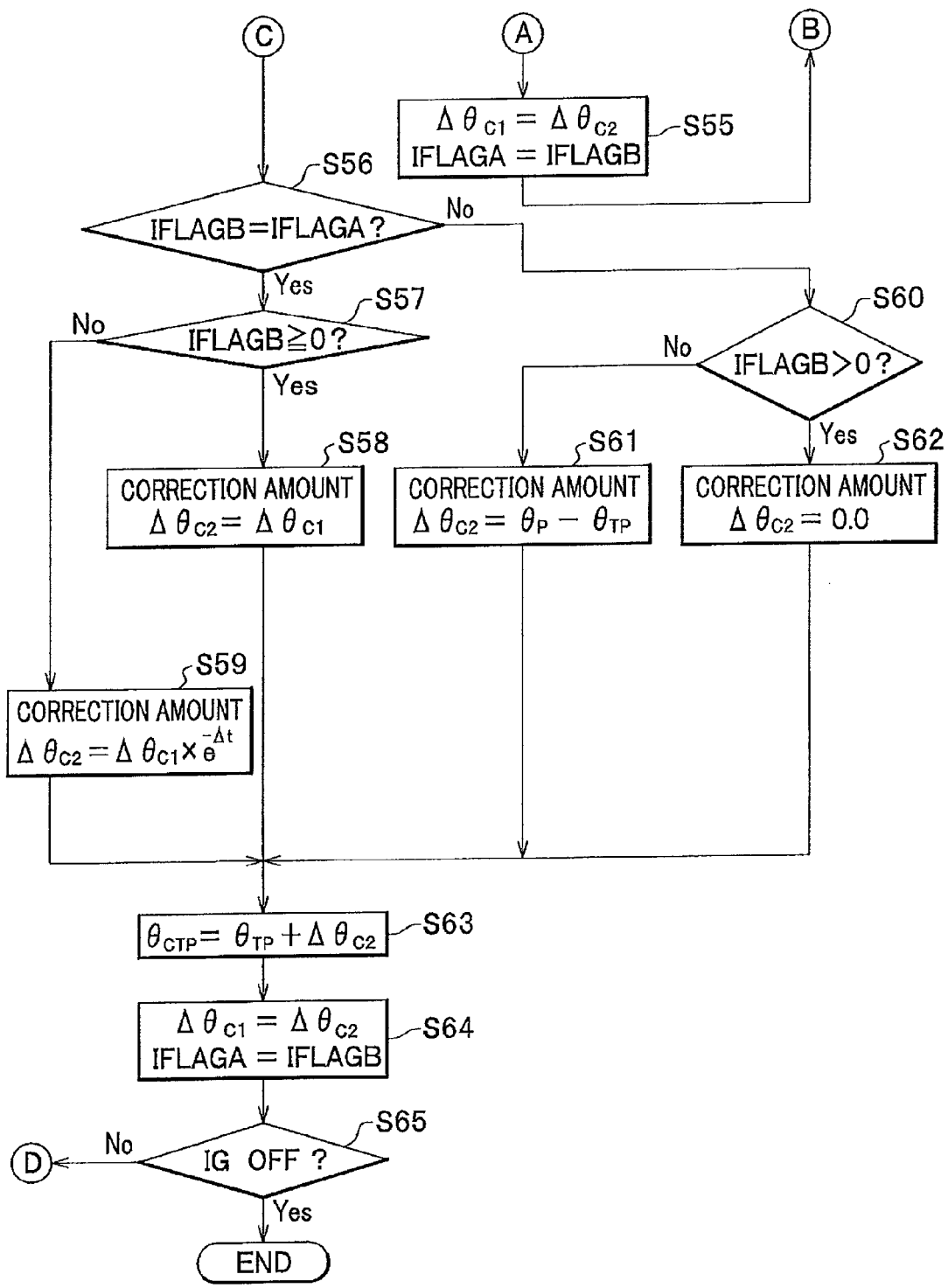
FIG. 20 is a flowchart showing a flow of control for correcting a target pinion angle in the target motor angle setting section.
Figure 21A:
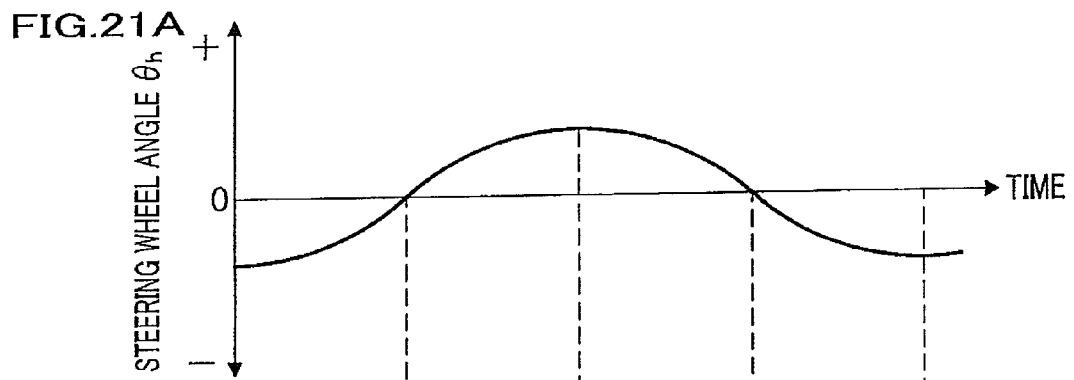
FIG. 21A is a graph showing a temporal transition of a steering wheel angle θh.
Figure 21B:
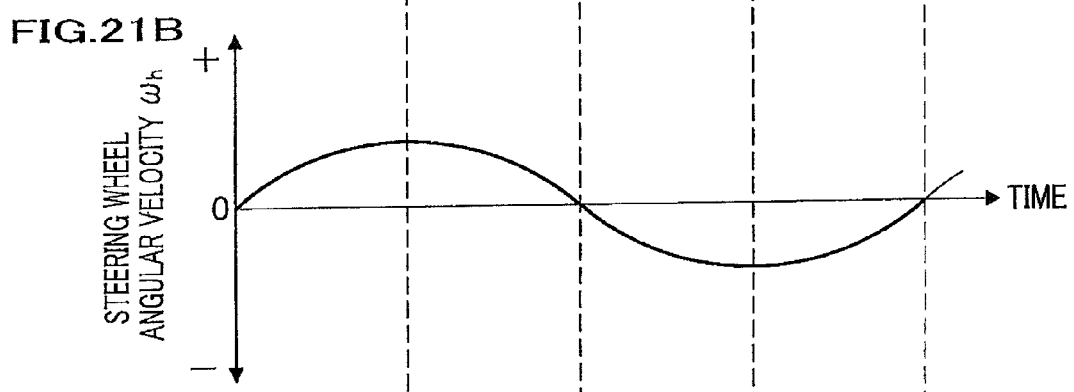
FIG. 21B is a graph showing a temporal transition of a steering wheel angular velocity ωh.
Figure 21C:
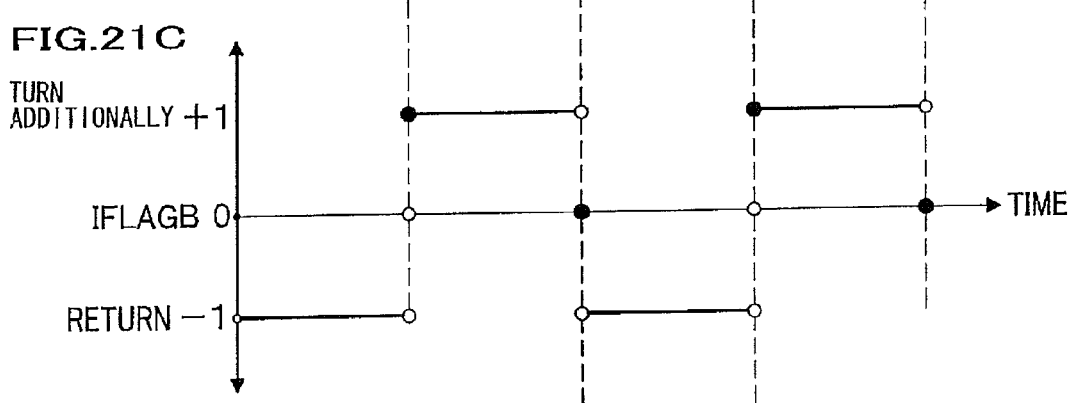
FIG. 21C is a graph showing changes of values of a flag indicative of a steering operational state.
Figure 21D:
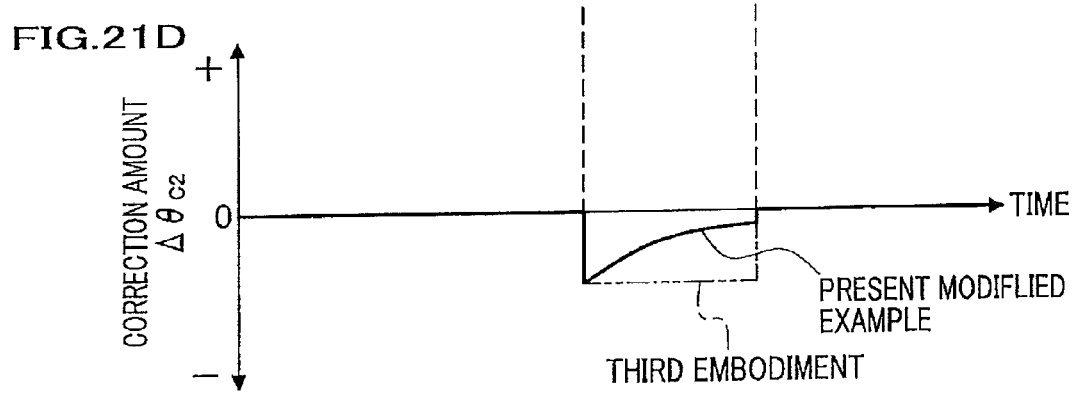
FIG. 21D is a graph showing a temporal transition of a correction amount ΔθC2.

FIGS. 19 and 20 are flowcharts showing the flow of controls for correcting the target pinion angle in the target motor angle setting section. FIG. 21A is a graph showing a temporal transition of a steering wheel angle $\theta h$, FIG. 21B is a graph showing a temporal transition of a steering wheel angular velocity $\omega h$, FIG. 21C is a graph showing changes of values of a flag indicating a steering operational state and FIG. 21D is a graph showing a temporal transition of a correction amount $\Delta\theta C2$.

The present modified embodiment improves the following points:
(a) the steering operation state is recognized as the "steering stopped" state also when the steering wheel angle $\theta h$ is 0.0 degree;
(b) the correction of the difference ($\Delta\theta C2$) between the target pinion angle $\theta TP$ and the actual pinion angle $\theta p$ is carried out even in the "returning" state right after when the ignition switch is turned on; and (c) even though the correction of the difference ($\Delta\theta C2$) between the target pinion angle $\theta TP$ and the actual pinion angle $\theta p$ has been always carried out when the operation states are changed from the "additional steering" state to the "steering stopped" state and to the "steering returning" state and the correction of the difference of a certain value ($\Delta\theta C2$) has been carried out during the "steering returning" state when a series of operations of the "additional steering to right" state to the "steering returning" state and to the "additional steering to right or left" continues, the correction of the difference ($\Delta\theta C2$) is zeroed in a moment when the state is shifted to the "additional steering state to right or left", possibly giving the driver a sense of discomfort of the steering torque reactive force.

The process of this control is carried out mainly by the target pinion angle correction amount calculating section 12c and the adding section 12d.

When the ignition switch is turned on, the target pinion angle correction amount calculating section 12c sets the previous flag indicative of the steering operation state described above to 0 (IFLAGA=0: steering operation state of the "steering stopped" state) as an initial setting, sets the flag indicative of the state right after when the ignition switch has been turned as 0 (IFLAGC=0) and sets the previous target pinion angle correction amount $\Delta\theta C1$ as 0.0 (Step S41).

In Step S42, the target pinion angle correction amount calculating section 12c reads a steering wheel angle $\theta h$, an actual pinion angle $\theta p$, a target pinion angle $\theta TP$, steering wheel angular velocity $\omega h$, a previous correction amount $\Delta\theta C1$ and a previous IFLAGA.

The target pinion angle correction amount calculating section 12c calculates a steering operation state judging parameter A* in Step S43. (A*=$\theta h \times \omega h$)

In Step S44, the target pinion angle correction amount calculating section 12c checks whether or not such conditions are met that a steering operation state judging parameter A* is a positive value and that an absolute value $|\omega h|$ of the steering wheel angular velocity is greater than a predetermined threshold value $\epsilon 0$. When the abovementioned conditions are met (i.e., Yes), the process advances to Step S45 and the target pinion angle correction amount calculating section 12c sets IFLAG=+1 (additional steering state) and advances to Step S50.

When the abovementioned conditions are not met in Step S44, the process advances to Step S46 and the target pinion angle correction amount calculating section 12c checks whether such conditions are met that the steering operation state judging parameter A* is a negative value and that the absolute value $|\omega h|$ of the steering wheel angular velocity is greater than the predetermined $\epsilon 0$.

When the abovementioned conditions are met in Step S46 (i.e., Yes), the process advances to Step S47 and the target pinion angle correction amount calculating section 12c sets IFLAG=−1 (the steering returning state) and advances to Step S50.

When the abovementioned conditions are not met in Step S46 (No), the process advances to Step S48 and the target pinion angle correction amount calculating section 12c checks whether or not the absolute value $|\omega h|$ of the steering wheel angular velocity is less than the predetermined threshold value $\epsilon 0$.

When the absolute value $|\omega h|$ is less than the predetermined threshold value $\epsilon 0$ in Step S48 (Yes), the process advances to Step S49 and the target pinion angle correction amount calculating section 12c sets IFLAG=0 (the steering stopped state) and advances to Step S50. When the absolute value $|\omega h|$ is greater than the predetermined threshold value $\epsilon 0$ in Step S48 (No), the process advances to Step S45.

In Step S50, the target pinion angle correction amount calculating section 12c checks whether or not IFLAGC=0. When IFLAGC=0 (Yes), the process advances to Step S51 and when IFLAGC≠0, the process advances to Step S56. Here, the process advances to Step S51 because the ignition switch has been just turn on.

In Step S51, the target pinion angle correction amount calculating section 12c sets a correction amount $\Delta\theta C2$=0.0 and then checks whether or not IFLAGB is a positive value in Step S52. When IFLAGB is a positive value (Yes) in Step S52, the process advances to Step S53 and the target pinion angle correction amount calculating section 12c changes the flag indicative of that the ignition switch has been just turned on as IFLAGC=1 and advances to Step S54. When the flag B is not a positive value in Step S52 (i.e., No), the process advances to Step S54.

In Step S54, the target pinion angle correction amount calculating section 12c sets the corrected target pinion angle $\theta CTP$ as $\theta TP+\Delta\theta C2$ ($\theta CTP=\theta TP+\Delta\theta C2$). Next, the process advances to Step S55 in FIG. 20 following a sign (A).

In Step S55, the target pinion angle correction amount calculating section 12c sets as the previous correction amount $\Delta\theta C1$=$\Delta\theta C2$ and IFLAGA=IFLAGB and returns to Step S42 in FIG., 19 following a sign (B).

Here, the repetition of Steps S42 through S50 and Steps S51 through S55 are continued until when the steering operation state becomes the "additional steering" state after when the ignition switch has been turned on and the correction amount $\Delta\theta C2$ during this time is set forcibly as 0.0. It means that no follow-up delay correction is made regardless of the steering operation state because it is disadvantageous to respond quickly in changing from position of the steering wheel angle $\theta h$ during parking to correct the follow-up delay of the actual pinion angle $\theta p$ with respect to the target pinion angle $\theta TP$ right after when the ignition switch has been turned on.

When the steering operation state once becomes the "additional steering" state after the ignition switch has been turned on (IFLAGC=1), the process advances from Step S50 to Step S56 in FIG. 20 following a sign (c) and the target pinion angle correction amount calculating section 12c checks whether or not the value of the previous flag indicative of the steering operation state is the same value with the flag of this time indicative of the steering operation state set in Steps S45, S47 and S49 (IFLAGB=IFLAGA?)

When the values are equal in Step S56 (Yes), the process advances to Step S57 and the target pinion angle correction amount calculating section 12c checks whether or not the value of IFLAGB is either +1, 0 and −1. When the value of the IFLAGB is +1 and 0 in Step S57, the process advances to Step S58 and the target pinion angle correction amount calculating section 12c sets the same correction amount with the previous one (correction amount $\Delta\theta C2$=$\Delta\theta C1$) and advances to Step S63. When the value of the IFLAGB is −1 in Step S57, the process advances to Step S59 and the target pinion angle correction amount calculating section 12c sets the correction amount by multiplying e−$\Delta t$ with the previous correction amount $\Delta\theta C1$ (correction amount $\Delta\theta C2$=$\Delta\theta C1 \times e-\Delta t$) and advances to Step S63.

By the way, when IFLAGB=+1, the previous correction amount $\Delta\theta C1$=0.0 and when IFLAGB=0 or IFLAGB=−1, the value is that set in Step S61 ($\theta p-\theta TP$).

In a case when IFLAGB≠IFLAGA in Step S56 (No), the process advances to Step S60 and the target pinion angle correction amount calculating section 12c checks whether or not the IFLAGB indicative of the steering operation state set in Steps S45, S47 and S49 is a positive value. When it is a positive value (Yes), the process advances to Step S62 and if it is not a positive value (No), the process advances to Step S61. In Step S61, the target pinion angle correction amount calculating section 12c sets the correction amount $\Delta\theta C2=\theta p-\theta TP$ and advances to Step S63.

When the process is Yes in Step S60 and advances to Step S62, the target pinion angle correction amount calculating section 12c sets the correction amount $\Delta\theta C2=0.0$ and advances to Step S63.

In Step S63, the adding section 12d adds the correction amount of this time $\Delta\theta C2$ set in any one of Steps S58, S59, S61 and S62 with the target pinion angle $\theta TP$ calculated by the target pinion angle calculating section 12a as a corrected target pinion angle $\theta CTP$ ($\theta CTP=\theta TP+\Delta\theta C2$).

In Step S64, the target pinion angle correction amount calculating section 12c registers the correction amount of this time $\Delta\theta C2$ used as a previous correction amount $\Delta\theta C1$ in a next repetition ($\Delta\theta C1=\Delta\theta C2$) and registers the steering operation state flag of this time used as a previous steering operation state flag used in a next repetition (IFLAGA=IFLAGB). Then the target pinion angle correction amount calculating section 12c checks whether or not the ignition switch is turned off in Step S65 and the ignition switch is turned off (Yes), the target pinion angle correction amount calculating section 12c ends the series of the processes. When the ignition switch is not turned off (No), the process returns to Step S42 to repeat the series of the processes of Steps S42 through S50 and S56 through S65.

The transition of the value of the correction amount $\Delta\theta C2$ in the repetition process when the value of the flag IFLAGB of this time indicative of the steering operation state is changed from the value of the previous flag IFLAGA and the value stays in the state of the new value for a while in the control flow on and after Step S56 will be simply explained.

(1) At first, a case when the steering operation state becomes once the "additional steering" state (IFLAGB=+1) after turning the ignition switch ON and then the state of IFLAGB=+1 continues for a while after that will be explained.

In this case, IFLAGB=+1 during Steps S42 through S49 and the process advances to Steps S50 through S56. Because IFLAGB=IFLAGA=+1, the process advances to Steps S57 and S58 and further to Step S63.

In Step S63, the 12c adds the correction amount of this time $\Delta\theta C2(=\Delta\theta C1=0.0)$ set in Step S58 through Step S51 ($\Delta\theta C2=0.0$) and Step S55 to the target pinion angle $\theta TP$ to set as the corrected target pinion angle $\theta CTP$ ($\theta CTP=\theta TP+\Delta\theta C2$) in Step S63.

The target pinion angle correction amount calculating section 12c sets as $\Delta\theta C1=\Delta\theta C2$ in Step S64 and puts up the flag of steering operation state of this time to be used as the flag of the previous steering operation state in the next repetitions (IFLAGA=IFLAGB).

Next, the process advances to Step S65 and the target pinion angle correction amount calculating section 12c checks whether or not the ignition switch is turned off. When the ignition switch is turned off (Yes), the target pinion angle correction amount calculating section 12c finishes the series of processes and when the ignition switch is not turned off (No), the target pinion angle correction amount calculating section 12c returns to Step S42 following a sign (D) to repeat this processes.

(2) Next, a case when the steering operation state becomes once the "additional steering" state (IFLAGB=+1) after turning the ignition switch on, the state of IFLAGB=+1 continues for a while after that and the state of IFLAGB≠+1 (0 or 1) occurs will be explained.

In this case, IFLAGB=+1 during Steps S42 through S49 and the process advances to Step S50 through Step S56. Because IFLAGB≠1 (No) in Step S56, the process advances to Step S60 to check whether or not the flag indicative of the steering operation state of this time is a positive value (IFLAGB>0?) The process advances to Step S62 when the value is a positive value (Yes) in Step S60 or to Step S61 when the value is not a positive value (No).

Because the IFLAGB is not a positive value here as described above, Step S60 is No and the process advances to Step S61. Then, the correction amount turns out to be $\Delta\theta C2=\theta p-\theta TP$ and the process advances to Step S63. The correction amount $\Delta\theta C2=\theta p-\theta TP$ means that a follow-up delay of the actual pinion angle $\theta p$ to the target pinion angle $\theta TP$ is corrected at this moment together with $\theta CTP=\theta TP+\theta C2$ in Step S63 and that the actual pinion angle $\theta p$ of this moment itself is replaced with the target pinion angle $\theta CTP$ corrected at this moment.

After that, the process advances to Steps S63 through S65 as described above and returns to Step S42 to repeat the series of processes.

(3) Next, a case when the steering operation state becomes from the "additional steering" state (IFLAGB=+1) to that of the "steering returning" state (IFLAGB=−1) and that state continues for a while will be explained.

In this case, IFLAGB=−1 during Steps S42 through S49 and the process advances to Steps S50 through S56. Because IFLAGA=IFLAGB=−1, the process advances to Steps S57 and S59. Then, the target pinion angle correction amount calculating section 12c sets the correction amount $\Delta\theta C2=\Delta\theta C1\times e-\Delta t$.

Here, $\Delta t$ of $e-\Delta t$ means that the correction amount $\Delta\theta C2$ is attenuated with a factor $e-\Delta t$ by a predetermined time step $\Delta t$ per each repetition number of times to the correction amount $\Delta\theta C2$ of the follow-up delay of the actual pinion angle $\theta p$ to the target pinion angle $\theta TP$ set in the first timing shifted to the steering state ("steering returning" state) of IFLAGB=−1 set in Step S61.

The target transfer ratio GT is set corresponding to a new steering wheel angle $\theta h$ during when the steering operation state of the "steering returning" state continues and a target pinion angle $\theta TP$ is also newly updated accordingly, an absolute value of the correction amount $\Delta\theta C2$ added to the new target pinion angle $\theta TP$ decreases every time when Step S59 is repeated.

After Step S59, the process advances to Steps S63 through 65 and returns to Step S42 as described above to repeat the series of processes.

(4) Next, a case when the steering operation state becomes from the "additional steering" state (IFLAGB=+1) to that of the "steering stopped" state (IFIAGB=0) and that state continues for a while will be explained.

In this case, IFLAGB=0 during Steps S42 through S49 and the process advances to Steps S50 through S56. IFLAGA=IFLAGB=0 and the process advances to Steps S57 and S58. Then, the target pinion angle correction amount calculating section 12c sets the correction amount $\Delta\theta C2=\Delta\theta C1$.

While the target pinion angle $\theta TP$ is updated also with the same value during when the "steering stopped" steering operation state continues here, the correction amount $\Delta\theta C2$ added to the target pinion angle $\theta TP$ means that the same value once set in Step S59 is used every time when Step S58 is repeated. That is, the corrected target pinion angle $\theta CTP$ is kept to be the same value and the follow-up delay of the actual pinion angle θp to the target pinion angle θTP is continued to be canceled, After Step S58, the process advances to Steps S63 through 65 and returns to Step S42 as described above to repeat the series of processes.

(5) Finally, a case when the steering operation state changes from the "steering returning" state (IFLAGB=−1) or the "steering stopped" state (IFLAGB=0) to the "additional steering" state (IFLAGB=+1) will be explained.

In this case, IFLAGB=+1 during Steps S42 through S49 and the process advances to Steps S50 through S56. Here, IFLAGA=0 or −1 and IFLAGB=+1 and the process advances to Step S60 and further to Step S62.

In Step S62, the correction amount ΔθC2=0.0 and the process advances to Step S63. Then, the process advances to Steps S63 through 65 and returns to Step S42 as described above to repeat the series of processes.

The motor angle θvm may not be able to quickly follow up the target motor angle θTvm due to the insufficient output torque of the transfer ratio variable motor 33 (see FIG. 6) if the driver quickly steers the steering wheel 2 (see FIG. 6) in the state of the quick ratio. Therefore, when the driver stops steering the steering wheel 2 at time t3 as shown in the comparative example in FIG. 18A, the actual motor angle θvm is continuously controlled so as to follow up the target motor angle θTvm in the case of the prior art. Thus, the turning wheel continues to turn and the driver feels the sense of discomfort through the behavior of the vehicle and the steering reactive force.

However, according to the present modified embodiment, when the driver stops steering the steering wheel 2 at time t3 as shown in FIG. 18B, the target motor angle θTvm is matched with the actual motor angle θvm, so that the turning wheel stops to move and the driver feels no such sense of discomfort.

When such steering operation state of repeating the "additional steering" and "steering returning" the steering wheel 2 to right and left continues like when the driver returns the steering wheel 2 in a narrow alley or in putting one's vehicle into a garage in the state of the quick ratio, the flag IFLAGB indicative of the steering operation state at the time with respect to the steering wheel angle θh as shown in FIG. 21A and to the steering wheel angular velocity ωh as shown in FIG. 21B changes as shown in FIG. 21C. Here, because there charts show a continuous operation, IFLAGB=0 only in the "steering stopped" steering operation state in the beginning when the vehicle is stopped and the state is judged as IFLAGB=+1 or IFLAGB=−1 in other points of time.

Then, while the correction amount ΔθC2 is set when the follow-up delay of the actual pinion angle θp to the target pinion angle θTP in the "steering returning" state after when the "additional steering" state is measured, the correction amount gradually attenuates in the repetition process as shown by a solid line in FIG. 21D and an amount of jump of the correction amount ΔθC2 when it is replaced with a correction amount ΔθC2=0.0 at timing switched to the following "additional steering" steering operation state is reduced. Accordingly, it is possible to eliminate the sense of discomfort otherwise given to the driver. By the way, a two dotted chain line in FIG. 21D indicates the case of the control in the flow chart in FIG. 17.

As a result, the degree of sense of discomfort given to the driver may be reduced.

Fourth Embodiment

Next, a fourth embodiment of the invention will be explained by making reference to FIGS. 22 through 24. The present embodiment is different from the third embodiment in that the target motor angle setting section 12B in the third embodiment is changed to the target motor angle setting section 12C. The other parts are the same with those of the third embodiment or the modified embodiment thereof.

Figure 22:
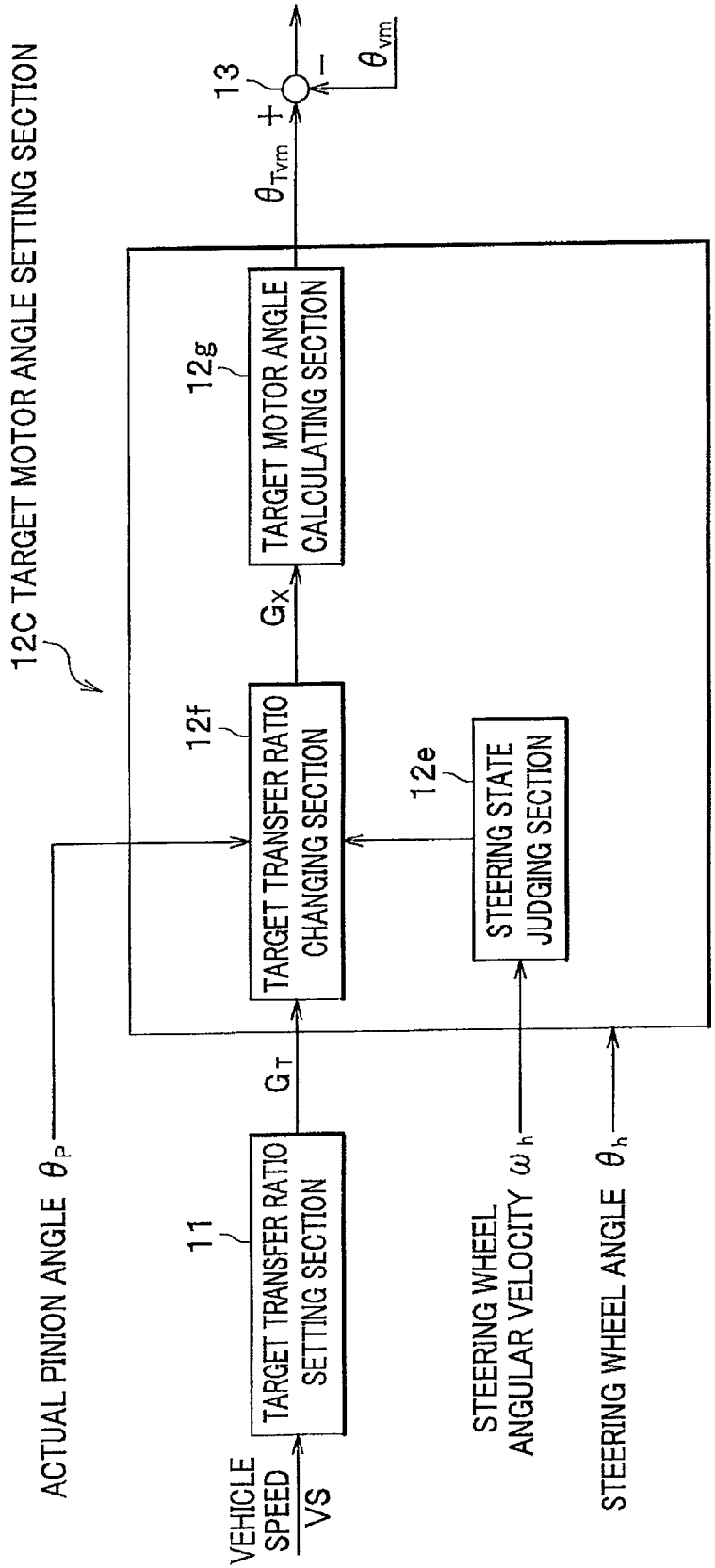
FIG. 22 is a functional structural block diagram of the target motor angle setting section according to a fourth embodiment of the invention.

FIG. 22 is a functional structural block diagram of the target motor angle setting section according to the fourth embodiment of the invention.

Figure 23:
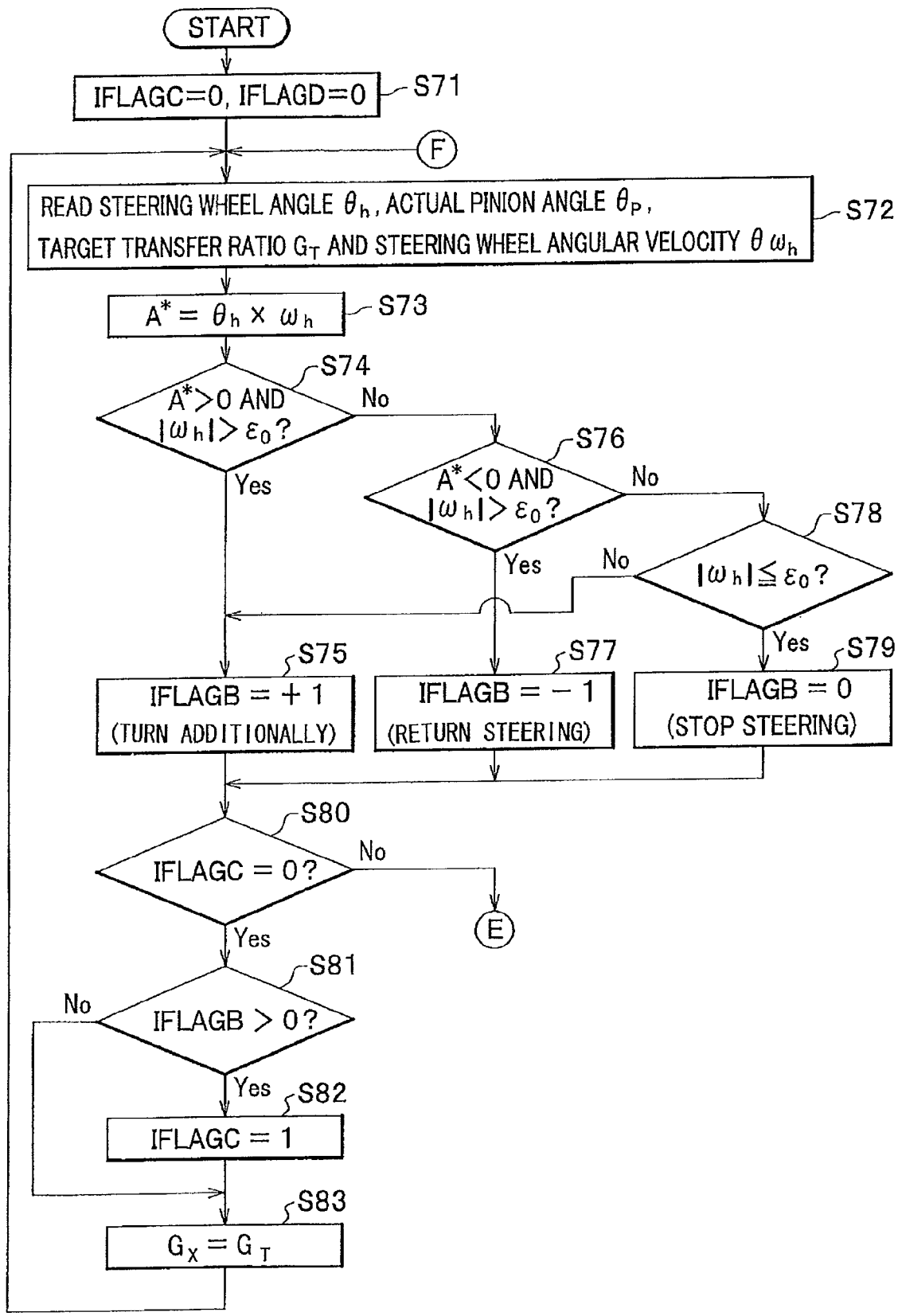
FIG. 23 is a flowchart showing a flow of control for changing the target transfer ratio in the target motor angle setting section.
Figure 24:
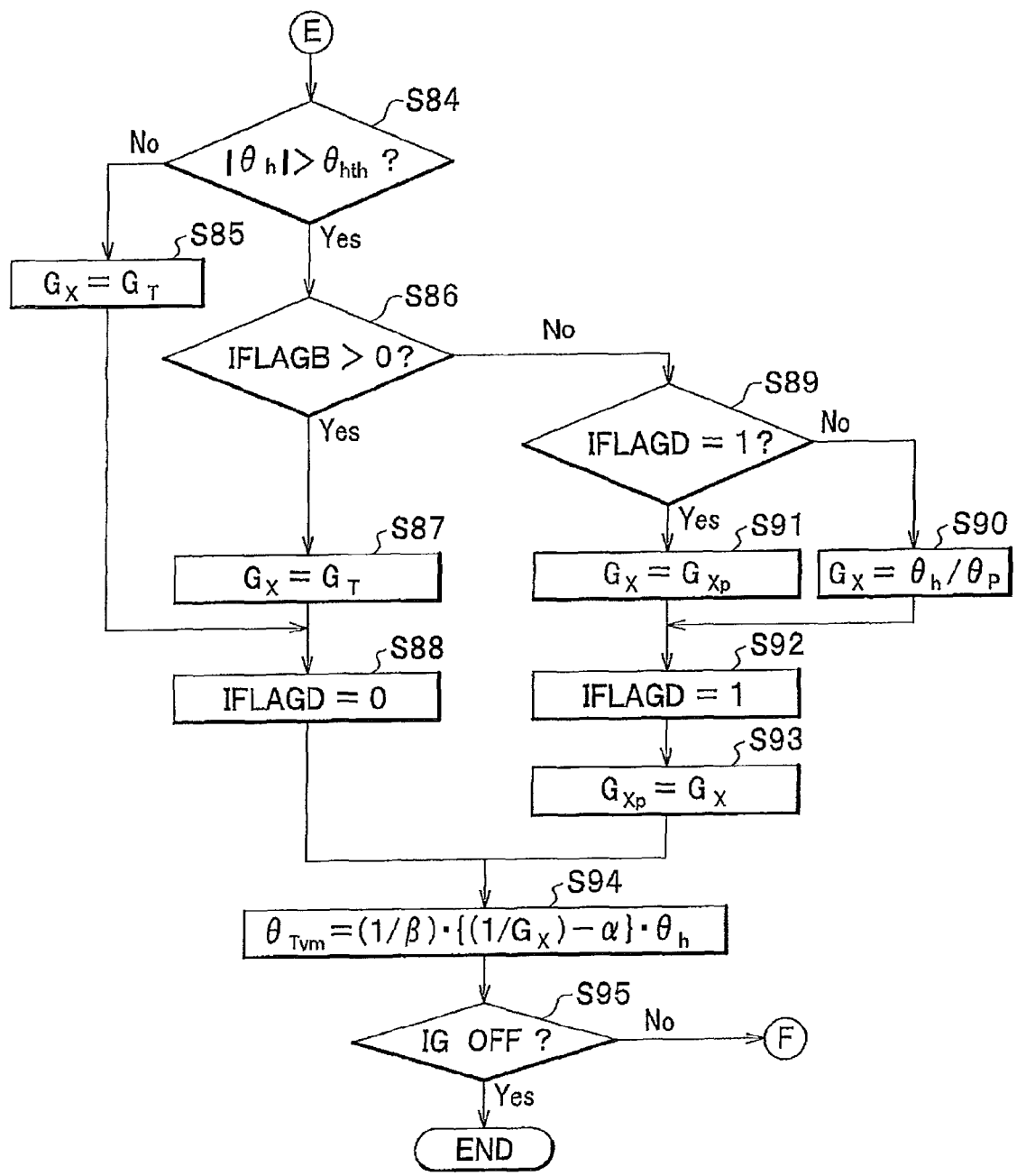
FIG. 24 is a flowchart showing a flow of control for changing the target transfer ratio in the target motor angle setting section.

FIGS. 23 and 24 are flowcharts showing a flow of controls for changing the target transfer ratio in the target motor angle setting section 12C.

The target motor angle setting section 12C of the present embodiment is composed of a steering state judging section 12e, a target transfer ratio changing section 12f and a target motor angle calculating section 12g as shown in FIG. 22.

The steering state judging section 12e judges whether or not the steering operation of the driver is that carried out right after the ignition switch has been turned on and inputs a flag (IFIAGC) indicative of that state to the target transfer ratio changing section 12f (IFLAGC=0 when the state is what is not carried out right after when the ignition switch has been turned on). After judging the state whether it is the "additional steering" state, the "steering returning" state or the "steering stopped" state, the steering state judging section 12e puts up a flag (IFLAGB=+1) indicative of the "additional steering" state when it is the case, a flag (IFLAGB=−1) indicative of the "steering returning" state when it is the case or a flag (IFLAGB=0) indicative of the "steering stopped" state when it is the case and inputs it to the target transfer ratio changing section 12f.

(1) The target transfer ratio changing section 12f outputs a target transfer ratio GT set by the target transfer ratio setting section 11 in accordance to vehicle speed VS as it is as a target transfer ratio GX to the target motor angle calculating section 12g in any steering operation state of the "additional steering" state, the "steering returning" state or the "steering stopped" state in the state when the ignition switch has been just turn on:

Then, when the state is not what is right after when the ignition switch has been turn on (IFLAGC=1), (2) the target transfer ratio changing section 12f resets the flags indicative of the "steering returning" state or the "steering stopped" state after steering operation of the "additional steering" state when the flag indicates the "additional steering" state or the steering wheel indicates substantially straight-ahead driving (IFLAGD=0) and outputs the target transfer ratio GT set by the target transfer ratio setting section 11 corresponding to the vehicle speed VS to the target motor angle calculating section 12g as it is as the target transfer ratio GX: and In a case of the "steering returning" state or the "steering stopped" state after the "additional steering" state, the target transfer ratio changing section 12f sets the flag indicative of the "steering returning" state or the "steering stopped" state after the "additional steering" state (IFLAGD=1), calculates the target transfer ratio GX determined by a ratio of the steering wheel angle θh to the actual pinion angle θp at the beginning point, outputs the target transfer ratio GX to the target motor angle calculating section 12g and continues to output the same target transfer ratio GX to the target motor angle calculating section 12g during when IFLAGD=1 continues.

The target motor angle calculating section 12g calculates the target motor angle θTvm according the Equation 9 and by using the target transfer ratio GX. However, the target transfer ratio GT is replaced to the target transfer ratio GX.

FIGS. 23 and 24 are flowcharts showing a flow of control for correcting the target transfer ratio in the target motor angle setting section.

This process is mainly carried out by the steering state judging section 12e.

When the ignition switch is turned on, the target motor angle setting section 12C sets the flag indicative of that the ignition switch has been just turned on as 0 (IFLAGC=0) as an initial setting in the target transfer ratio changing section 12f and sets a flag (IFLAGD) indicative of the "steering returning" state or the "steering stopped" state after the "additional steering" state as 0 (IFLAGD=0) in Step S71.

In Step S72, the steering state judging section 12e reads a steering wheel angle θh, an actual pinion angle θp and a steering wheel angular velocity ωh.

In Step S73, the steering state judging section 12e calculates steering operation state judging parameter A* (A*=θh×ωh).

In Step S74, the steering state judging section 12e checks whether or not such conditions are met that a steering operation state judging parameter A* is a positive value and that an absolute value |ωh| of the steering wheel angular velocity is greater than a predetermined threshold value ϵ0. When the abovementioned conditions are met (i.e., Yes), the process advances to Step S75 and the steering state judging section 12e sets IFLAGG=+1 (additional steering states) and advances to Step S80.

When the abovementioned conditions are not met in Step S74, the process advances to Step S76 and the steering state judging section 12e checks whether such conditions are met that the steering operation state judging parameter A* is a negative value and that the absolute value |ωh| of the steering wheel angular velocity is greater than the predetermined ϵ0.

When the abovementioned conditions are met in Step S76 (i.e., Yes), the process advances to Step S77 and the steering state judging section 12e sets IFLAG=−1 (the steering returning state) and advances to Step S80.

When the abovementioned conditions are not met in Step S76 (No), the process advances to Step S78 and the steering state judging section 12e checks whether or not the absolute value |ωh| of the steering wheel angular velocity is less than the predetermined threshold value ϵ0.

When the absolute value |ωh| is less than the predetermined threshold value ϵ0 in Step S78 (Yes), the process advances to Step S79 and the steering state judging section 12e sets IFLAG=0 (the steering stopped state) and advances to Step S80. When the absolute value |ωh| is greater than the predetermined threshold value ϵ0 in Step S78 (No), the process advances to Step S75 and further to Step S80.

In Step S80, the target transfer ratio changing section 12f checks whether or not IFLAGC=0. When IFLAGC=0 (Yes), the process advances to Step S81 and when IFLAGC≠0 (No), the process advances to Step S84 following a sign (E). Here, the process advances to Step S81 because the ignition switch has been supposed to be just turned on.

In Step S81, the target transfer ratio changing section 12f checks whether or not IFLAGB is a positive value. When IFLAGB is a positive value (Yes), the process advances to Step S82 and when it is not a positive value (No), the process advances to Step S83.

In Step S82, the target transfer ratio changing section 12f changes the flag indicative of that the ignition switch has been just turned on (IFLAGC=1) and advances to Step S83.

In Step S83, the target transfer ratio changing section 12f outputs a target transfer ratio GT from the target transfer ratio setting section 11 read in Step S72 as it is as a target transfer ratio GX to the target motor angle calculating section 12g. Then, the process returns to Step S72.

Here, the repetition of Steps S72 through S80 and Steps S81 through S83 are continued until when the steering operation state becomes the "additional steering" state after when the ignition switch has been turned on and the target transfer ratio GX outputted out of the target transfer ratio changing section 12f to the target motor angle calculating section 12g is kept to be the target transfer ratio GT during this time. It means that no follow-up delay correction is made by keeping the target transfer ratio GX as the target transfer ratio GT regardless of the steering operation state because it is disadvantageous to respond quickly in changing from position of the steering wheel angle θh during parking to correct the follow-up delay of the actual pinion angle θp with respect to the target pinion angle θTP right after when the ignition switch has been turned on.

When the "additional steering" operation state once occurs after turning the ignition switch on (IFLAGC=1), the process advances to Step S84 following a sign (E) in Step S80 and the target transfer ratio changing section 12f checks whether or not the absolute value of the steering wheel angle θh is larger than the threshold value θhth. When the absolute value is larger than the threshold value θhth (Yes), the process advances to Step S86 or advances to Step S85 when the absolute value is smaller than the threshold value θhth (No).

In Step S85, the target transfer ratio changing section 12f outputs the target transfer ratio GT from the target transfer ratio setting section 11 read in Step S72 as the target transfer ratio GX as it is to the target motor angle calculating section 12g and advances to Step S88.

When Step S84 is Yes and the process advances to Step S86, the target transfer ratio changing section 12f checks whether or not IFLAGB is positive. When the value is positive (Yes), the process advances to Step S87 and the target transfer ratio changing section 12f outputs the target transfer ratio GT from the target transfer ratio setting section 11 read in Step S72 as the target transfer ratio GX as it is to the target motor angle calculating section 12g and advances to Step S88. In Step S88, the target transfer ratio changing section 12f sets as IFLAGD=0 and then advances to Step S94.

When Step S86 is No and the process advances to Step S89, the target transfer ratio changing section 12f checks whether or not IFLAGD=1. The process advances to Step S91 when IFLAGD=1 (yes) or to Step S90 when IFIAGD≠1 (No). Because IFLAGD=0 as an initial value in the begging, the process advances to Step S90 here.

In Step S90, the target transfer ratio changing section 12f sets as GX=θh/θp as the target transfer ratio GX and outputs it to the target motor angle calculating section 12g and the process advances to Step S92.

When Step S89 is Yes and the process advances to Step S91, the target transfer ratio changing section 12f sets as GX=GXp as the target transfer ratio GX and outputs it to the target motor angle calculating section 12g, and the process advances to Step S92.

In Step S92, the target transfer ratio changing section 12f sets as IFLAGD=1 and advances to Step S93 to store the target transfer ratio GX of this time in the repetition as GXp.

In Step S94, the target motor angle calculating section 12g calculates a target motor angle based on the target transfer ratio GX inputted from the target transfer ratio changing section 12f and outputs it to the subtracting section 13 (θTvm=(1/β)·{(1/GX)−α}θh).

Then, in Step S95, the target motor angle setting section 12C checks whether or not ignition switch is turned off. The target motor angle setting section 12C finishes the series of processes when the ignition switch is turned off (Yes) or returns to Step S72 following a sign (F) to repeat the series of processes of steps S72 through S80 and S84 through 95.

Now, the transition of the value of the target transfer ratio GX in the repetition process in the case when the value of the flag of this time indicative of the steering operation state IFLAGB changes from +1 to −1 and the value of IFLAGB stays in the state of −1 or 0 in the flow of control on and after Step S86 will be simply explained.

Because IFLAGB=0 and −1 in Steps S73 through S79, the process advances to Step S80 to Step S84. When |θh|>θhth and the process advances to Steps S86 and S89 for the first time after when the state of IFLAGB=+1, the process advances to Step S90 because IFLAGD=0. Then, target transfer ratio GX is set as GX=θh/θp. After that, the value is set as IFIAGD=1 and the previous target transfer ratio in the repetition is set as GXp=GX in Step S93.

Then, the process goes through Steps S94 and S95 and the value is set as IFLAGB=0 and −1 again in Steps S73 through S79 in the next repetition. When the process advances from Step S80 to Step S84 and advances further to Steps S86 and S89 as |θh|>θhth. Step S89 is Yes because IFLAGD=1 in the previous repetition and the process advances to Step S91. In Step S91, the target transfer ratio GXp in the previous repetition stored in Step S93 in the previous repetition is set as the target transfer ratio GX of the repetition of this time in Step S91 and it is outputted to the target motor angle calculating section 12g.

That is, it means that during when the "steering returning" or the "steering stopped" steering operation state continues after the "additional steering" steering operation state, the target transfer ratio GX is not updated and the same value once set in Step S90 is used every time when Step S91 is repeated. That is, the changed target transfer ratio GX is kept to be the same value.

By the way, setting the target transfer ratio GX as GX=θh/θp in Step S90 in the "steering returning" or the "steering stopped" steering operation state after the "additional steering" state means to adjust the target pinion angle θTP with the current actual pinion angle θp by changing and setting the new target transfer ratio GX from the actual pinion angle θp which is late to follow-up and the steering wheel angle θh even if the actual pinion angle θp is late to follow up the target pinion angle θTP determined corresponding to the target transfer ratio GX (the same value with the target transfer ratio GT corresponding to the vehicle speed VS set by the target transfer ratio setting section 11) because the absolute value of the steering wheel angular velocity ωh is large in the "additional steering" operation state.

Then, the target motor angle θTvm is adjusted to the actual motor angle θvm as shown in FIG. 1. 18B when the target motor angle calculating section 12g calculates the target motor angle θTvm by substituting the target transfer ratio GX changed in Step S90 instead of the target transfer ratio GT into the Equation 9 and outputs it to the subtracting section 13. When the driver stops steering the steering wheel 2, the transfer ratio variable motor 33 stops and the change of the angle of the turning wheel also stops in the same time. Then, even though the steering operation state is shifted from the "additional steering" state to the "steering stopped" or the "steering returning" state, it is possible to prevent the actual pinion angle θp from being controlled to the side of the "additional steering" side.

Then, when Step S84 is No, or Yes and the process advances to Step S86 where the steering operation state is the "additional steering" state and the process advances further to Step S87, the target transfer ratio GX is changed over to the target transfer ratio GT corresponding to the vehicle speed VS read in Step S72 and set by the target transfer ratio setting section 11 at this time for the first time.

Accordingly, when the absolute value of the steering wheel angle θh is considered to be substantially straight so that Step S84 is No in Step S84, it is set to be GX=GT, so that the turning angle of the turning wheel is also returned to the neutral position when the steering wheel 2 is returned to neutral and no trouble of otherwise causing a so-called de-centering of the steering wheel 2 and the turning wheel occurs.

It is noted that when the steering operation state is shifted to the "additional steering" state after the "steering returning" state to the "steering stopped" state, the variable transfer ratio mechanism 5 (see FIG. 6) returns to the original setting because the system stops to use the target transfer ratio GXp in the previous repetition and the target transfer ratio is changed over to the target transfer ratio GT corresponding to the vehicle speed VS read in Step S72 and set by the target transfer ratio setting section 11.

The motor angle θvm may not be able to quickly follow up the target motor angle θTvm due to insufficient output torque of the transfer ratio variable motor 33 (see FIG. 6) when the driver quickly steers the steering wheel 2 (see FIG. 6) in the state of the quick ratio. Therefore, when the driver stops steering the steering wheel 2 at time t3 as shown in a comparative example in FIG. 18A, the actual motor angle θvm is continuously controlled so as to follow up the target motor angle θTvm in the case of the prior art. Thus, the turning wheel continues to turn and the driver feels a sense of discomfort through the behavior of the vehicle and the steering reactive force.

However, according to the present embodiment, when the driver stops steering the steering wheel 2 at time t3 as shown in FIG. 18B, the target motor angle θTvm is matched with the actual motor angle θvm, so that the turning wheel stops to move and the driver feels no such sense of discomfort.

Fifth Embodiment

Figure 25:
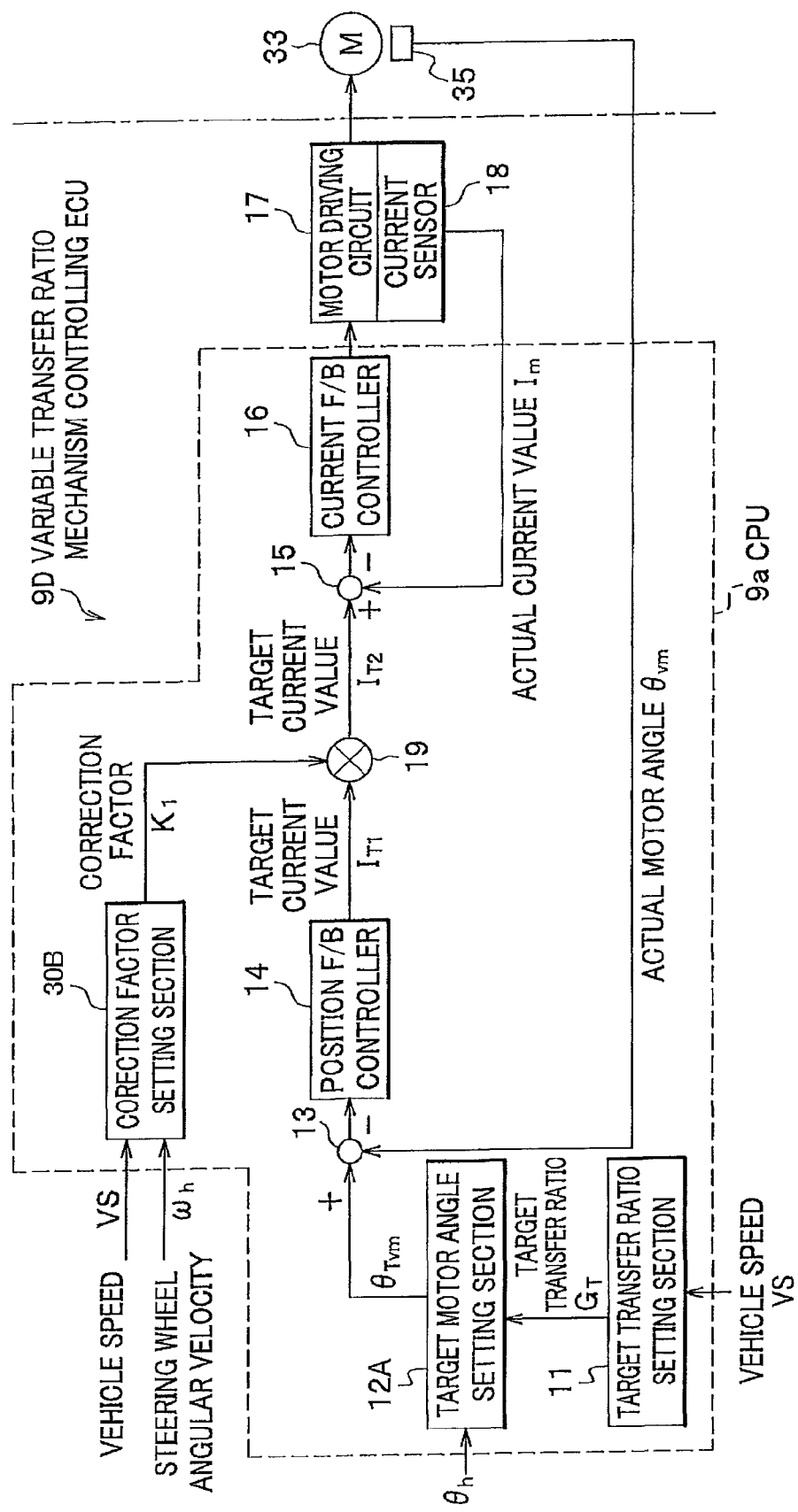
FIG. 25 is a functional structural block diagram of a variable transfer ratio mechanism controlling ECU according to a fifth embodiment of the invention.

Next, a fifth embodiment of the invention will be explained with reference to FIGS. 25 through 27 and to FIG. 6 as necessary. FIG. 25 is a functional structural block diagram of the variable transfer ratio mechanism controlling ECU of the fifth embodiment. The variable transfer ratio mechanism controlling ECU 9D includes the target transfer ratio setting section 11, the target motor angle setting section 12A, the position F/B control section 14, the subtracting section 15, the current F/B control section 16 and the multiplying section 19 as mechanical blocks.

Here, the target transfer ratio setting section 11 and the target motor angle setting section 12A correspond to a transfer ratio modulation setting section and the multiplying section 19 and the correction factor setting section 30B correspond to a steering torque modulation setting section described respectively in Claims.

The present embodiment is characterized in that there is no definition of the transfer ratio modulating mode and steering torque modulating mode in the second embodiment and that the correction factor setting section 30B continuously corrects the current of the transfer ratio variable motor 33 (see FIG. 6) that is received and controlled on the downstream side. While the present embodiment basically has the same configuration with the second embodiment, the correction factor setting section 30 contained in the variable transfer ratio mechanism controlling ECU 9A is only replaced with the correction factor setting section 30B. The same components with those of the second embodiment are denoted by the same reference numerals and an overlapped explanation thereof will be omitted here.

While the vehicle speed VS from the vehicle speed sensor not shown and the steering wheel angular velocity ωh are inputted to the correction factor setting section 30B of the present embodiment as shown in FIG. 25, no steering torque value θh is inputted thereto differing from the second embodiment.

Referring to data of a continuous function (see FIG. 26) corresponding to the vehicle speed VS stored in the ROM, the correction factor setting section 30B sets a correction factor K1 with respect to an absolute value |ωh| of the steering wheel angular velocity.

Figure 26:
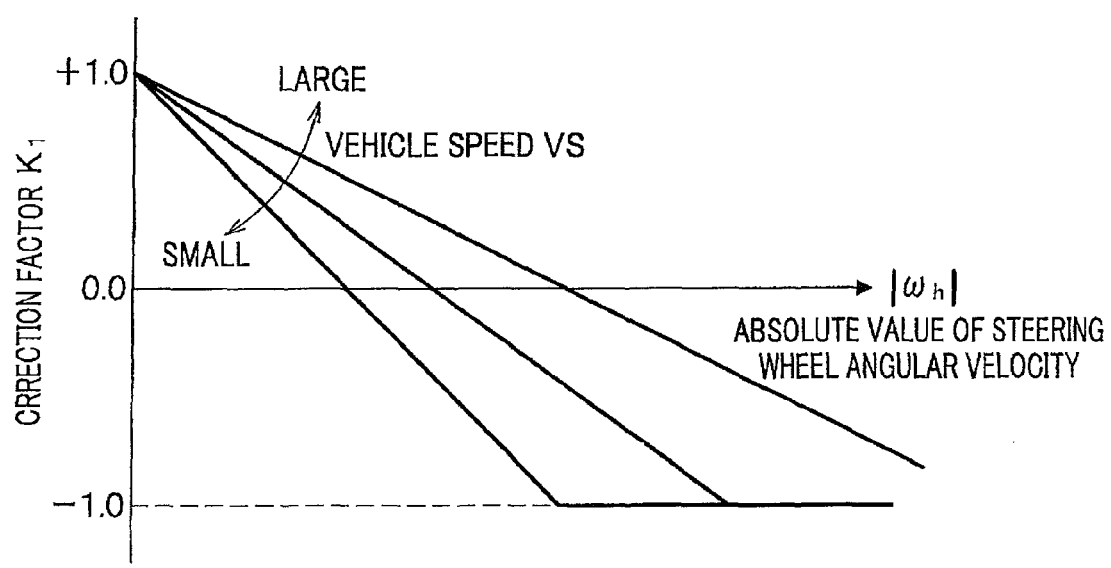
FIG. 26 is a graph indicating a value of a correction factor set corresponding to an absolute value of steering wheel angular velocity.
Figure 27:
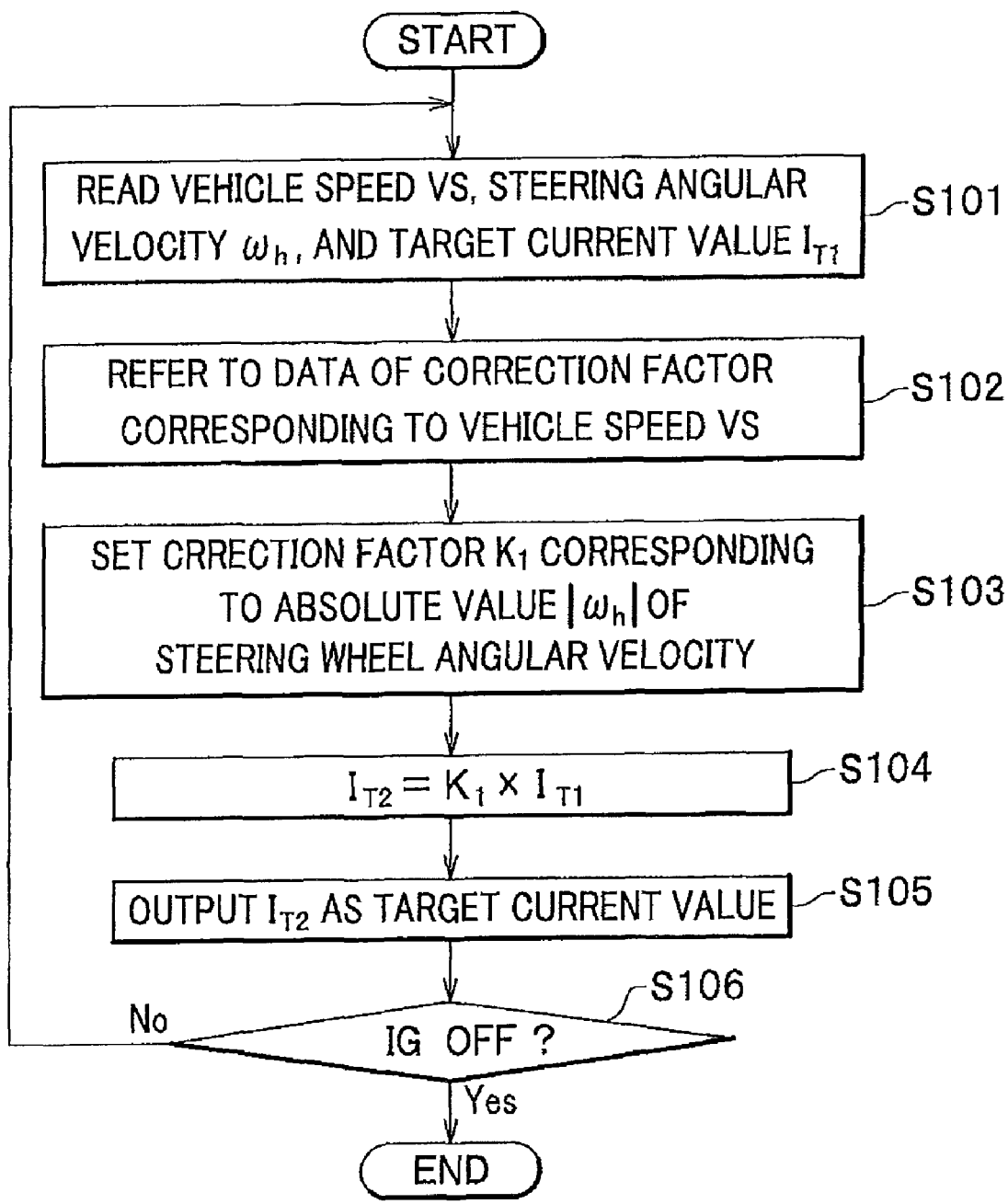
FIG. 27 is a flowchart showing how a transfer ratio modulating mode is switched with a torque modulating mode in the correction factor setting section and a flow for setting a second target current value in the torque modulating mode according to the fifth embodiment.

The continuous function deciding the correction factor K1 whose variable is the absolute value of the steering wheel angular velocity |ωh| shown in FIG. 26 shows such characteristics that the correction factor K1 monotonously and linearly reduces from 1.0 when the absolute value |ωh| increases and that it saturates at −1.0 when the absolute value reaches to −1.0.

Permitting a minus value as the correction factor K1 permits the resultant target current value IT2 obtained from the multiplying section 19 by multiplying the correction factor K1 with the target current value IT1 to be reversible from the direction of the target current value IT1. That is, it permits the target motor angle θTvm of the transfer ratio variable motor 33 in the quick ratio direction to be changed to the target motor angle θTvm of the transfer ratio variable motor 33 in the slow ration direction and thus reduces steering reactive force.

Here, a value of minus inclination of the straight line along which the correction factor K1 monotonously reduces changes corresponding to the vehicle speed VS and is set such that the smaller the vehicle speed VS, the larger its absolute value is and the larger the vehicle speed VS is, the smaller its absolute value is.

This means that because the target transfer ratio GT set in the target transfer ratio setting section 11 is set such that the smaller the vehicle speed VS, the smaller the target transfer ratio GT is, i.e., because the ratio is set on the quick ratio side. The EPS motor 23 and the transfer ratio variable motor 33 of the electric power steering unit 4 are unlikely to be able to follow up when the degree of the quick ratio is strong even if the absolute value |ph| of the steering wheel angular velocity is small. Accordingly, the correction amount is largely changed to the increase of the steering wheel angular velocity |ωh|.

Next, a flow of controls of setting a correction factor K1 by the correction factor setting section 30B and of outputting a target current value IT2 by the multiplying section 19 will be explained with reference to FIG. 27 and to FIG. 25 as necessary.

The correction factor setting section 30B processes Steps S101 through S103 in the following flowchart and the multiplying section 19 processes Steps 104 and 105. By the way, the CPU 9a processes Step S106 in the whole control.

When the ignition switch (IG) is turned on, the variable transfer ratio mechanism controlling ECU 9D starts and the variable transfer ratio mechanism controlling program starts in the CPU 9a (see FIG. 25). Then, the processes of Steps S101 through S106 are repeated at certain cycle thereafter.

The correction factor setting section 30B reads the vehicle speed VS, the steering wheel angular velocity ωh and the target current value IT1 outputted out of the position F/B control section 14 in Step S101.

In Step S102, the correction factor setting section 30B refers to the data of the correction factor corresponding to the vehicle speed VS read in Step S101. Specifically, several kinds of the continuous functions whose variable is the absolute value |ωh| of the steering wheel angular velocity deciding the correction factor K1 as shown in FIG. 25 are prepared for the different values of the predetermined vehicle speed VS and the correction factor setting section 30B carries out interpolation corresponding to the value of the vehicle speed VS read in Step S101 to obtain a desirable continuous function.

In Step S103, the correction factor setting section 30 sets the correction factor K1 corresponding to the absolute value |ωh| of the steering wheel angular velocity.

In Step S104, the correction factor setting section 30B sets the target current value IT2=K1×IT1 and outputs IT2 to the subtracting section 15 (see FIG. 25) as the target current value in Step S105. Then, the process advances to Step S106 to check whether or not the ignition switch is turned off (IG OFF?). The process finishes the series of controls when the ignition switch is turned off (Yes) or returns to Step S101 to repeat Steps S101 through S106 when the ignition switch is not turned off (No).

Thus, the series of controls of setting the correction factor K1 by the correction factor setting section 30B and of outputting the target current value IT2 by the multiplying section 19 are achieved.

The present embodiment requires no switching of the transfer ratio modulating mode and the steering torque modulating mode like the second embodiment, corrects the target current of the transfer ratio variable motor 33 corresponding to the absolute value |ωh| of the steering wheel angular velocity more smoothly when the vehicle speed VS is small and can reduce steering reactive force that is otherwise given to the driver when the driver quickly steers the steering wheel 2 (see FIG. 6).

Although the planetary gear mechanism 31 (differential gear) using the planetary gears has been assumed as the transfer ratio variable mechanism in the second through fifth embodiments and their modified embodiments, the present invention is applied not only to that and is applicable to what generally having an actuator for modulating the steering wheel angle and the pinion angle.

Still more, although the electric power steering unit 4 has been assumed as the steering force assisting mechanism, the invention is applied not only to that and is applicable in the same manner to a hydraulic power steering system.

Thus, it is noted that although the mode described above is the best modes for carrying out the invention, it is not intended to limit the invention to such modes. Accordingly, the modes for carrying out the invention may be variously modified within a scope in which the subject matter of the invention is not changed.

What is claimed is:

1. A steering system that changes a transfer ratio of a steering angle of a steering wheel to a turning angle of a turning wheel by operation of a variable transfer ratio mechanism and generates auxiliary power during steering by operation of an electric power steering unit, comprising:

a switching section for switching a transfer ratio modulating mode of setting a rotational angle of a transfer ratio variable motor used in the variable transfer ratio mechanism so that the transfer ratio is set at a target transfer ratio corresponding to vehicle speed and a steering torque modulating mode of reducing an electric current for driving the transfer ratio variable motor so as to reduce steering power of the steering wheel.

2. The steering system according to claim 1, further comprising a first judging section for judging whether or not steering speed of the steering wheel is greater than a first preset threshold value;
   wherein the switching section switches the transfer ratio modulating mode to the steering torque modulating mode when the steering speed is greater than the first preset threshold value.

3. The steering system according to claim 1, further comprising a second judging section for judging whether or not steering torque of the steering wheel is greater than a second preset threshold value;
   wherein the switching section switches the transfer ratio modulating mode to the steering torque modulating mode when the steering torque is greater than the second preset threshold value.

4. The steering system according to claim 1, further comprising a third judging section for judging whether or not a load of an assist motor that is used for the electric power steering unit and is a source of the auxiliary power is greater than a third preset threshold value;
   wherein the switching section switches the transfer ratio modulating mode to the steering torque modulating mode when the load is greater than the third preset threshold value.

5. The steering system according to claim 1 that changes the transfer ratio of the steering angle of the steering wheel to the turning angle of the turning wheel by means of the variable transfer ratio mechanism and generates the auxiliary power during steering by means of the electric power steering unit, comprising:
   the switching section for switching the transfer ratio modulating mode of setting the rotational angle of the transfer ratio variable motor used in the variable transfer ratio mechanism so that the transfer ratio is set at the target transfer ratio corresponding to vehicle speed with the steering torque modulating mode of reducing an electric current for driving the transfer ratio variable motor so as to reduce steering power of the steering wheel;
   wherein the switching section controls the current value flown to the transfer ratio variable motor so as to change continuously in switching from the transfer ratio modulating mode to the steering torque modulating mode.

6. The steering system according to claim 5, further comprising a steering operation state information acquiring means for acquiring steering operation state information indicative of an operation state of the steering wheel;
   wherein the switching section sets a correction factor based on the steering operation state information and a continuous function whose variable is the steering operation state information when it switches from the transfer ratio modulating mode to the steering torque modulating mode and sets a second target current value obtained by multiplying a first target current value in the steering torque modulating mode with the correction factor set as described above as a current value to be outputted to the transfer ratio variable motor.

7. The steering system according to claim 6, wherein the steering operation state information is steering speed of the steering wheel.

8. The steering system according to claim 6, wherein the steering operation state information is a steering torque value.

9. The steering system according to claim 6, wherein the steering operation state information is a value of an indicator current to an assist motor that is used in the electric power steering unit and that is a power source of the auxiliary power.

10. The steering system according to claim 5 that changes the transfer ratio of the steering angle of the steering wheel to the turning angle of the turning wheel by means of the variable transfer ratio mechanism and generates the auxiliary power during steering by means of the electric power steering unit, comprising:
    the switching section for switching the transfer ratio modulating mode of setting the rotational angle of the transfer ratio variable motor used in the variable transfer ratio mechanism so that the transfer ratio is set at the target transfer ratio corresponding to vehicle speed with the steering torque modulating mode of reducing an electric current for driving the transfer ratio variable motor so as to reduce steering power of the steering wheel;
    wherein the switching section controls the current of the transfer ratio variable motor so as not to increase the turning angle in the previous steering direction when a driver stops steering the steering wheel or switches the steering direction.

11. The steering system according to claim 5 that changes the transfer ratio of the steering angle of the steering wheel to the turning angle of the turning wheel by means of the variable transfer ratio mechanism and generates the auxiliary power during steering by means of the electric power steering unit, comprising:
    a transfer ratio modulating and setting section for setting the rotational angle of the transfer ratio variable motor used in the variable transfer ratio mechanism so that the transfer ratio is set at a target transfer ratio corresponding to vehicle speed; and
    a steering torque modulating and setting section for reducing an electric current for driving the transfer ratio variable motor so as to reduce steering power of the steering wheel;
    wherein a control amount outputted out of the steering torque modulating and setting section changes continuously.

12. The steering system according to claim 2, further comprising a second judging section for judging whether or not steering torque of the steering wheel is greater than a second preset threshold value;
    wherein the switching section switches the transfer ratio modulating mode to the steering torque modulating mode when the steering torque is greater than the second preset threshold value.

13. The steering system according to claim 2, further comprising a third judging section for judging whether or not a load of an assist motor that is used for the electric power steering unit and is a source of the auxiliary power is greater than a third preset threshold value;
    wherein the switching section switches the transfer ratio modulating mode to the steering torque modulating mode when the load is greater than the third preset threshold value.

14. The steering system according to claim 3, further comprising a third judging section for judging whether or not a load of an assist motor that is used for the electric power steering unit and is a source of the auxiliary power is greater than a third preset threshold value;

wherein the switching section switches the transfer ratio modulating mode to the steering torque modulating mode when the load is greater than the third preset threshold value.

15. The steering system according to claim 12, further comprising a third judging section for judging whether or not a load of an assist motor that is used for the electric power steering unit and is a source of the auxiliary power is greater than a third preset threshold value;

wherein the switching section switches the transfer ratio modulating mode to the steering torque modulating mode when the load is greater than the third preset threshold value.

* * * * *